United States Patent
Powell et al.

(10) Patent No.: US 10,376,736 B2
(45) Date of Patent: Aug. 13, 2019

(54) COOLING AN EXERCISE DEVICE DURING A DIVE MOTOR RUNWAY CONDITION

(71) Applicant: ICON Health & Fitness, Inc., Logan, UT (US)

(72) Inventors: Wade Antoine Powell, Millville, UT (US); Dale Buchanan, Nibley, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 93 days.

(21) Appl. No.: 15/847,279

(22) Filed: Dec. 19, 2017

(65) Prior Publication Data

US 2018/0104533 A1    Apr. 19, 2018

Related U.S. Application Data

(63) Continuation-in-part of application No. 15/730,516, filed on Oct. 11, 2017, now Pat. No. 10,207,148.

(60) Provisional application No. 62/407,073, filed on Oct. 16, 2016.

(51) Int. Cl.
| | |
|---|---|
| A63B 22/02 | (2006.01) |
| H02K 9/06 | (2006.01) |
| F04D 25/08 | (2006.01) |
| H02K 7/10 | (2006.01) |
| A63B 22/00 | (2006.01) |
| A63B 71/06 | (2006.01) |
| A63B 21/005 | (2006.01) |
| A63B 21/008 | (2006.01) |
| A63B 21/015 | (2006.01) |

(52) U.S. Cl.
CPC ...... *A63B 22/0235* (2013.01); *A63B 22/0023* (2013.01); *F04D 25/082* (2013.01); *H02K 7/1008* (2013.01); *H02K 9/06* (2013.01); *A63B 21/0051* (2013.01); *A63B 21/0053* (2013.01); *A63B 21/0084* (2013.01); *A63B 21/0088* (2013.01); *A63B 21/015* (2013.01); *A63B 71/0622* (2013.01); *A63B 2071/063* (2013.01); *A63B 2220/16* (2013.01); *A63B 2220/18* (2013.01); *A63B 2220/30* (2013.01); *A63B 2220/40* (2013.01); *A63B 2220/72* (2013.01); *A63B 2220/76* (2013.01); *A63B 2225/09* (2013.01); *A63B 2225/20* (2013.01); *A63B 2225/50* (2013.01); *A63B 2243/002* (2013.01)

(58) Field of Classification Search
None
See application file for complete search history.

(56) References Cited

U.S. PATENT DOCUMENTS

| | | |
|---|---|---|
| 232,022 A | 9/1880 | Gifford |
| 284,294 A | 9/1883 | Graves |
| 321,388 A | 6/1885 | Ruebsam |
| 339,638 A | 4/1886 | Goldie |

(Continued)

*Primary Examiner* — Stephen R Crow
(74) *Attorney, Agent, or Firm* — Ray Quinney & Nebeker

(57) ABSTRACT

A treadmill can include a deck, a first pulley incorporated into the deck, a second pulley incorporated into the deck, a tread belt surrounding the first pulley and the second pulley, a drive motor in mechanical communication with at least one of the first pulley and the second pulley to move the tread belt in a first direction, a runaway load component in electrical communication with the drive motor. The runaway load component draws electrical power generated by the drive motor during a runaway motor condition.

20 Claims, 9 Drawing Sheets

(56) References Cited

U.S. PATENT DOCUMENTS

| | | |
|---|---|---|
| 421,779 A | 2/1890 | Steven |
| 447,780 A | 3/1891 | Luge |
| 450,792 A | 4/1891 | Dodd |
| 659,216 A | 10/1900 | Dowling |
| 663,486 A | 12/1900 | Boren |
| 674,391 A | 5/1901 | Baker |
| 683,284 A | 9/1901 | Honey |
| 766,930 A | 8/1904 | Clemons |
| 881,521 A | 3/1908 | Wilson |
| 897,722 A | 9/1908 | Day |
| 931,394 A | 8/1909 | Day |
| 937,795 A | 10/1909 | Hackney |
| 1,016,729 A | 2/1912 | Barrett |
| 1,020,777 A | 3/1912 | Peterson |
| 1,064,968 A | 6/1913 | Hagen |
| 1,082,940 A | 12/1913 | Flora |
| 1,211,765 A | 1/1917 | Schmidt |
| 1,570,482 A | 1/1926 | Hale |
| 1,580,530 A | 4/1926 | Rambo |
| 1,585,748 A | 5/1926 | Wendelken |
| 1,715,870 A | 6/1929 | Spain |
| 1,766,089 A | 6/1930 | Wood |
| 1,778,635 A | 10/1930 | Heisler |
| 1,824,406 A | 9/1931 | Petersime |
| 1,850,530 A | 3/1932 | Brown |
| 1,893,728 A | 1/1933 | Bullis |
| 1,902,694 A | 3/1933 | Edwards |
| 1,919,627 A | 7/1933 | Ftiz Gerald |
| 1,928,089 A | 9/1933 | Blickman |
| 1,973,945 A | 9/1934 | Chavin |
| 1,978,579 A | 10/1934 | Hooks |
| 1,982,843 A | 12/1934 | Traver |
| 2,067,136 A | 1/1937 | Bridenbaugh |
| 2,117,957 A | 5/1938 | Ritter |
| 2,165,700 A | 7/1939 | Henry |
| 2,177,957 A | 10/1939 | Stewart |
| 2,219,219 A | 10/1940 | Boger |
| 2,247,946 A | 7/1941 | Hein et al. |
| 2,255,864 A | 9/1941 | Stephens |
| 2,315,485 A | 4/1943 | Jones |
| 2,399,915 A | 5/1946 | Drake |
| 2,440,644 A | 4/1948 | Powell |
| 2,569,007 A | 9/1951 | Klyce |
| 2,632,645 A | 3/1953 | Barkschat |
| 2,645,539 A | 7/1953 | Thompson |
| 2,646,282 A | 7/1953 | Ringman |
| 2,648,540 A | 8/1953 | Hunter |
| 2,674,453 A | 4/1954 | Hummert |
| 2,743,623 A | 5/1956 | Wells |
| 2,746,822 A | 5/1956 | Copenhaver |
| 2,842,365 A | 7/1958 | Kelley |
| 2,855,200 A | 10/1958 | Blickman |
| 2,874,971 A | 2/1959 | Devery |
| 2,969,060 A | 1/1961 | Swanda |
| 2,984,594 A | 5/1961 | Runton |
| 3,035,671 A | 5/1962 | Sicherman |
| 3,059,312 A | 10/1962 | Jamieson |
| 3,068,950 A | 12/1962 | Davidson |
| 3,072,426 A | 1/1963 | Gilbert |
| 3,112,108 A | 11/1963 | Hanke |
| 3,127,171 A | 3/1964 | Noland et al. |
| 3,179,071 A | 4/1965 | Johnston |
| 3,193,287 A | 7/1965 | Robinson |
| 3,205,888 A | 9/1965 | Stroop |
| 3,316,898 A | 5/1967 | Brown |
| 3,319,273 A | 5/1967 | Lawrence |
| 3,342,485 A | 9/1967 | Martin |
| 3,345,067 A | 10/1967 | Smith |
| 3,358,813 A | 12/1967 | Kohlhagen |
| 3,378,259 A | 4/1968 | Kupchinski |
| 3,408,067 A | 10/1968 | Armstrong |
| 3,408,069 A | 10/1968 | Lewis |
| 3,411,497 A | 11/1968 | Rickey et al. |
| 3,416,174 A | 12/1968 | Novitske |
| 3,430,507 A | 3/1969 | Hurst et al. |
| 3,438,627 A | 4/1969 | La Lanne |
| 3,444,830 A | 5/1969 | Doetsch |
| 3,446,503 A | 5/1969 | Lawton |
| 3,501,140 A | 3/1970 | Eichorn |
| 3,511,500 A | 5/1970 | Dunn |
| 3,514,110 A | 5/1970 | Thomander |
| 3,518,985 A | 7/1970 | Quinton |
| 3,547,435 A | 12/1970 | Scott |
| 3,554,541 A | 1/1971 | Spoth |
| 3,563,541 A | 2/1971 | Sanquist |
| 3,566,861 A | 3/1971 | Weiss |
| 3,567,219 A | 3/1971 | Foster |
| 3,568,669 A | 3/1971 | Stites |
| 3,572,700 A | 3/1971 | Mastropaolo |
| 3,583,465 A | 6/1971 | Youngs et al. |
| 3,586,322 A | 6/1971 | Kverneland |
| 3,589,715 A | 6/1971 | Mark |
| 3,592,466 A | 7/1971 | Parsons |
| 3,598,404 A | 8/1971 | Bowman |
| 3,602,502 A | 8/1971 | Jaegar |
| 3,606,320 A | 9/1971 | Erwin, Jr. |
| 3,608,898 A | 9/1971 | Berlin |
| 3,614,097 A | 10/1971 | Blickman |
| 3,628,654 A | 12/1971 | Haracz |
| 3,628,791 A | 12/1971 | Garcia |
| 3,634,895 A | 1/1972 | Childers |
| 3,636,577 A | 1/1972 | Nissen |
| 3,638,941 A | 2/1972 | Kulkens |
| 3,640,528 A | 2/1972 | Proctor |
| 3,641,601 A | 2/1972 | Sieg |
| 3,642,279 A | 2/1972 | Cutter |
| 3,643,943 A | 2/1972 | Erwin, Jr. et al. |
| 3,650,529 A | 3/1972 | Salm |
| 3,658,327 A | 4/1972 | Thiede |
| 3,659,845 A | 5/1972 | Quinton |
| 3,664,666 A | 5/1972 | Lloyd |
| 3,686,776 A | 8/1972 | Dahl |
| 3,689,066 A | 9/1972 | Hagen |
| 3,703,284 A | 11/1972 | Hesen |
| 3,708,166 A | 1/1973 | Annas |
| 3,709,197 A | 1/1973 | Moseley |
| 3,731,917 A | 5/1973 | Townsend |
| 3,738,649 A | 6/1973 | Miller |
| 3,741,538 A | 6/1973 | Useldinger |
| 3,751,033 A | 8/1973 | Rosenthal |
| 3,756,595 A | 9/1973 | Hague |
| 3,767,195 A | 10/1973 | Dimick |
| 3,788,412 A | 1/1974 | Vincent |
| 3,792,860 A | 2/1974 | Selnes |
| 3,809,393 A | 5/1974 | Jones |
| 3,814,420 A | 6/1974 | Encke |
| 3,822,488 A | 7/1974 | Johnson |
| 3,826,491 A | 7/1974 | Elder |
| 3,848,467 A | 11/1974 | Flavell |
| 3,851,874 A | 12/1974 | Wilkin |
| 3,858,938 A | 1/1975 | Kristensson et al. |
| 3,861,215 A | 1/1975 | Bradley |
| 3,869,121 A | 3/1975 | Flavell |
| 3,870,297 A | 3/1975 | Elder |
| 3,874,657 A | 4/1975 | Niebojewski |
| 3,880,274 A | 4/1975 | Bechtloff |
| 3,883,922 A | 5/1975 | Fleischhauer |
| 3,892,404 A | 7/1975 | Martucci |
| 3,901,379 A | 8/1975 | Bruhm |
| 3,903,613 A | 9/1975 | Bisberg |
| 3,904,196 A | 9/1975 | Berlin |
| 3,909,857 A | 10/1975 | Herrera |
| 3,912,263 A | 10/1975 | Yatso |
| 3,918,710 A | 11/1975 | Niebojewski |
| 3,926,430 A | 12/1975 | Good |
| 3,929,026 A | 12/1975 | Hofmann |
| 3,938,400 A | 2/1976 | Konyha |
| 3,941,377 A | 3/1976 | Lie |
| 3,948,513 A | 4/1976 | Pfotenhauer |
| 3,963,101 A | 6/1976 | Stadelmann et al. |
| 3,977,451 A | 8/1976 | Duba |
| 3,981,500 A | 9/1976 | Ryan |
| 4,012,015 A | 3/1977 | Nelson et al. |
| 4,024,949 A | 5/1977 | Kleysteuber et al. |

(56) References Cited

U.S. PATENT DOCUMENTS

| | | |
|---|---|---|
| 4,026,545 A | 5/1977 | Schonenberger |
| 4,033,567 A | 7/1977 | Lipfert |
| 4,056,265 A | 11/1977 | Ide |
| 4,063,726 A | 12/1977 | Wilson |
| 4,063,727 A | 12/1977 | Hall |
| 4,066,257 A | 1/1978 | Moller |
| 4,066,259 A | 1/1978 | Brentham |
| 4,067,372 A | 1/1978 | Masson |
| 4,072,309 A | 2/1978 | Wilson |
| 4,077,626 A | 3/1978 | Newman |
| 4,082,267 A | 4/1978 | Flavell |
| 4,093,196 A | 6/1978 | Bauer |
| 4,094,330 A | 6/1978 | Jong |
| 4,111,417 A | 9/1978 | Gardner |
| 4,113,071 A | 9/1978 | Muller et al. |
| 4,120,294 A | 10/1978 | Wolfe |
| 4,141,158 A | 2/1979 | Benseler et al. |
| 4,146,222 A | 3/1979 | Hribar |
| 4,149,714 A | 4/1979 | Lambert, Jr. |
| 4,151,988 A | 5/1979 | Nabinger |
| 4,151,994 A | 5/1979 | Stalberger, Jr. |
| 4,161,998 A | 7/1979 | Trimble |
| 4,167,938 A | 9/1979 | Remih |
| 4,168,061 A | 9/1979 | Gordon |
| 4,171,805 A | 10/1979 | Abbott |
| 4,179,134 A | 12/1979 | Atkinson |
| 4,183,156 A | 1/1980 | Rudy |
| 4,183,494 A | 1/1980 | Cleveland |
| 4,188,030 A | 2/1980 | Hooper |
| 4,199,139 A | 4/1980 | Mahnke |
| 4,204,673 A | 5/1980 | Speer, Sr. |
| 4,208,049 A | 6/1980 | Wilson |
| 4,215,516 A | 8/1980 | Huschle et al. |
| 4,216,856 A | 8/1980 | Moring et al. |
| 4,227,689 A | 10/1980 | Keiser |
| 4,235,437 A | 11/1980 | Ruis et al. |
| 4,240,627 A | 12/1980 | Brentham |
| 4,248,476 A | 2/1981 | Phelps |
| 4,249,725 A | 2/1981 | Mattox |
| 4,251,932 A | 2/1981 | Love |
| 4,253,661 A | 3/1981 | Russell |
| 4,258,821 A | 3/1981 | Wendt |
| 4,258,913 A | 3/1981 | Brentham |
| 4,274,625 A | 6/1981 | Gaetano |
| 4,278,095 A | 7/1981 | Lapeyre |
| 4,278,249 A | 7/1981 | Forrest |
| 4,286,782 A | 9/1981 | Fuhrhop |
| 4,290,601 A | 9/1981 | Mittelstadt |
| 4,300,761 A | 11/1981 | Howard |
| 4,313,602 A | 2/1982 | Sullivan |
| 4,313,603 A | 2/1982 | Simjian |
| 4,324,501 A | 4/1982 | Herbenar |
| 4,333,978 A | 6/1982 | Kocher |
| 4,334,676 A | 6/1982 | Schonenberger |
| 4,334,695 A | 6/1982 | Ashby |
| 4,337,283 A | 6/1982 | Haas, Jr. |
| 4,342,452 A | 8/1982 | Summa |
| 4,344,616 A | 8/1982 | Ogden |
| 4,349,597 A | 9/1982 | Fine et al. |
| 4,350,336 A | 9/1982 | Hanford |
| 4,358,105 A | 11/1982 | Sweeney, Jr. |
| 4,363,480 A | 12/1982 | Fisher et al. |
| 4,363,486 A | 12/1982 | Chaudhry |
| 4,367,895 A | 1/1983 | Pacitti et al. |
| 4,369,081 A | 1/1983 | Curry et al. |
| 4,370,766 A | 2/1983 | Teague, Jr. |
| 4,374,587 A | 2/1983 | Ogden |
| 4,377,045 A | 3/1983 | Aurensan |
| 4,383,684 A | 5/1983 | Schliep |
| 4,383,714 A | 5/1983 | Ishida |
| 4,397,462 A | 8/1983 | Wilmarth |
| 4,406,451 A | 9/1983 | Gaetano |
| 4,408,613 A | 10/1983 | Relyea |
| 4,422,635 A | 12/1983 | Herod |
| 4,422,636 A | 12/1983 | de Angeli |
| 4,423,864 A | 1/1984 | Wiik |
| 4,426,077 A | 1/1984 | Becker |
| 4,431,181 A | 2/1984 | Baswell |
| 4,434,981 A | 3/1984 | Norton |
| 4,441,708 A | 4/1984 | Brentham |
| 4,445,684 A | 5/1984 | Ruff |
| 4,452,448 A | 6/1984 | Ausherman |
| 4,453,766 A | 6/1984 | DiVito |
| 4,461,472 A | 7/1984 | Martinez |
| 4,465,277 A | 8/1984 | Dittrich |
| 4,476,582 A | 10/1984 | Strauss et al. |
| 4,477,071 A | 10/1984 | Brown et al. |
| 4,489,933 A | 12/1984 | Fisher |
| 4,491,318 A | 1/1985 | Francke |
| 4,494,662 A | 1/1985 | Clymer |
| 4,496,147 A | 1/1985 | DeCloux et al. |
| 4,499,784 A | 2/1985 | Shum |
| 4,502,679 A | 3/1985 | De Lorenzo |
| 4,505,474 A | 3/1985 | Mattox |
| 4,505,475 A | 3/1985 | Olschansky et al. |
| 4,509,510 A | 4/1985 | Hook |
| 4,512,567 A | 4/1985 | Phillips |
| 4,512,571 A | 4/1985 | Hermelin |
| 4,522,394 A | 6/1985 | Broussard |
| 4,529,194 A | 7/1985 | Haaheim |
| 4,533,136 A | 8/1985 | Smith et al. |
| 4,536,244 A | 8/1985 | Greci et al. |
| 4,538,805 A | 9/1985 | Parviainen |
| 4,542,899 A | 9/1985 | Hendricks |
| 4,544,152 A | 10/1985 | Taitel |
| 4,544,153 A | 10/1985 | Babcock |
| 4,546,971 A | 10/1985 | Raasoch |
| 4,548,405 A | 10/1985 | Lee |
| 4,549,733 A | 10/1985 | Salyer |
| 4,556,216 A | 12/1985 | Pitkanen |
| 4,563,001 A | 1/1986 | Terauds |
| 4,563,003 A | 1/1986 | Bugallo et al. |
| 4,564,193 A | 1/1986 | Stewart |
| 4,566,689 A | 1/1986 | Ogden |
| 4,566,732 A | 1/1986 | Ostergaard, Sr. |
| 4,569,518 A | 2/1986 | Fulks |
| 4,571,682 A | 2/1986 | Silverman et al. |
| 4,572,500 A | 2/1986 | Weiss |
| 4,572,504 A | 2/1986 | DiBartolo |
| 4,576,352 A | 3/1986 | Ogden |
| 4,576,376 A | 3/1986 | Miller |
| 4,577,860 A | 3/1986 | Matias et al. |
| 4,580,983 A | 4/1986 | Cassini et al. |
| 4,581,269 A | 4/1986 | Tilman |
| 4,582,320 A | 4/1986 | Shaw |
| 4,589,656 A | 5/1986 | Baldwin |
| 4,591,147 A | 5/1986 | Smith et al. |
| 4,592,544 A | 6/1986 | Smith et al. |
| 4,600,196 A | 7/1986 | Jones |
| 4,601,142 A | 7/1986 | Frommelt |
| 4,602,779 A | 7/1986 | Ogden |
| 4,610,449 A | 9/1986 | Diercks, Jr. |
| 4,614,337 A | 9/1986 | Schonenberger |
| 4,616,822 A | 10/1986 | Trulaske |
| 4,618,139 A | 10/1986 | Haaheim |
| 4,618,140 A | 10/1986 | Brown |
| 4,619,454 A | 10/1986 | Walton |
| 4,621,623 A | 11/1986 | Wang |
| 4,624,457 A | 11/1986 | Silberman et al. |
| 4,625,962 A | 12/1986 | Street |
| 4,627,614 A | 12/1986 | De Angeli |
| 4,627,615 A | 12/1986 | Nurkowski |
| 4,627,616 A | 12/1986 | Kauffman |
| 4,630,817 A | 12/1986 | Buckley |
| 4,632,385 A | 12/1986 | Geraci |
| 4,632,386 A | 12/1986 | Beech |
| 4,632,390 A | 12/1986 | Richey |
| 4,634,127 A | 1/1987 | Rockwell |
| 4,635,927 A | 1/1987 | Shu |
| 4,635,928 A | 1/1987 | Ogden et al. |
| 4,637,605 A | 1/1987 | Ritchie |
| 4,638,523 A | 1/1987 | Todd |
| 4,638,969 A | 1/1987 | Brown |
| 4,641,833 A | 2/1987 | Trethewey |

(56) References Cited

U.S. PATENT DOCUMENTS

| | | |
|---|---|---|
| 4,642,080 A | 2/1987 | Takano et al. |
| 4,643,418 A | 2/1987 | Bart |
| 4,645,197 A | 2/1987 | Mcfee |
| 4,645,200 A | 2/1987 | Hix |
| 4,645,201 A | 2/1987 | Evans |
| 4,645,917 A | 2/1987 | Penney et al. |
| 4,647,041 A | 3/1987 | Whiteley |
| 4,650,067 A | 3/1987 | Brule |
| 4,650,184 A | 3/1987 | Brebner |
| 4,650,185 A | 3/1987 | Cartwright |
| 4,651,581 A | 3/1987 | Svensson |
| 4,659,074 A | 4/1987 | Taitel et al. |
| 4,659,077 A | 4/1987 | Stropkay |
| 4,659,078 A | 4/1987 | Blome |
| 4,662,630 A | 5/1987 | Dignard et al. |
| 4,664,371 A | 5/1987 | Viander |
| 4,664,373 A | 5/1987 | Hait |
| 4,664,646 A | 5/1987 | Rorabaugh |
| 4,673,177 A | 6/1987 | Szymski |
| 4,674,740 A | 6/1987 | Iams et al. |
| 4,674,743 A | 6/1987 | Hirano |
| 4,678,185 A | 7/1987 | Mahnke |
| 4,679,787 A | 7/1987 | Guilbault |
| 4,684,121 A | 8/1987 | Nestegard |
| 4,685,670 A | 8/1987 | Zinkin |
| 4,687,195 A | 8/1987 | Potts |
| 4,697,809 A | 10/1987 | Rockwell |
| 4,700,946 A | 10/1987 | Breunig |
| 4,702,475 A | 10/1987 | Elstein et al. |
| 4,705,267 A | 11/1987 | Jackson |
| 4,708,337 A | 11/1987 | Shyu |
| 4,709,917 A | 12/1987 | Yang |
| 4,709,918 A | 12/1987 | Grinblat |
| 4,709,920 A | 12/1987 | Schnell |
| 4,711,447 A | 12/1987 | Mansfield |
| 4,714,248 A | 12/1987 | Koss |
| 4,718,207 A | 1/1988 | Frommelt |
| 4,720,093 A | 1/1988 | Del Mar |
| 4,720,099 A | 1/1988 | Carlson |
| 4,720,789 A | 1/1988 | Hector et al. |
| 4,721,303 A | 1/1988 | Fitzpatrick |
| 4,725,057 A | 2/1988 | Shifferaw |
| 4,726,581 A | 2/1988 | Chang |
| 4,729,558 A | 3/1988 | Kuo |
| 4,729,562 A | 3/1988 | Pipasik |
| 4,733,858 A | 3/1988 | Lan |
| 4,743,009 A | 5/1988 | Beale |
| 4,743,015 A | 5/1988 | Marshall |
| 4,744,559 A | 5/1988 | Mahnke et al. |
| 4,746,115 A | 5/1988 | Lahman |
| 4,749,184 A | 6/1988 | Tobin |
| 4,750,736 A | 6/1988 | Watterson |
| 4,751,755 A | 6/1988 | Carey, Jr. et al. |
| 4,756,098 A | 7/1988 | Boggia |
| 4,757,987 A | 7/1988 | Allemand |
| 4,759,540 A | 7/1988 | Yu et al. |
| 4,771,148 A | 9/1988 | Bersonnet |
| 4,772,015 A | 9/1988 | Carlson et al. |
| 4,773,170 A | 9/1988 | Moore et al. |
| 4,776,582 A | 10/1988 | Ramhorst |
| 4,779,884 A | 10/1988 | Minati |
| 4,786,049 A | 11/1988 | Lautenschlager |
| 4,786,050 A | 11/1988 | Geschwender |
| 4,790,528 A | 12/1988 | Nakao et al. |
| 4,792,134 A | 12/1988 | Chen |
| 4,797,968 A | 1/1989 | Wenzlick |
| 4,798,760 A | 1/1989 | Diaz-Kotti |
| 4,799,475 A | 1/1989 | Iams et al. |
| 4,799,671 A | 1/1989 | Hoggan |
| 4,801,079 A | 1/1989 | Gonella |
| 4,804,178 A | 2/1989 | Friedebach |
| 4,805,901 A | 2/1989 | Kulick |
| 4,807,874 A | 2/1989 | Little |
| 4,809,804 A | 3/1989 | Houston et al. |
| 4,809,972 A | 3/1989 | Rasmussen et al. |
| 4,813,667 A | 3/1989 | Watterson |
| 4,813,668 A | 3/1989 | Solloway |
| 4,813,743 A | 3/1989 | Mizelle |
| 4,817,939 A | 4/1989 | Augspurger et al. |
| 4,818,175 A | 4/1989 | Kimura |
| 4,819,583 A | 4/1989 | Guerra |
| 4,822,029 A | 4/1989 | Sarno |
| 4,822,034 A | 4/1989 | Shields |
| 4,824,104 A | 4/1989 | Bloch |
| 4,826,153 A | 5/1989 | Schalip |
| 4,826,157 A | 5/1989 | Fitzpatrick |
| 4,826,158 A | 5/1989 | Fields, Jr. |
| 4,826,159 A | 5/1989 | Hersey |
| 4,828,255 A | 5/1989 | Lahman |
| 4,828,257 A | 5/1989 | Dyer et al. |
| 4,830,362 A | 5/1989 | Bull |
| 4,832,332 A | 5/1989 | Dumbser |
| 4,836,530 A | 6/1989 | Stanley, Jr. |
| 4,838,543 A | 6/1989 | Armstrong et al. |
| 4,838,544 A | 6/1989 | Sasakawa et al. |
| 4,842,266 A | 6/1989 | Sweeney, Sr. |
| 4,842,274 A | 6/1989 | Oosthuizen |
| 4,844,449 A | 7/1989 | Truslaske |
| 4,844,450 A | 7/1989 | Rodgers, Jr. |
| 4,848,737 A | 7/1989 | Ehrenfield |
| 4,850,585 A | 7/1989 | Dalebout |
| 4,861,023 A | 8/1989 | Wedman |
| 4,861,025 A | 8/1989 | Rockwell |
| 4,863,161 A | 9/1989 | Telle |
| 4,865,344 A | 9/1989 | Romero, Sr. et al. |
| 4,867,443 A | 9/1989 | Jensen |
| 4,869,493 A | 9/1989 | Johnston |
| 4,869,494 A | 9/1989 | Lambert, Sr. |
| 4,869,497 A | 9/1989 | Stewart et al. |
| 4,875,676 A | 10/1989 | Zimmer |
| 4,877,239 A | 10/1989 | Dela Rosa |
| 4,878,662 A | 11/1989 | Chern |
| 4,878,663 A | 11/1989 | Luquette |
| 4,880,227 A | 11/1989 | Sowell |
| 4,883,272 A | 11/1989 | Lay |
| 4,886,266 A | 12/1989 | Trulaske |
| 4,891,764 A | 1/1990 | McIntosh |
| 4,894,933 A | 1/1990 | Tonkel et al. |
| 4,898,379 A | 2/1990 | Shiba |
| 4,898,381 A | 2/1990 | Gordon |
| 4,900,012 A | 2/1990 | Fu |
| 4,900,017 A | 2/1990 | Bold, Jr. |
| 4,900,018 A | 2/1990 | Ish, III |
| 4,902,006 A | 2/1990 | Stallings, Jr. |
| 4,904,829 A | 2/1990 | Berthaud et al. |
| 4,905,330 A | 3/1990 | Jacobs |
| 4,907,795 A | 3/1990 | Shaw et al. |
| 4,907,797 A | 3/1990 | Gezari et al. |
| 4,907,798 A | 3/1990 | Burchatz |
| 4,909,504 A | 3/1990 | Yang |
| 4,911,438 A | 3/1990 | Van Straaten |
| 4,913,396 A | 4/1990 | Dalebout et al. |
| 4,913,423 A | 4/1990 | Farran |
| 4,915,377 A | 4/1990 | Malnke et al. |
| 4,915,379 A | 4/1990 | Sapp |
| 4,917,376 A | 4/1990 | Lo |
| 4,919,418 A | 4/1990 | Miller |
| 4,919,419 A | 4/1990 | Houston |
| 4,921,242 A | 5/1990 | Watterson |
| 4,921,247 A | 5/1990 | Sterling |
| 4,923,193 A | 5/1990 | Pitzen et al. |
| 4,925,183 A | 5/1990 | Kim |
| 4,925,724 A | 5/1990 | Ogden |
| 4,927,136 A | 5/1990 | Leask |
| 4,928,546 A | 5/1990 | Walters |
| 4,928,957 A | 5/1990 | Lanier et al. |
| 4,930,768 A | 6/1990 | Lapcevic |
| 4,930,769 A | 6/1990 | Nenoff |
| 4,934,690 A | 6/1990 | Bull |
| 4,934,692 A | 6/1990 | Owens |
| 4,938,473 A | 7/1990 | Lee |
| 4,940,233 A | 7/1990 | Bull |
| 4,941,652 A | 7/1990 | Nagano et al. |
| 4,941,673 A | 7/1990 | Bennett |

(56) References Cited

U.S. PATENT DOCUMENTS

| | | |
|---|---|---|
| 4,948,121 A | 8/1990 | Haaheim et al. |
| 4,949,954 A | 8/1990 | Hix |
| 4,949,958 A | 8/1990 | Richey |
| 4,949,959 A | 8/1990 | Stevens |
| 4,952,265 A | 8/1990 | Yamanaka et al. |
| 4,953,415 A | 9/1990 | Lehtonen |
| 4,953,858 A | 9/1990 | Zelli |
| 4,955,466 A | 9/1990 | Almes et al. |
| 4,958,832 A | 9/1990 | Kim |
| 4,960,276 A | 10/1990 | Feuer et al. |
| 4,964,632 A | 10/1990 | Rockwell |
| 4,968,028 A | 11/1990 | Wehrell |
| 4,971,316 A | 11/1990 | Dalebout et al. |
| 4,974,831 A | 12/1990 | Dunham |
| 4,974,832 A | 12/1990 | Dalebout |
| 4,976,424 A | 12/1990 | Sargeant et al. |
| 4,976,428 A | 12/1990 | Ghazi |
| 4,976,435 A | 12/1990 | Shatford |
| 4,984,810 A | 1/1991 | Stearns |
| 4,986,261 A | 1/1991 | Iams et al. |
| 4,989,860 A | 2/1991 | Iams et al. |
| 4,998,725 A | 3/1991 | Watterson et al. |
| 5,000,440 A | 3/1991 | Lynch |
| 5,000,442 A | 3/1991 | Dalebout et al. |
| 5,001,632 A | 3/1991 | Hall Tipping |
| 5,002,271 A | 3/1991 | Gonzales |
| 5,004,224 A | 4/1991 | Wang |
| 5,007,630 A | 4/1991 | Real et al. |
| 5,007,631 A | 4/1991 | Wang |
| 5,013,031 A | 5/1991 | Bull |
| 5,016,870 A | 5/1991 | Bulloch et al. |
| 5,020,793 A | 6/1991 | Loane |
| 5,024,441 A | 6/1991 | Rousseau |
| 5,026,049 A | 6/1991 | Goodman |
| 5,027,303 A | 6/1991 | Witte |
| 5,029,801 A | 7/1991 | Dalebout et al. |
| 5,031,455 A | 7/1991 | Cline |
| 5,031,901 A | 7/1991 | Saarinen |
| 5,034,576 A | 7/1991 | Dalebout et al. |
| RE33,662 E | 8/1991 | Blair et al. |
| 5,037,084 A | 8/1991 | Flor |
| 5,037,089 A | 8/1991 | Spagnuolo |
| 5,039,089 A | 8/1991 | Lapcevic |
| 5,039,091 A | 8/1991 | Johnson |
| 5,042,799 A | 8/1991 | Stanley |
| 5,046,382 A | 9/1991 | Steinberg |
| 5,046,722 A | 9/1991 | Antoon |
| 5,048,823 A | 9/1991 | Bean |
| 5,051,638 A | 9/1991 | Pyles |
| 5,054,770 A | 10/1991 | Bull |
| 5,058,881 A | 10/1991 | Measom |
| 5,058,882 A | 10/1991 | Dalebout et al. |
| 5,058,888 A | 10/1991 | Walker et al. |
| 5,062,626 A | 11/1991 | Dalebout et al. |
| 5,062,629 A | 11/1991 | Vaughan |
| 5,062,632 A | 11/1991 | Dalebout et al. |
| 5,066,000 A | 11/1991 | Dolan |
| 5,067,710 A | 11/1991 | Watterson et al. |
| 5,071,115 A | 12/1991 | Welch |
| 5,072,928 A | 12/1991 | Stearns et al. |
| 5,072,929 A | 12/1991 | Peterson et al. |
| 5,074,550 A | 12/1991 | Sloan |
| 5,077,916 A | 1/1992 | Beneteau |
| 5,080,353 A | 1/1992 | Tench |
| 5,081,991 A | 1/1992 | Chance |
| 5,085,426 A | 2/1992 | Wanzer et al. |
| 5,085,427 A | 2/1992 | Finn |
| 5,087,047 A | 2/1992 | McConnell |
| 5,088,729 A | 2/1992 | Dalebout |
| 5,094,249 A | 3/1992 | Marras et al. |
| 5,094,447 A | 3/1992 | Wang |
| 5,096,225 A | 3/1992 | Osawa |
| 5,102,122 A | 4/1992 | Piane, Jr. |
| 5,102,380 A | 4/1992 | Jacobson et al. |
| 5,104,119 A | 4/1992 | Lynch |
| 5,104,120 A | 4/1992 | Watterson et al. |
| 5,108,093 A | 4/1992 | Watterson |
| 5,109,778 A | 5/1992 | Berkowitz et al. |
| 5,110,117 A | 5/1992 | Fisher et al. |
| 5,112,045 A | 5/1992 | Mason et al. |
| 5,114,388 A | 5/1992 | Trulaske |
| 5,114,391 A | 5/1992 | Pitzen et al. |
| 5,123,629 A | 6/1992 | Takeuchi |
| 5,123,885 A | 6/1992 | Shields |
| 5,123,886 A | 6/1992 | Cook |
| 5,129,872 A | 7/1992 | Dalton et al. |
| 5,131,895 A | 7/1992 | Rogers, Jr. |
| 5,135,458 A | 8/1992 | Huang |
| 5,137,501 A | 8/1992 | Mertesdorf |
| 5,138,730 A | 8/1992 | Masuda |
| 5,141,480 A | 8/1992 | Lennox et al. |
| 5,142,358 A | 8/1992 | Jason |
| 5,145,475 A | 9/1992 | Cares |
| 5,145,481 A | 9/1992 | Friedebach |
| 5,147,266 A | 9/1992 | Ricard |
| 5,149,084 A | 9/1992 | Dalebout et al. |
| 5,149,312 A | 9/1992 | Croft et al. |
| 5,158,520 A | 10/1992 | Lemke et al. |
| 5,162,029 A | 11/1992 | Schine |
| 5,163,885 A | 11/1992 | Wanzer et al. |
| 5,167,159 A | 12/1992 | Lucking |
| 5,167,597 A | 12/1992 | David |
| 5,171,196 A | 12/1992 | Lynch |
| 5,178,593 A | 1/1993 | Roberts |
| 5,178,599 A | 1/1993 | Scott |
| 5,181,894 A | 1/1993 | Shieng |
| 5,184,295 A | 2/1993 | Mann |
| 5,184,988 A | 2/1993 | Dunham |
| 5,186,697 A | 2/1993 | Rennex |
| 5,192,255 A | 3/1993 | Dalebout et al. |
| 5,192,257 A | 3/1993 | Panasewicz |
| 5,192,258 A | 3/1993 | Keller |
| 5,195,781 A | 3/1993 | Osawa |
| 5,195,935 A | 3/1993 | Fencel |
| 5,195,937 A | 3/1993 | Engel et al. |
| 5,199,931 A | 4/1993 | Easley et al. |
| 5,201,694 A | 4/1993 | Zappel |
| 5,203,229 A | 4/1993 | Chen |
| 5,203,800 A | 4/1993 | Meredith |
| 5,203,826 A | 4/1993 | Dalebout |
| 5,205,798 A | 4/1993 | Lekhtman |
| 5,205,800 A | 4/1993 | Grant |
| 5,207,489 A | 5/1993 | Miller |
| 5,207,622 A | 5/1993 | Wilkinson et al. |
| 5,207,625 A | 5/1993 | White |
| 5,207,628 A | 5/1993 | Graham |
| 5,211,617 A | 5/1993 | Millen |
| 5,215,510 A | 6/1993 | Baran |
| 5,217,422 A | 6/1993 | Domzalski |
| 5,226,866 A | 7/1993 | Engel et al. |
| 5,232,422 A | 8/1993 | Bishop, Jr. |
| 5,234,392 A | 8/1993 | Clark |
| 5,240,417 A | 8/1993 | Smithson et al. |
| 5,242,339 A | 9/1993 | Thornton |
| 5,242,340 A | 9/1993 | Jerome |
| 5,242,343 A | 9/1993 | Miller |
| 5,242,347 A | 9/1993 | Keeton |
| 5,247,853 A | 9/1993 | Dalebout |
| 5,250,012 A | 10/1993 | Whitcomb, Jr. |
| 5,250,013 A | 10/1993 | Brangi |
| 5,254,067 A | 10/1993 | Habing et al. |
| 5,256,117 A | 10/1993 | Potts et al. |
| 5,256,118 A | 10/1993 | Chen |
| 5,256,126 A | 10/1993 | Grotstein |
| 5,257,701 A | 11/1993 | Edelson |
| 5,257,964 A | 11/1993 | Petters |
| 5,261,864 A | 11/1993 | Fitzpatrick |
| 5,269,736 A | 12/1993 | Roberts |
| 5,271,416 A | 12/1993 | Lepley |
| 5,273,285 A | 12/1993 | Long |
| 5,277,678 A | 1/1994 | Friedebach et al. |
| 5,279,528 A | 1/1994 | Dalebout et al. |
| 5,279,529 A | 1/1994 | Eschenbach |
| 5,279,531 A | 1/1994 | Jen Huey |

(56) References Cited

U.S. PATENT DOCUMENTS

| | | |
|---|---|---|
| 5,282,776 A | 2/1994 | Dalebout |
| 5,284,461 A | 2/1994 | Wilkinson et al. |
| 5,290,205 A | 3/1994 | Densmore et al. |
| 5,290,211 A | 3/1994 | Stearns |
| 5,292,293 A | 3/1994 | Schumacher |
| 5,295,928 A | 3/1994 | Rennex |
| 5,295,935 A | 3/1994 | Wang |
| 5,299,992 A | 4/1994 | Wilkinson |
| 5,299,993 A | 4/1994 | Habing |
| 5,302,162 A | 4/1994 | Pasero |
| 5,306,221 A | 4/1994 | Itaru |
| 5,308,075 A | 5/1994 | Theriault |
| 5,308,304 A | 5/1994 | Habing |
| 5,310,392 A | 5/1994 | Lo |
| 5,313,852 A | 5/1994 | Arena |
| 5,314,390 A | 5/1994 | Westing et al. |
| 5,314,391 A | 5/1994 | Potash et al. |
| 5,314,392 A | 5/1994 | Hawkins et al. |
| 5,314,394 A | 5/1994 | Ronan |
| 5,318,487 A | 6/1994 | Golen et al. |
| 5,320,343 A | 6/1994 | McKinney |
| 5,320,588 A | 6/1994 | Wanzer et al. |
| 5,320,591 A | 6/1994 | Harmon et al. |
| 5,324,242 A | 6/1994 | Lo |
| 5,328,420 A | 7/1994 | Allen |
| 5,328,422 A | 7/1994 | Nichols |
| 5,328,429 A | 7/1994 | Potash et al. |
| 5,330,401 A | 7/1994 | Walstead |
| 5,330,402 A | 7/1994 | Johnson |
| 5,334,120 A | 8/1994 | Rasmussen |
| 5,336,144 A | 8/1994 | Rodden |
| 5,336,145 A | 8/1994 | Keiser |
| 5,336,146 A | 8/1994 | Piaget et al. |
| 5,342,264 A | 8/1994 | Gordon |
| 5,342,271 A | 8/1994 | Long |
| RE34,728 E | 9/1994 | Hall-Tipping |
| 5,344,372 A | 9/1994 | Hung |
| 5,348,524 A | 9/1994 | Grant |
| 5,350,344 A | 9/1994 | Kissel |
| 5,352,166 A | 10/1994 | Chang |
| 5,352,167 A | 10/1994 | Ulicny |
| 5,352,169 A | 10/1994 | Eschenbach |
| 5,353,452 A | 10/1994 | Rulis |
| 5,354,248 A | 10/1994 | Rawls et al. |
| 5,354,251 A | 10/1994 | Sleamaker |
| 5,356,356 A | 10/1994 | Hildebrandt et al. |
| 5,358,461 A | 10/1994 | Bailey, Jr. |
| 5,359,986 A | 11/1994 | Magrath, III et al. |
| 5,362,069 A | 11/1994 | Hall-Tipping |
| 5,362,295 A | 11/1994 | Nurge |
| 5,364,327 A | 11/1994 | Graham |
| 5,368,532 A | 11/1994 | Farnet |
| 5,372,556 A | 12/1994 | Ropp |
| 5,372,559 A | 12/1994 | Dalebout et al. |
| 5,372,560 A | 12/1994 | Chang |
| 5,372,564 A | 12/1994 | Spirito |
| 5,374,227 A | 12/1994 | Webb |
| 5,378,212 A | 1/1995 | Pin-Kuo |
| 5,380,258 A | 1/1995 | Hawley, Jr. |
| 5,382,207 A | 1/1995 | Skowronski et al. |
| 5,382,208 A | 1/1995 | Hu |
| 5,382,209 A | 1/1995 | Pasier |
| 5,383,827 A | 1/1995 | Stern |
| 5,383,828 A | 1/1995 | Sands et al. |
| 5,385,346 A | 1/1995 | Carroll et al. |
| 5,385,519 A | 1/1995 | Hsu |
| 5,387,169 A | 2/1995 | Wang |
| 5,387,170 A | 2/1995 | Rawls et al. |
| 5,387,171 A | 2/1995 | Casey et al. |
| 5,394,922 A | 3/1995 | Colson et al. |
| 5,396,876 A | 3/1995 | Liscio et al. |
| 5,398,948 A | 3/1995 | Mathis |
| 5,401,226 A | 3/1995 | Stearns |
| 5,403,251 A | 4/1995 | Belsito et al. |
| 5,403,252 A | 4/1995 | Leon et al. |
| 5,403,253 A | 4/1995 | Gaylord |
| 5,403,254 A | 4/1995 | Lundin et al. |
| 5,403,255 A | 4/1995 | Johnston |
| 5,406,661 A | 4/1995 | Pekar |
| 5,407,403 A | 4/1995 | Coleman |
| 5,407,408 A | 4/1995 | Wilkinson |
| 5,409,435 A | 4/1995 | Daniels |
| RE34,959 E | 5/1995 | Potts |
| 5,410,971 A | 5/1995 | Golden et al. |
| 5,417,643 A | 5/1995 | Taylor |
| 5,419,570 A | 5/1995 | Bollotte |
| 5,419,571 A | 5/1995 | Vaughan |
| 5,419,751 A | 5/1995 | Byrd et al. |
| 5,423,729 A | 6/1995 | Eschenbach |
| 5,423,730 A | 6/1995 | Hirsch |
| 5,429,563 A | 7/1995 | Engel et al. |
| 5,429,569 A | 7/1995 | Gunnari |
| 5,431,612 A | 7/1995 | Holden |
| 5,433,679 A | 7/1995 | Szymczak et al. |
| 5,435,315 A | 7/1995 | McPhee et al. |
| 5,435,798 A | 7/1995 | Habing et al. |
| 5,441,467 A | 8/1995 | Stevens |
| 5,441,468 A | 8/1995 | Deckers et al. |
| 5,449,334 A | 9/1995 | Kingsbury |
| 5,454,772 A | 10/1995 | Rodden |
| 5,454,773 A | 10/1995 | Blanchard et al. |
| 5,460,586 A | 10/1995 | Wilkinson |
| 5,462,503 A | 10/1995 | Benjamin et al. |
| 5,462,504 A | 10/1995 | Trulaske et al. |
| 5,466,200 A | 11/1995 | Ulrich et al. |
| 5,466,203 A | 11/1995 | Chen |
| 5,470,298 A | 11/1995 | Curtis |
| 5,471,405 A | 11/1995 | Marsh |
| 5,474,087 A | 12/1995 | Nashner |
| 5,474,510 A | 12/1995 | Chen |
| 5,476,430 A | 12/1995 | Lee et al. |
| 5,484,358 A | 1/1996 | Wang et al. |
| 5,484,362 A | 1/1996 | Skowronski et al. |
| 5,487,707 A | 1/1996 | Sharf et al. |
| 5,489,249 A | 2/1996 | Brewer et al. |
| 5,489,250 A | 2/1996 | Densmore et al. |
| 5,490,818 A | 2/1996 | Haber et al. |
| 5,492,514 A | 2/1996 | Daum |
| 5,492,520 A | 2/1996 | Brown |
| 5,496,235 A | 3/1996 | Stevens |
| 5,496,236 A | 3/1996 | Buonauito |
| 5,496,238 A | 3/1996 | Taylor |
| 5,496,239 A | 3/1996 | Kallman |
| 5,499,956 A | 3/1996 | Habing et al. |
| 5,505,011 A | 4/1996 | Bleimhofer |
| 5,507,271 A | 4/1996 | Actor |
| 5,509,870 A | 4/1996 | Lloyd |
| 5,512,025 A | 4/1996 | Dalebout et al. |
| 5,512,029 A | 4/1996 | Barnard |
| 5,514,053 A | 5/1996 | Hawkins et al. |
| 5,518,471 A | 5/1996 | Hettinger et al. |
| 5,518,473 A | 5/1996 | Miller |
| 5,520,599 A | 5/1996 | Chen |
| 5,522,783 A | 6/1996 | Gordon |
| 5,527,245 A | 6/1996 | Dalebout et al. |
| 5,529,554 A | 6/1996 | Eschenbach |
| 5,531,658 A | 7/1996 | L. S. C. |
| 5,533,899 A | 7/1996 | Young |
| 5,533,948 A | 7/1996 | Wilkinson |
| 5,533,951 A | 7/1996 | Chang |
| 5,538,489 A | 7/1996 | Magid |
| 5,542,892 A | 8/1996 | Buhler |
| 5,545,112 A | 8/1996 | Densmore et al. |
| 5,549,052 A | 8/1996 | Hoffman |
| 5,549,536 A | 8/1996 | Clark |
| 5,551,934 A | 9/1996 | Binette |
| 5,551,937 A | 9/1996 | Kwo |
| 5,554,033 A | 9/1996 | Bizzi et al. |
| 5,554,083 A | 9/1996 | Chen |
| 5,556,362 A | 9/1996 | Whipps |
| 5,562,572 A | 10/1996 | Carmein |
| 5,562,574 A | 10/1996 | Miller |
| 5,563,487 A | 10/1996 | Davis |
| 5,568,993 A | 10/1996 | Potzick |

(56) References Cited

U.S. PATENT DOCUMENTS

| | | |
|---|---|---|
| 5,569,128 A | 10/1996 | Dalebout |
| 5,569,138 A | 10/1996 | Wang et al. |
| 5,573,485 A | 11/1996 | Geschwender |
| 5,575,740 A | 11/1996 | Piaget |
| 5,577,985 A | 11/1996 | Miller |
| 5,577,987 A | 11/1996 | Brown |
| 5,580,249 A | 12/1996 | Jacobsen et al. |
| 5,582,563 A | 12/1996 | Fan |
| 5,584,700 A | 12/1996 | Feldman et al. |
| 5,584,779 A | 12/1996 | Knecht |
| 5,585,561 A | 12/1996 | Bahl et al. |
| 5,586,736 A | 12/1996 | Mollet |
| 5,588,938 A | 12/1996 | Schneider et al. |
| 5,590,893 A | 1/1997 | Robinson et al. |
| 5,591,104 A | 1/1997 | Andrus et al. |
| 5,591,106 A | 1/1997 | Dalebout et al. |
| 5,591,107 A | 1/1997 | Rodgers, Jr. |
| 5,591,908 A | 1/1997 | Reid |
| 5,593,372 A | 1/1997 | Rodgers, Jr. |
| 5,593,380 A | 1/1997 | Bittikofer |
| 5,595,556 A | 1/1997 | Dalebout et al. |
| 5,599,261 A | 2/1997 | Easley et al. |
| 5,600,310 A | 2/1997 | Whipple, III et al. |
| 5,603,675 A | 2/1997 | Wu |
| 5,603,678 A | 2/1997 | Wilson |
| 5,607,375 A | 3/1997 | Dalebout |
| 5,613,216 A | 3/1997 | Galler |
| 5,613,856 A | 3/1997 | Hoover |
| 5,616,103 A | 4/1997 | Lee |
| 5,622,527 A | 4/1997 | Watterson et al. |
| 5,625,577 A | 4/1997 | Kunii et al. |
| 5,626,539 A | 5/1997 | Piaget |
| 5,630,566 A | 5/1997 | Case |
| 5,632,209 A | 5/1997 | Sakakibara |
| 5,634,870 A | 6/1997 | Wilkinson |
| 5,643,142 A | 7/1997 | Salerno et al. |
| 5,643,144 A | 7/1997 | Trulaske |
| 5,643,147 A | 7/1997 | Huang |
| 5,643,152 A | 7/1997 | Simonson |
| 5,643,153 A | 7/1997 | Nylen et al. |
| 5,645,509 A | 7/1997 | Brewer et al. |
| 5,645,914 A | 7/1997 | Horowitz |
| 5,649,882 A | 7/1997 | Parikh et al. |
| 5,650,709 A | 7/1997 | Rotunda et al. |
| 5,653,662 A | 8/1997 | Rodgers, Jr. |
| 5,655,997 A | 8/1997 | Greenberg et al. |
| 5,656,003 A | 8/1997 | Robinson et al. |
| 5,658,227 A | 8/1997 | Stearns |
| 5,662,557 A | 9/1997 | Watterson et al. |
| 5,665,031 A | 9/1997 | Hsieh |
| 5,665,033 A | 9/1997 | Palmer |
| 5,667,459 A | 9/1997 | Su |
| 5,669,833 A | 9/1997 | Stone |
| 5,669,857 A | 9/1997 | Watterson et al. |
| 5,669,865 A | 9/1997 | Gordon |
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,679,047 A | 10/1997 | Engel |
| 5,679,101 A | 10/1997 | Magid |
| 5,683,332 A | 11/1997 | Watterson et al. |
| 5,685,804 A | 11/1997 | Whan-Tong et al. |
| 5,688,209 A | 11/1997 | Trulaske et al. |
| 5,688,216 A | 11/1997 | Mauriello |
| 5,690,582 A | 11/1997 | Ulrich et al. |
| 5,690,587 A | 11/1997 | Gruenangerl |
| 5,690,589 A | 11/1997 | Rodgers, Jr. |
| 5,692,994 A | 12/1997 | Eschenbach |
| 5,695,436 A | 12/1997 | Huang |
| 5,702,325 A | 12/1997 | Watterson et al. |
| 5,704,879 A | 1/1998 | Watterson et al. |
| 5,707,319 A | 1/1998 | Riley |
| 5,708,355 A | 1/1998 | Schrey |
| 5,709,632 A | 1/1998 | Socwell |
| 5,709,633 A | 1/1998 | Sokol |
| 5,711,745 A | 1/1998 | Yang |
| 5,711,749 A | 1/1998 | Miller |
| 5,713,549 A | 2/1998 | Shieh |
| 5,713,821 A | 2/1998 | Nissen |
| 5,716,308 A | 2/1998 | Lee |
| 5,718,657 A | 2/1998 | Dalebout et al. |
| 5,718,660 A | 2/1998 | Chen |
| 5,720,200 A | 2/1998 | Anderson et al. |
| 5,720,474 A | 2/1998 | Sugiyama |
| 5,722,917 A | 3/1998 | Olschansky et al. |
| 5,722,920 A | 3/1998 | Bauer |
| 5,722,922 A | 3/1998 | Watterson et al. |
| 5,725,459 A | 3/1998 | Rexach |
| 5,730,236 A | 3/1998 | Miller et al. |
| 5,733,228 A | 3/1998 | Stevens |
| 5,733,229 A | 3/1998 | Dalebout et al. |
| 5,735,586 A | 4/1998 | Cheng |
| 5,735,773 A | 4/1998 | Vittone |
| 5,735,776 A | 4/1998 | Swezey |
| 5,738,612 A | 4/1998 | Tsuda |
| 5,741,205 A | 4/1998 | Doll et al. |
| 5,743,193 A | 4/1998 | Kakuta et al. |
| 5,743,832 A | 4/1998 | Sands et al. |
| 5,743,833 A | 4/1998 | Watterson et al. |
| 5,743,835 A | 4/1998 | Trotter |
| 5,746,682 A | 5/1998 | Hung |
| 5,749,372 A | 5/1998 | Allen |
| 5,749,787 A | 5/1998 | Jank |
| 5,749,807 A | 5/1998 | Webb |
| 5,749,809 A | 5/1998 | Lin |
| 5,749,813 A | 5/1998 | Domzalski |
| 5,752,879 A | 5/1998 | Berdut |
| 5,752,897 A | 5/1998 | Skowronski et al. |
| 5,755,642 A | 5/1998 | Miller |
| 5,755,645 A | 5/1998 | Miller et al. |
| 5,755,651 A | 5/1998 | Homyonfer |
| 5,759,136 A | 6/1998 | Chen |
| 5,760,353 A | 6/1998 | Rapp |
| 5,761,831 A | 6/1998 | Cho |
| 5,762,587 A | 6/1998 | Dalebout et al. |
| 5,762,588 A | 6/1998 | Chen |
| 5,769,759 A | 6/1998 | Alter |
| 5,771,152 A | 6/1998 | Crompton et al. |
| 5,772,522 A | 6/1998 | Nesbit |
| 5,772,558 A | 6/1998 | Rodgers, Jr. |
| 5,772,560 A | 6/1998 | Watterson et al. |
| 5,776,582 A | 7/1998 | Needham |
| 5,779,599 A | 7/1998 | Chen |
| 5,779,607 A | 7/1998 | Harris |
| 5,782,639 A | 7/1998 | Beal |
| 5,782,723 A | 7/1998 | Kuo |
| 5,785,630 A | 7/1998 | Bobick et al. |
| 5,788,609 A | 8/1998 | Miller |
| 5,788,610 A | 8/1998 | Eschenbach |
| 5,788,611 A | 8/1998 | Kuo |
| 5,792,027 A | 8/1998 | Gvoich |
| 5,792,031 A | 8/1998 | Alton |
| 5,795,270 A | 8/1998 | Woods et al. |
| 5,797,578 A | 8/1998 | Graffeo |
| 5,803,874 A | 9/1998 | Wilkinson |
| 5,803,877 A | 9/1998 | Franey |
| 5,803,882 A | 9/1998 | Habing et al. |
| 5,807,210 A | 9/1998 | Devlin |
| 5,810,696 A | 9/1998 | Webb |
| 5,810,697 A | 9/1998 | Joiner |
| 5,810,698 A | 9/1998 | Hullett et al. |
| 5,813,142 A | 9/1998 | Demon |
| 5,813,947 A | 9/1998 | Densmore |
| 5,813,953 A | 9/1998 | Whipple |
| 5,816,981 A | 10/1998 | Hung |
| 5,820,478 A | 10/1998 | Wood et al. |
| 5,823,618 A | 10/1998 | Fox et al. |
| 5,827,155 A | 10/1998 | Jensen et al. |
| 5,827,158 A | 10/1998 | Drecksel |
| 5,830,107 A | 11/1998 | Brigliadoro |
| 5,830,113 A | 11/1998 | Coody et al. |
| 5,830,114 A | 11/1998 | Halfen et al. |
| 5,833,577 A | 11/1998 | Hurt |

(56) References Cited

U.S. PATENT DOCUMENTS

| | | |
|---|---|---|
| 5,833,583 A | 11/1998 | Chuang |
| 5,833,584 A | 11/1998 | Piaget et al. |
| 5,833,587 A | 11/1998 | Strong et al. |
| 5,836,770 A | 11/1998 | Powers |
| 5,839,990 A | 11/1998 | Virkkala |
| 5,839,993 A | 11/1998 | Fox |
| 5,842,961 A | 12/1998 | Davis |
| 5,846,166 A | 12/1998 | Kuo |
| 5,848,954 A | 12/1998 | Stearns et al. |
| 5,852,264 A | 12/1998 | Muller |
| 5,855,537 A | 1/1999 | Coody et al. |
| 5,855,538 A | 1/1999 | Argabright |
| 5,857,939 A | 1/1999 | Kaufman |
| 5,857,940 A | 1/1999 | Husted |
| 5,857,941 A | 1/1999 | Maresh |
| 5,857,943 A | 1/1999 | Murray |
| 5,860,893 A | 1/1999 | Watterson et al. |
| 5,860,894 A | 1/1999 | Dalebout et al. |
| 5,860,899 A | 1/1999 | Rassman |
| 5,865,710 A | 2/1999 | Wilson-Hyde |
| 5,868,108 A | 2/1999 | Schmitz et al. |
| 5,868,648 A | 2/1999 | Coody et al. |
| 5,871,421 A | 2/1999 | Trulaske et al. |
| 5,876,095 A | 3/1999 | Johnston |
| 5,879,271 A | 3/1999 | Stearns et al. |
| 5,879,273 A | 3/1999 | Wei |
| 5,879,276 A | 3/1999 | Miller |
| 5,882,281 A | 3/1999 | Stearns et al. |
| 5,885,197 A | 3/1999 | Barton |
| 5,888,172 A | 3/1999 | Andrus et al. |
| 5,890,562 A | 4/1999 | Bartels et al. |
| 5,890,995 A | 4/1999 | Bobick et al. |
| 5,891,001 A | 4/1999 | Carnes et al. |
| 5,891,003 A | 4/1999 | Deac et al. |
| 5,895,339 A | 4/1999 | Maresh |
| 5,897,457 A | 4/1999 | Mackovjak |
| 5,897,459 A | 4/1999 | Habing et al. |
| 5,897,460 A | 4/1999 | McBride et al. |
| 5,897,461 A | 4/1999 | Socwell |
| 5,899,833 A | 5/1999 | Ryan et al. |
| 5,899,834 A | 5/1999 | Dalebout et al. |
| 5,902,214 A | 5/1999 | Makikawa et al. |
| 5,904,398 A | 5/1999 | Farricielli |
| 5,904,636 A | 5/1999 | Chen |
| 5,906,269 A | 5/1999 | Zabron et al. |
| 5,906,564 A | 5/1999 | Jacobsen |
| 5,910,070 A | 6/1999 | Henry et al. |
| 5,910,072 A | 6/1999 | Rawls et al. |
| 5,911,132 A | 6/1999 | Sloane |
| 5,913,751 A | 6/1999 | Eschenbach |
| 5,916,064 A | 6/1999 | Eschenbach |
| 5,916,069 A | 6/1999 | Wang |
| 5,917,692 A | 6/1999 | Schmitz et al. |
| 5,919,118 A | 7/1999 | Stearns |
| 5,921,892 A | 7/1999 | Easton |
| 5,921,896 A | 7/1999 | Boland |
| 5,925,001 A | 7/1999 | Hoyt et al. |
| 5,938,551 A | 8/1999 | Warner |
| 5,938,565 A | 8/1999 | Bernacki |
| 5,938,570 A | 8/1999 | Maresh |
| 5,938,571 A | 8/1999 | Stevens |
| 5,938,575 A | 8/1999 | Stearns |
| 5,940,502 A | 8/1999 | Hirai et al. |
| 5,940,911 A | 8/1999 | Wang |
| 5,941,807 A | 8/1999 | Cassidy |
| 5,943,794 A | 8/1999 | Gelsomini |
| 5,944,641 A | 8/1999 | Habing |
| 5,947,869 A | 9/1999 | Shea |
| 5,947,872 A | 9/1999 | Ryan et al. |
| 5,951,444 A | 9/1999 | Webber |
| 5,951,447 A | 9/1999 | Butler |
| 5,951,449 A | 9/1999 | Oppriecht |
| 5,957,814 A | 9/1999 | Eschenbach |
| 5,961,423 A | 10/1999 | Sellers |
| 5,961,430 A | 10/1999 | Zuckerman et al. |
| 5,967,944 A | 10/1999 | Vittone et al. |
| 5,967,954 A | 10/1999 | Habing |
| 5,967,955 A | 10/1999 | Westfall et al. |
| 5,971,902 A | 10/1999 | Robertson et al. |
| 5,976,039 A | 11/1999 | Epel et al. |
| 5,976,061 A | 11/1999 | Moon et al. |
| 5,980,430 A | 11/1999 | Wang |
| 5,980,432 A | 11/1999 | Ahman |
| 5,984,798 A | 11/1999 | Gilmour |
| 5,984,839 A | 11/1999 | Corkum |
| 5,989,161 A | 11/1999 | Wang et al. |
| 5,989,163 A | 11/1999 | Rodgers, Jr. |
| 5,989,168 A | 11/1999 | See |
| 5,991,143 A | 11/1999 | Wright et al. |
| 5,993,358 A | 11/1999 | Gureghian et al. |
| 5,993,359 A | 11/1999 | Eschenbach |
| 5,993,362 A | 11/1999 | Ghobadi |
| 5,997,447 A | 12/1999 | Giannelli et al. |
| 5,997,450 A | 12/1999 | Wilkinson |
| 6,003,481 A | 12/1999 | Pischinger et al. |
| 6,004,244 A | 12/1999 | Simonson |
| 6,006,379 A | 12/1999 | Hensley |
| 6,010,432 A | 1/2000 | Vawter |
| 6,012,591 A | 1/2000 | Brandenberg |
| 6,012,772 A | 1/2000 | Conde et al. |
| 6,013,011 A | 1/2000 | Moore et al. |
| 6,015,367 A | 1/2000 | Scaramucci |
| 6,015,368 A | 1/2000 | Clem |
| 6,027,429 A | 2/2000 | Daniels |
| 6,027,430 A | 2/2000 | Stearns et al. |
| 6,027,432 A | 2/2000 | Cheng |
| 6,029,858 A | 2/2000 | Srokose |
| 6,030,320 A | 2/2000 | Stearns |
| 6,030,321 A | 2/2000 | Fuentes |
| 6,030,323 A | 2/2000 | Fontenot |
| 6,033,344 A | 3/2000 | Trulaske et al. |
| 6,033,347 A | 3/2000 | Dalebout et al. |
| 6,033,350 A | 3/2000 | Krull |
| 6,036,622 A | 3/2000 | Gordon |
| 6,042,512 A | 3/2000 | Eschenbach |
| 6,042,514 A | 3/2000 | Abelbeck |
| 6,042,515 A | 3/2000 | Wang |
| 6,042,516 A | 3/2000 | Norton |
| 6,042,518 A | 3/2000 | Hildebrandt et al. |
| 6,042,523 A | 3/2000 | Graham |
| 6,045,487 A | 4/2000 | Miller |
| 6,045,488 A | 4/2000 | Eschenbach |
| 6,045,490 A | 4/2000 | Shafer |
| 6,045,491 A | 4/2000 | McNergney |
| 6,050,920 A | 4/2000 | Ehrenfried |
| 6,050,921 A | 4/2000 | Wang |
| 6,050,922 A | 4/2000 | Wang |
| 6,050,923 A | 4/2000 | Yu |
| 6,053,844 A | 4/2000 | Clem |
| 6,053,847 A | 4/2000 | Stearns et al. |
| 6,053,848 A | 4/2000 | Eschenbach |
| 6,055,747 A | 5/2000 | Lombardino |
| 6,056,678 A | 5/2000 | Giannelli et al. |
| 6,059,692 A | 5/2000 | Hickman |
| 6,059,695 A | 5/2000 | Hung |
| 6,063,009 A | 5/2000 | Stearns |
| 6,066,075 A | 5/2000 | Poulton |
| 6,068,578 A | 5/2000 | Wang |
| 6,068,579 A | 5/2000 | Killian et al. |
| 6,071,031 A | 6/2000 | Bailey |
| 6,071,216 A | 6/2000 | Giannelli et al. |
| 6,075,525 A | 6/2000 | Hsieh |
| 6,077,196 A | 6/2000 | Eschenbach |
| 6,077,198 A | 6/2000 | Eschenbach |
| 6,077,199 A | 6/2000 | Hsu |
| 6,077,200 A | 6/2000 | Lin |
| 6,080,091 A | 6/2000 | Habing et al. |
| 6,086,520 A | 7/2000 | Rodriquez |
| 6,090,014 A | 7/2000 | Eschenbach |
| 6,090,016 A | 7/2000 | Kuo |
| 6,095,951 A | 8/2000 | Skowronski et al. |
| 6,099,439 A | 8/2000 | Ryan et al. |
| 6,102,412 A | 8/2000 | Staffaroni |
| 6,102,832 A | 8/2000 | Tani |

(56) References Cited

U.S. PATENT DOCUMENTS

| | | | |
|---|---|---|---|
| 6,110,076 A | 8/2000 | Hurt |
| 6,110,077 A | 8/2000 | Yu |
| 6,113,188 A | 9/2000 | Stewart et al. |
| 6,113,522 A | 9/2000 | Montgomery |
| 6,117,049 A | 9/2000 | Lowe |
| 6,120,421 A | 9/2000 | Kuo |
| 6,123,646 A | 9/2000 | Colassi |
| 6,123,647 A | 9/2000 | Mitchell |
| 6,123,648 A | 9/2000 | Stevens |
| 6,123,649 A | 9/2000 | Lee |
| 6,123,650 A | 9/2000 | Birrell |
| 6,125,851 A | 10/2000 | Walker et al. |
| 6,126,574 A | 10/2000 | Stearns et al. |
| 6,126,575 A | 10/2000 | Wang |
| 6,126,576 A | 10/2000 | Wang |
| 6,129,962 A | 10/2000 | Quigley et al. |
| 6,132,340 A | 10/2000 | Wang |
| 6,135,924 A | 10/2000 | Gibbs et al. |
| 6,135,925 A | 10/2000 | Liu |
| 6,142,870 A | 11/2000 | Wada et al. |
| 6,142,913 A | 11/2000 | Ewert |
| 6,142,914 A | 11/2000 | Crawford et al. |
| 6,142,915 A | 11/2000 | Eschenbach |
| 6,146,313 A | 11/2000 | Whan-Tong et al. |
| 6,146,315 A | 11/2000 | Schonenberger |
| 6,149,551 A | 11/2000 | Pyles et al. |
| 6,149,552 A | 11/2000 | Chen |
| 6,152,856 A | 11/2000 | Studor et al. |
| 6,152,859 A | 11/2000 | Stearns |
| 6,162,183 A | 12/2000 | Hoover |
| 6,163,451 A | 12/2000 | Chiu |
| 6,165,107 A | 12/2000 | Birrell |
| 6,168,551 B1 | 1/2001 | Mcguinness |
| 6,171,216 B1 | 1/2001 | Wang |
| 6,174,267 B1 | 1/2001 | Dalebout |
| 6,174,268 B1 | 1/2001 | Novak |
| 6,176,814 B1 | 1/2001 | Ryan et al. |
| 6,179,753 B1 | 1/2001 | Barker et al. |
| 6,181,647 B1 | 1/2001 | Tipton et al. |
| 6,183,397 B1 | 2/2001 | Stearns et al. |
| 6,186,290 B1 | 2/2001 | Carlson |
| 6,186,460 B1 | 2/2001 | Lin |
| 6,186,929 B1 | 2/2001 | Endelman et al. |
| 6,189,846 B1 | 2/2001 | Wang |
| 6,190,289 B1 | 2/2001 | Pyles et al. |
| 6,193,635 B1 | 2/2001 | Webber et al. |
| 6,203,474 B1 | 3/2001 | Jones |
| 6,206,795 B1 | 3/2001 | Ou |
| 6,210,305 B1 | 4/2001 | Eschenbach |
| 6,213,919 B1 | 4/2001 | Wang |
| 6,215,870 B1 | 4/2001 | Hirai et al. |
| 6,217,487 B1 | 4/2001 | Reinert |
| 6,220,990 B1 | 4/2001 | Crivello |
| 6,220,995 B1 | 4/2001 | Chen |
| 6,224,516 B1 | 5/2001 | Disch |
| 6,224,519 B1 | 5/2001 | Doolittle |
| 6,230,047 B1 | 5/2001 | McHugh |
| 6,230,460 B1 | 5/2001 | Huyett |
| 6,231,482 B1 | 5/2001 | Thompson |
| 6,231,946 B1 | 5/2001 | Brown, Jr. et al. |
| 6,234,935 B1 | 5/2001 | Chu |
| 6,234,936 B1 | 5/2001 | Wang |
| 6,237,583 B1 | 5/2001 | Ripley et al. |
| 6,238,323 B1 | 5/2001 | Simonson |
| 6,241,638 B1 | 6/2001 | Hurt |
| 6,244,988 B1 | 6/2001 | Delman |
| 6,244,992 B1 | 6/2001 | James |
| 6,245,001 B1 | 6/2001 | Siaperas |
| 6,251,047 B1 | 6/2001 | Stearns et al. |
| 6,251,048 B1 | 6/2001 | Kaufman |
| 6,254,514 B1 | 7/2001 | Maresh et al. |
| 6,254,515 B1 | 7/2001 | Carman et al. |
| 6,261,209 B1 | 7/2001 | Coody |
| 6,264,586 B1 | 7/2001 | Webber |
| 6,267,710 B1 | 7/2001 | Liu |
| 6,273,842 B1 | 8/2001 | Wang |
| 6,273,843 B1 | 8/2001 | Lo |
| 6,276,749 B1 | 8/2001 | Okazawa et al. |
| 6,277,054 B1 | 8/2001 | Kuo |
| 6,277,056 B1 | 8/2001 | McBride et al. |
| 6,280,361 B1 | 8/2001 | Harvey et al. |
| 6,280,362 B1 | 8/2001 | Dalebout et al. |
| 6,280,367 B1 | 8/2001 | Arsenault |
| 6,282,816 B1 | 9/2001 | Rosendahl |
| 6,283,896 B1 | 9/2001 | Grunfeld |
| 6,287,240 B1 | 9/2001 | Trabbic |
| 6,293,375 B1 | 9/2001 | Chen |
| 6,299,959 B1 | 10/2001 | Squires et al. |
| 6,302,815 B1 | 10/2001 | Shishido et al. |
| 6,302,826 B1 | 10/2001 | Lee |
| 6,302,828 B1 | 10/2001 | Martin et al. |
| 6,302,829 B1 | 10/2001 | Schmidt |
| 6,302,830 B1 | 10/2001 | Stearns |
| 6,302,833 B1 | 10/2001 | Ellis et al. |
| 6,306,108 B1 | 10/2001 | Butler |
| 6,307,167 B1 | 10/2001 | Kajio et al. |
| 6,312,363 B1 | 11/2001 | Watterson et al. |
| 6,314,667 B1 | 11/2001 | Rife et al. |
| 6,315,486 B1 | 11/2001 | Lunz |
| 6,322,059 B1 | 11/2001 | Kelm et al. |
| 6,322,481 B1 | 11/2001 | Krull |
| 6,325,745 B1 | 12/2001 | Yu |
| 6,325,746 B1 | 12/2001 | Wang |
| 6,328,676 B1 | 12/2001 | Alessandri |
| 6,328,677 B1 | 12/2001 | Drapeau |
| 6,334,624 B1 | 1/2002 | Giglio |
| 6,344,986 B1 | 2/2002 | Jain et al. |
| 6,347,603 B1 | 2/2002 | Felger |
| 6,348,028 B1 | 2/2002 | Cragg |
| 6,350,218 B1 | 2/2002 | Dalebout et al. |
| 6,352,494 B2 | 3/2002 | McAlonan |
| 6,357,077 B1 | 3/2002 | Jones, Jr. et al. |
| 6,361,476 B1 | 3/2002 | Eschenbach |
| 6,368,252 B1 | 4/2002 | Stearns |
| 6,368,254 B1 | 4/2002 | Wall |
| 6,371,738 B2 | 4/2002 | Jones |
| 6,371,895 B1 | 4/2002 | Endelman et al. |
| 6,375,580 B1 | 4/2002 | Schmidt |
| 6,379,289 B1 | 4/2002 | Gossie |
| 6,382,627 B1 | 5/2002 | Lundberg |
| 6,383,120 B1 | 5/2002 | Lo |
| 6,387,015 B1 | 5/2002 | Watson |
| 6,387,016 B1 | 5/2002 | Lo |
| 6,390,953 B1 | 5/2002 | Maresh |
| 6,390,955 B1 | 5/2002 | Wang |
| 6,394,239 B1 | 5/2002 | Carlson |
| 6,397,797 B1 | 6/2002 | Kolmanovsky et al. |
| 6,398,695 B2 | 6/2002 | Miller |
| 6,402,666 B2 | 6/2002 | Krull |
| 6,409,632 B1 | 6/2002 | Eschenbach |
| 6,409,633 B1 | 6/2002 | Abelbeck |
| 6,413,197 B2 | 7/2002 | McKechnie et al. |
| 6,416,442 B1 | 7/2002 | Stearns et al. |
| 6,416,444 B1 | 7/2002 | Lim |
| 6,419,611 B1 | 7/2002 | Levine et al. |
| 6,422,976 B1 | 7/2002 | Eschenbach |
| 6,422,977 B1 | 7/2002 | Eschenbach |
| 6,422,983 B1 | 7/2002 | Weck |
| 6,428,449 B1 | 8/2002 | Apseloff |
| 6,430,997 B1 | 8/2002 | French et al. |
| 6,432,026 B1 | 8/2002 | Wang |
| 6,435,466 B1 | 8/2002 | Adams |
| 6,436,007 B1 | 8/2002 | Eschenbach |
| 6,436,008 B1 | 8/2002 | Skowronski et al. |
| 6,440,013 B1 | 8/2002 | Brown |
| 6,440,042 B2 | 8/2002 | Eschenbach |
| 6,443,875 B1 | 9/2002 | Golen, Jr. et al. |
| 6,447,424 B1 | 9/2002 | Ashby et al. |
| 6,447,430 B1 | 9/2002 | Webb et al. |
| 6,450,284 B1 | 9/2002 | Sakyo et al. |
| 6,450,922 B1 | 9/2002 | Henderson et al. |
| 6,450,923 B1 | 9/2002 | Vatti |
| 6,450,925 B1 | 9/2002 | Kuo |
| 6,454,679 B1 | 9/2002 | Radow |

(56) References Cited

U.S. PATENT DOCUMENTS

| | | |
|---|---|---|
| 6,454,682 B1 | 9/2002 | Kuo |
| 6,455,960 B1 | 9/2002 | Trago et al. |
| 6,458,060 B1 | 10/2002 | Watterson et al. |
| 6,461,275 B1 | 10/2002 | Wang et al. |
| 6,461,279 B1 | 10/2002 | Kuo |
| 6,466,460 B1 | 10/2002 | Rein et al. |
| 6,468,189 B2 | 10/2002 | Alessandri |
| 6,471,622 B1 | 10/2002 | Hammer et al. |
| 6,475,121 B2 | 11/2002 | Wang |
| 6,478,721 B1 | 11/2002 | Hunter |
| 6,482,128 B1 | 11/2002 | Michalow |
| 6,482,130 B1 | 11/2002 | Pasero et al. |
| 6,482,132 B2 | 11/2002 | Eschenbach |
| 6,485,397 B1 | 11/2002 | Manderbacka |
| 6,488,020 B1 | 12/2002 | Rosas-Magallan |
| 6,491,610 B1 | 12/2002 | Henn |
| 6,494,814 B1 | 12/2002 | Wang |
| 6,494,817 B2 | 12/2002 | Lake |
| 6,500,097 B1 | 12/2002 | Hall |
| 6,503,173 B2 | 1/2003 | Clem |
| 6,505,503 B1 | 1/2003 | Teresi et al. |
| 6,513,669 B2 | 2/2003 | Ozawa et al. |
| 6,514,180 B1 | 2/2003 | Rawls |
| 6,520,891 B1 | 2/2003 | Stephens, Jr. |
| 6,527,674 B1 | 3/2003 | Clem |
| 6,527,678 B1 | 3/2003 | Wang |
| 6,527,685 B2 | 3/2003 | Endelman et al. |
| 6,527,796 B1 | 3/2003 | Magovern |
| 6,530,864 B1 | 3/2003 | Parks |
| 6,533,707 B2 | 3/2003 | Wang |
| 6,537,184 B2 | 3/2003 | Kim |
| 6,539,931 B2 | 4/2003 | Trajkovic et al. |
| 6,543,247 B2 | 4/2003 | Strauss |
| 6,544,146 B1 | 4/2003 | Stearns et al. |
| 6,547,701 B1 | 4/2003 | Eschenbach |
| 6,547,702 B1 | 4/2003 | Heidecke |
| 6,551,218 B2 | 4/2003 | Goh |
| 6,551,223 B2 | 4/2003 | Cheng |
| 6,554,749 B2 | 4/2003 | Iund et al. |
| 6,558,301 B1 | 5/2003 | Jackson |
| 6,561,960 B2 | 5/2003 | Webber |
| 6,563,489 B1 | 5/2003 | Latypov et al. |
| 6,569,061 B2 | 5/2003 | Stearns et al. |
| 6,569,062 B2 | 5/2003 | Wang |
| 6,572,511 B1 | 6/2003 | Volpe |
| 6,572,512 B2 | 6/2003 | Anderson et al. |
| 6,572,513 B1 | 6/2003 | Whan-Tong et al. |
| 6,575,878 B1 | 6/2003 | Choy |
| 6,579,210 B1 | 6/2003 | Stearns et al. |
| 6,582,342 B2 | 6/2003 | Kaufman |
| 6,582,344 B2 | 6/2003 | Tang |
| 6,585,624 B1 | 7/2003 | Chen |
| 6,585,626 B2 | 7/2003 | McBride |
| 6,589,138 B2 | 7/2003 | Dyer et al. |
| 6,592,502 B1 | 7/2003 | Phillips |
| 6,599,223 B2 | 7/2003 | Wang |
| 6,601,016 B1 | 7/2003 | Brown et al. |
| 6,601,358 B2 | 8/2003 | Panatta |
| 6,601,825 B2 | 8/2003 | Bressner et al. |
| 6,604,008 B2 | 8/2003 | Chudley et al. |
| 6,605,020 B1 | 8/2003 | Huang |
| 6,609,478 B2 | 8/2003 | Del Valle |
| 6,610,063 B2 | 8/2003 | Kumar et al. |
| 6,612,969 B2 | 9/2003 | Eschenbach |
| 6,612,971 B1 | 9/2003 | Morris |
| 6,619,681 B2 | 9/2003 | Gutierrez |
| 6,620,079 B2 | 9/2003 | Kuo |
| 6,623,407 B2 | 9/2003 | Novak |
| 6,623,409 B1 | 9/2003 | Abelbeck |
| 6,626,799 B2 | 9/2003 | Watterson et al. |
| 6,626,802 B1 | 9/2003 | Rodgers, Jr. |
| 6,626,803 B1 | 9/2003 | Oglesby et al. |
| 6,629,902 B2 | 10/2003 | Murphy et al. |
| 6,629,909 B1 | 10/2003 | Stearns et al. |
| 6,629,910 B1 | 10/2003 | Krull |
| 6,632,161 B1 | 10/2003 | Nir |
| 6,634,996 B2 | 10/2003 | Jacobsen |
| 6,637,811 B2 | 10/2003 | Zheng |
| 6,637,818 B2 | 10/2003 | Williams |
| 6,645,125 B1 | 11/2003 | Stearns et al. |
| 6,645,126 B1 | 11/2003 | Martin et al. |
| 6,645,130 B2 | 11/2003 | Webber |
| 6,648,800 B2 | 11/2003 | Stearns et al. |
| 6,648,801 B2 | 11/2003 | Stearns et al. |
| 6,648,802 B2 | 11/2003 | Ware |
| 6,652,424 B2 | 11/2003 | Dalebout |
| 6,652,425 B1 | 11/2003 | Martin et al. |
| 6,652,429 B2 | 11/2003 | Bushnell |
| 6,660,949 B2 | 12/2003 | Kamino et al. |
| 6,663,127 B2 | 12/2003 | Miller |
| 6,663,498 B2 | 12/2003 | Stipan |
| 6,663,500 B2 | 12/2003 | Huang |
| 6,666,800 B2 | 12/2003 | Krull |
| 6,666,801 B1 | 12/2003 | Michalow |
| 6,668,678 B1 | 12/2003 | Baba et al. |
| 6,669,600 B2 | 12/2003 | Warner |
| 6,669,609 B2 | 12/2003 | Gerschefske et al. |
| 6,671,975 B2 | 1/2004 | Hennessey |
| 6,672,991 B2 | 1/2004 | O'Malley |
| 6,672,992 B1 | 1/2004 | Lo et al. |
| 6,672,994 B1 | 1/2004 | Stearns et al. |
| 6,676,530 B2 | 1/2004 | Lochtefeld |
| 6,676,572 B2 | 1/2004 | Wang |
| 6,676,579 B1 | 1/2004 | Lin |
| 6,679,816 B1 | 1/2004 | Krull |
| 6,679,820 B2 | 1/2004 | Barkus et al. |
| 6,681,704 B1 | 1/2004 | Brookhiser |
| 6,681,728 B2 | 1/2004 | Haghgooie |
| 6,682,460 B2 | 1/2004 | Lo |
| 6,682,461 B2 | 1/2004 | Wang |
| 6,685,601 B1 | 2/2004 | Knapp |
| 6,685,602 B2 | 2/2004 | Colosky, Jr. et al. |
| 6,685,607 B1 | 2/2004 | Olson |
| 6,689,019 B2 | 2/2004 | Ohrt et al. |
| 6,695,694 B2 | 2/2004 | Ishikawa et al. |
| 6,698,110 B1 | 3/2004 | Robbins |
| 6,699,159 B2 | 3/2004 | Rouse |
| 6,699,162 B2 | 3/2004 | Chen |
| 6,702,719 B1 | 3/2004 | Brown et al. |
| 6,705,977 B1 | 3/2004 | Ziak |
| 6,708,427 B2 | 3/2004 | Sussmann et al. |
| 6,712,737 B1 | 3/2004 | Nusbaum |
| 6,716,142 B2 | 4/2004 | Kuo |
| 6,716,144 B1 | 4/2004 | Shifferaw |
| 6,719,667 B2 | 4/2004 | Wong et al. |
| 6,719,669 B1 | 4/2004 | Wang |
| 6,723,413 B2 | 4/2004 | Walters |
| 6,726,600 B2 | 4/2004 | Miller |
| 6,726,601 B1 | 4/2004 | Beutel |
| 6,726,602 B2 | 4/2004 | Chang |
| 6,730,002 B2 | 5/2004 | Hald et al. |
| 6,733,423 B1 | 5/2004 | Chang |
| 6,733,424 B2 | 5/2004 | Krull |
| 6,736,360 B1 | 5/2004 | Buczek |
| 6,738,274 B2 | 5/2004 | Prasad et al. |
| 6,740,009 B1 | 5/2004 | Hall |
| 6,741,052 B2 | 5/2004 | Fitzgibbon |
| 6,743,153 B2 | 6/2004 | Watterson et al. |
| 6,746,371 B1 | 6/2004 | Brown et al. |
| 6,749,540 B1 | 6/2004 | Pasero et al. |
| 6,749,542 B2 | 6/2004 | Wu |
| 6,758,790 B1 | 7/2004 | Ellis |
| 6,758,791 B1 | 7/2004 | Kuo |
| 6,758,792 B1 | 7/2004 | Chang |
| 6,761,387 B2 | 7/2004 | Sloss |
| 6,761,667 B1 | 7/2004 | Cutler et al. |
| 6,764,429 B1 | 7/2004 | Michalow |
| 6,764,430 B1 | 7/2004 | Fencel |
| 6,764,431 B2 | 7/2004 | Yoss |
| 6,765,726 B2 | 7/2004 | French et al. |
| 6,767,314 B2 | 7/2004 | Thompson |
| 6,770,015 B2 | 8/2004 | Simonson |
| 6,776,740 B1 | 8/2004 | Anderson et al. |
| 6,778,938 B1 | 8/2004 | Ng et al. |

(56) References Cited

U.S. PATENT DOCUMENTS

| | | |
|---|---|---|
| 6,783,482 B2 | 8/2004 | Oglesby et al. |
| 6,786,821 B2 | 9/2004 | Nobe et al. |
| 6,786,847 B1 | 9/2004 | Morgan et al. |
| 6,786,848 B2 | 9/2004 | Yamashita et al. |
| 6,786,850 B2 | 9/2004 | Nizamuddin |
| 6,786,852 B2 | 9/2004 | Watterson et al. |
| 6,790,162 B1 | 9/2004 | Ellis et al. |
| 6,793,607 B2 | 9/2004 | Neil |
| 6,793,609 B1 | 9/2004 | Fan |
| 6,796,159 B2 | 9/2004 | Kelm et al. |
| 6,796,927 B2 | 9/2004 | Toyama |
| 6,808,458 B1 | 10/2004 | Jung |
| 6,808,475 B2 | 10/2004 | Kehrbaum |
| 6,811,519 B2 | 11/2004 | Kuo |
| 6,811,520 B2 | 11/2004 | Wu |
| 6,817,117 B1 | 11/2004 | Campbell |
| 6,817,968 B2 | 11/2004 | Galbraith et al. |
| 6,821,230 B2 | 11/2004 | Dalebout et al. |
| 6,824,210 B2 | 11/2004 | Zheng |
| 6,824,502 B1 | 11/2004 | Huang |
| 6,830,540 B2 | 12/2004 | Watterson |
| 6,830,541 B2 | 12/2004 | Wu |
| 6,835,166 B1 | 12/2004 | Stearns et al. |
| 6,837,829 B2 | 1/2005 | Eschenbach |
| 6,837,830 B2 | 1/2005 | Eldridge |
| 6,837,838 B2 | 1/2005 | List |
| 6,840,892 B1 | 1/2005 | Wu |
| 6,843,732 B1 | 1/2005 | Huang |
| 6,846,272 B2 | 1/2005 | Rosenow et al. |
| 6,849,032 B2 | 2/2005 | Chu |
| 6,852,068 B2 | 2/2005 | Ogawa |
| 6,855,093 B2 | 2/2005 | Anderson et al. |
| 6,855,097 B2 | 2/2005 | Krull |
| 6,857,993 B2 | 2/2005 | Yeh |
| 6,860,836 B1 | 3/2005 | Wu |
| 6,860,839 B1 | 3/2005 | Dice |
| 6,872,168 B2 | 3/2005 | Wang et al. |
| 6,872,175 B2 | 3/2005 | Lin |
| 6,875,157 B1 | 4/2005 | Wang |
| 6,875,160 B2 | 4/2005 | Watterson et al. |
| 6,878,101 B2 | 4/2005 | Colley |
| 6,880,487 B2 | 4/2005 | Reinkensmeyer et al. |
| 6,881,176 B2 | 4/2005 | Oishi et al. |
| 6,887,185 B1 | 5/2005 | Kuo |
| 6,887,190 B1 | 5/2005 | Azari |
| 6,893,383 B1 | 5/2005 | Chang et al. |
| 6,896,645 B1 | 5/2005 | Krull |
| 6,899,657 B2 | 5/2005 | Chuang |
| 6,899,659 B2 | 5/2005 | Anderson et al. |
| 6,902,513 B1 | 6/2005 | Mcclure |
| 6,902,515 B2 | 6/2005 | Howell et al. |
| 6,905,446 B2 | 6/2005 | Greenland |
| 6,908,416 B2 | 6/2005 | Mercado et al. |
| 6,908,417 B2 | 6/2005 | Jackson |
| 6,913,562 B2 | 7/2005 | Chen |
| 6,913,563 B2 | 7/2005 | Chen |
| 6,916,278 B2 | 7/2005 | Webber |
| 6,918,858 B2 | 7/2005 | Watterson et al. |
| 6,918,859 B1 | 7/2005 | Yeh |
| 6,918,860 B1 | 7/2005 | Nusbaum |
| 6,921,354 B1 | 7/2005 | Shifferaw |
| 6,921,355 B2 | 7/2005 | Campanaro et al. |
| 6,923,746 B1 | 8/2005 | Skowronski et al. |
| 6,923,747 B1 | 8/2005 | Chu |
| 6,926,644 B2 | 8/2005 | Chen |
| 6,926,646 B1 | 8/2005 | Nguyen |
| 6,932,745 B1 | 8/2005 | Ellis |
| 6,939,271 B1 | 9/2005 | Whan-Tong et al. |
| 6,944,294 B2 | 9/2005 | Tsay |
| 6,945,912 B2 | 9/2005 | Levi |
| 6,945,917 B1 | 9/2005 | Baatz |
| 6,949,053 B1 | 9/2005 | Stearns |
| 6,949,054 B1 | 9/2005 | Stearns |
| 6,953,418 B1 | 10/2005 | Chen |
| 6,953,424 B2 | 10/2005 | Kusumoto et al. |
| 6,964,632 B1 | 11/2005 | Ko |
| 6,966,872 B2 | 11/2005 | Eschenbach |
| 6,974,404 B1 | 12/2005 | Watterson et al. |
| 6,976,698 B2 | 12/2005 | Kuiken |
| 6,979,283 B2 | 12/2005 | Pan |
| 6,991,588 B1 | 1/2006 | Adams |
| 6,994,306 B1 | 2/2006 | Sweere et al. |
| 6,994,657 B1 | 2/2006 | Eschenbach |
| 6,997,852 B2 | 2/2006 | Watterson et al. |
| 6,997,856 B1 | 2/2006 | Krull |
| 7,001,288 B2 | 2/2006 | Harrell |
| 7,003,122 B2 | 2/2006 | Chen |
| 7,004,271 B1 | 2/2006 | Kamen et al. |
| 7,004,887 B2 | 2/2006 | Pan et al. |
| 7,004,888 B1 | 2/2006 | Weng |
| 7,008,359 B2 | 3/2006 | Fan et al. |
| 7,011,326 B1 | 3/2006 | Schroeder et al. |
| 7,011,607 B2 | 3/2006 | Kolda et al. |
| 7,011,609 B1 | 3/2006 | Kuo |
| 7,022,048 B1 | 4/2006 | Fernandez |
| 7,022,049 B2 | 4/2006 | Ryan et al. |
| 7,022,051 B2 | 4/2006 | Ota |
| 7,032,870 B2 | 4/2006 | Sweere et al. |
| 7,033,176 B2 | 4/2006 | Feldman |
| 7,033,306 B2 | 4/2006 | Graber |
| 7,039,263 B2 | 5/2006 | Towle |
| 7,041,034 B1 | 5/2006 | Stearns et al. |
| 7,041,038 B2 | 5/2006 | Smith |
| 7,041,041 B1 | 5/2006 | Evans |
| 7,044,891 B1 | 5/2006 | Rivera |
| 7,052,426 B2 | 5/2006 | Battat et al. |
| 7,052,440 B2 | 5/2006 | Pyles et al. |
| 7,052,444 B2 | 5/2006 | Webber |
| 7,052,446 B2 | 5/2006 | Morris et al. |
| 7,055,899 B2 | 6/2006 | Zhurong et al. |
| 7,060,005 B2 | 6/2006 | Carlsen et al. |
| 7,060,006 B1 | 6/2006 | Watterson et al. |
| 7,070,542 B2 | 7/2006 | Reyes et al. |
| 7,070,545 B2 | 7/2006 | Lull et al. |
| 7,073,852 B1 | 7/2006 | Zheng |
| 7,077,788 B2 | 7/2006 | Chang |
| 7,077,791 B2 | 7/2006 | Krull |
| 7,081,073 B1 | 7/2006 | Smith |
| 7,082,703 B2 | 8/2006 | Greene et al. |
| 7,086,994 B2 | 8/2006 | Turak et al. |
| 7,090,621 B2 | 8/2006 | Loane |
| 7,090,622 B2 | 8/2006 | Hetrick |
| 7,097,591 B2 | 8/2006 | Moon |
| 7,097,593 B2 | 8/2006 | Chang |
| 7,100,517 B1 | 9/2006 | Godwin |
| 7,101,319 B1 | 9/2006 | Potts |
| 7,101,322 B2 | 9/2006 | Carle |
| 7,101,330 B2 | 9/2006 | Elbaz et al. |
| 7,104,926 B2 | 9/2006 | Carlson |
| 7,104,937 B2 | 9/2006 | Arbuckle |
| 7,108,641 B2 | 9/2006 | Pertegaz-Esteban |
| 7,108,659 B2 | 9/2006 | Ross et al. |
| 7,115,073 B2 | 10/2006 | Nizamuddin |
| 7,125,371 B2 | 10/2006 | Henderson |
| 7,132,939 B2 | 11/2006 | Tyndall et al. |
| 7,140,626 B1 | 11/2006 | Keay |
| 7,141,008 B2 | 11/2006 | Krull et al. |
| 7,156,776 B2 | 1/2007 | Maser |
| 7,163,493 B1 | 1/2007 | Kuo |
| 7,163,498 B1 | 1/2007 | Abelbeck |
| 7,163,500 B2 | 1/2007 | Endelman et al. |
| 7,166,062 B1 | 1/2007 | Watterson et al. |
| 7,166,064 B2 | 1/2007 | Watterson et al. |
| 7,166,067 B2 | 1/2007 | Talish et al. |
| 7,168,668 B2 | 1/2007 | Coyle |
| 7,169,087 B2 | 1/2007 | Ercanbrack et al. |
| 7,169,088 B2 | 1/2007 | Rodgers, Jr. |
| 7,172,531 B2 | 2/2007 | Rodgers, Jr. |
| 7,175,193 B2 | 2/2007 | Wu |
| 7,179,207 B2 | 2/2007 | Gerschefske |
| 7,179,208 B1 | 2/2007 | Nalley |
| 7,179,209 B2 | 2/2007 | Sechrest et al. |
| 7,186,189 B2 | 3/2007 | Huang |
| 7,192,387 B2 | 3/2007 | Mendel |

(56) References Cited

U.S. PATENT DOCUMENTS

| | | | |
|---|---|---|---|
| 7,192,388 | B2 | 3/2007 | Dalebout et al. |
| 7,195,568 | B2 | 3/2007 | Huang |
| 7,201,705 | B2 | 4/2007 | Rodgers, Jr. |
| 7,201,707 | B1 | 4/2007 | Moon |
| 7,204,328 | B2 | 4/2007 | LoPresti |
| 7,211,029 | B2 | 5/2007 | Kau |
| 7,217,224 | B2 | 5/2007 | Thomas |
| 7,217,225 | B2 | 5/2007 | Husted et al. |
| 7,220,219 | B2 | 5/2007 | Papadopoulos et al. |
| 7,220,221 | B2 | 5/2007 | Mosimann et al. |
| 7,223,209 | B2 | 5/2007 | Lee |
| 7,223,216 | B1 | 5/2007 | McBride |
| 7,225,694 | B2 | 6/2007 | Said |
| 7,226,402 | B1 | 6/2007 | Joya |
| 7,235,942 | B2 | 6/2007 | Nagaoka et al. |
| 7,238,147 | B2 | 7/2007 | Mills et al. |
| 7,247,128 | B2 | 7/2007 | Oga |
| 7,250,022 | B2 | 7/2007 | Dalebout |
| 7,257,468 | B1 | 8/2007 | Costa et al. |
| 7,258,651 | B2 | 8/2007 | Clarke |
| 7,264,554 | B2 | 9/2007 | Bentley |
| 7,269,038 | B2 | 9/2007 | Shekhawat |
| 7,278,934 | B2 | 10/2007 | McBride et al. |
| 7,278,955 | B2 | 10/2007 | Giannelli et al. |
| 7,278,966 | B2 | 10/2007 | Hjelt et al. |
| 7,279,868 | B2 | 10/2007 | Lanni |
| 7,285,075 | B2 | 10/2007 | Cutler et al. |
| 7,287,770 | B2 | 10/2007 | Drabant et al. |
| 7,290,760 | B1 | 11/2007 | Lindsay |
| 7,291,096 | B2 | 11/2007 | Ho |
| 7,292,151 | B2 | 11/2007 | Ferguson |
| 7,293,510 | B1 | 11/2007 | Siao |
| 7,294,094 | B1 | 11/2007 | Howle |
| 7,294,100 | B2 | 11/2007 | Bull |
| 7,303,508 | B2 | 12/2007 | Toyama et al. |
| 7,303,510 | B2 | 12/2007 | Gebhardt |
| 7,311,640 | B2 | 12/2007 | Baatz |
| 7,316,633 | B2 | 1/2008 | Liao et al. |
| 7,319,457 | B2 | 1/2008 | Lin et al. |
| 7,322,907 | B2 | 1/2008 | Bowser |
| 7,334,350 | B2 | 2/2008 | Ellis, III |
| 7,335,139 | B2 | 2/2008 | Bartholomew et al. |
| 7,335,140 | B2 | 2/2008 | Webber et al. |
| 7,335,147 | B2 | 2/2008 | Jones |
| 7,344,481 | B2 | 3/2008 | Watterson et al. |
| 7,346,935 | B1 | 3/2008 | Patterson |
| 7,347,806 | B2 | 3/2008 | Nakano et al. |
| 7,351,187 | B2 | 4/2008 | Seliber |
| 7,352,365 | B2 | 4/2008 | Trachte |
| 7,354,380 | B2 | 4/2008 | Volpe, Jr. |
| 7,357,758 | B2 | 4/2008 | Polk, III |
| 7,359,121 | B2 | 4/2008 | French et al. |
| 7,361,125 | B2 | 4/2008 | Webber et al. |
| 7,364,538 | B2 | 4/2008 | Aucamp |
| 7,366,921 | B2 | 4/2008 | Ranganathan |
| 7,367,926 | B2 | 5/2008 | Clark |
| 7,369,121 | B2 | 5/2008 | Lane |
| 7,374,522 | B2 | 5/2008 | Arnold |
| 7,377,881 | B2 | 5/2008 | Moon |
| 7,384,013 | B2 | 6/2008 | Yen |
| 7,393,308 | B1 | 7/2008 | Huang |
| 7,402,145 | B1 | 7/2008 | Woggon |
| 7,413,532 | B1 | 8/2008 | Monsrud et al. |
| 7,425,189 | B2 | 9/2008 | Eschenbach |
| 7,428,760 | B2 | 9/2008 | McCrimmon |
| 7,429,236 | B2 | 9/2008 | Dalebout et al. |
| 7,432,677 | B2 | 10/2008 | Heydt et al. |
| 7,435,202 | B2 | 10/2008 | Daly et al. |
| 7,435,205 | B2 | 10/2008 | Reyes et al. |
| 7,455,621 | B1 | 11/2008 | Anthony |
| 7,455,626 | B2 | 11/2008 | Trevino et al. |
| 7,455,628 | B1 | 11/2008 | Stearns |
| 7,470,234 | B1 | 12/2008 | Elhag et al. |
| 7,475,613 | B2 | 1/2009 | Bailey |
| 7,488,277 | B1 | 2/2009 | Knapp |
| 7,494,450 | B2 | 2/2009 | Solomon |
| 7,497,784 | B2 | 3/2009 | Henry |
| 7,507,187 | B2 | 3/2009 | Dyer et al. |
| 7,507,189 | B2 | 3/2009 | Krull |
| 7,510,511 | B2 | 3/2009 | Von Detten |
| 7,517,303 | B2 | 4/2009 | Crawford et al. |
| 7,520,840 | B2 | 4/2009 | Shifferaw |
| 7,524,272 | B2 | 4/2009 | Bruck et al. |
| 7,525,293 | B1 | 4/2009 | Notohamiprodjo et al. |
| 7,537,546 | B2 | 5/2009 | Watterson et al. |
| 7,537,549 | B2 | 5/2009 | Nelson et al. |
| 7,537,550 | B1 | 5/2009 | Krull |
| 7,540,828 | B2 | 6/2009 | Watterson et al. |
| 7,540,829 | B1 | 6/2009 | Lin |
| 7,544,153 | B2 | 6/2009 | Trevino et al. |
| 7,553,260 | B2 | 6/2009 | Piaget et al. |
| 7,553,262 | B2 | 6/2009 | Piane, Jr. |
| 7,556,590 | B2 | 7/2009 | Watterson et al. |
| 7,556,591 | B2 | 7/2009 | Chuang |
| 7,559,879 | B2 | 7/2009 | Anderson et al. |
| 7,563,203 | B2 | 7/2009 | Dalebout et al. |
| 7,563,205 | B2 | 7/2009 | Alling |
| 7,569,000 | B2 | 8/2009 | Wang |
| 7,569,004 | B2 | 8/2009 | Kolomeir |
| 7,575,537 | B2 | 8/2009 | Ellis |
| 7,585,251 | B2 | 9/2009 | Doody, Jr. et al. |
| 7,585,254 | B1 | 9/2009 | Vittone |
| 7,585,258 | B2 | 9/2009 | Watson et al. |
| 7,591,770 | B2 | 9/2009 | Lin et al. |
| 7,591,795 | B2 | 9/2009 | Whalen et al. |
| 7,594,877 | B2 | 9/2009 | Anderson et al. |
| 7,594,878 | B1 | 9/2009 | Joannou |
| 7,601,101 | B2 | 10/2009 | Jackson et al. |
| 7,602,301 | B1 | 10/2009 | Stirling et al. |
| 7,604,571 | B2 | 10/2009 | Wilkins |
| 7,604,572 | B2 | 10/2009 | Stanford |
| 7,604,573 | B2 | 10/2009 | Dalebout et al. |
| 7,608,015 | B2 | 10/2009 | Radow |
| 7,608,021 | B1 | 10/2009 | Nalley |
| 7,608,023 | B2 | 10/2009 | Casagrande |
| 7,614,639 | B2 | 11/2009 | Tholkes et al. |
| 7,614,981 | B2 | 11/2009 | Cao |
| 7,618,346 | B2 | 11/2009 | Crawford et al. |
| 7,618,350 | B2 | 11/2009 | Dalebout et al. |
| 7,621,850 | B2 | 11/2009 | Piaget et al. |
| 7,621,855 | B1 | 11/2009 | Krull |
| 7,625,314 | B2 | 12/2009 | Ungari |
| 7,628,730 | B1 | 12/2009 | Watterson et al. |
| 7,628,732 | B1 | 12/2009 | Porszasz et al. |
| 7,637,847 | B1 | 12/2009 | Hickman |
| 7,637,850 | B2 | 12/2009 | Lin |
| 7,639,520 | B1 | 12/2009 | Zansky et al. |
| 7,645,212 | B2 | 1/2010 | Ashby et al. |
| 7,645,214 | B2 | 1/2010 | Lull |
| 7,645,218 | B2 | 1/2010 | Potok et al. |
| 7,647,196 | B2 | 1/2010 | Kahn et al. |
| 7,648,446 | B2 | 1/2010 | Chiles et al. |
| 7,651,442 | B2 | 1/2010 | Carlson |
| 7,654,229 | B2 | 2/2010 | Smith |
| 7,658,694 | B2 | 2/2010 | Ungari |
| 7,658,695 | B1 | 2/2010 | Amsbury et al. |
| 7,658,698 | B2 | 2/2010 | Pacheco et al. |
| 7,670,263 | B2 | 3/2010 | Ellis |
| 7,674,205 | B2 | 3/2010 | Dalebout et al. |
| 7,674,206 | B2 | 3/2010 | Jones |
| 7,677,518 | B2 | 3/2010 | Chouinard et al. |
| 7,682,286 | B2 | 3/2010 | Badarneh et al. |
| 7,682,287 | B1 | 3/2010 | Hsieh |
| 7,682,290 | B2 | 3/2010 | Liao et al. |
| 7,682,291 | B2 | 3/2010 | Gill et al. |
| 7,690,556 | B1 | 4/2010 | Kahn et al. |
| 7,695,409 | B2 | 4/2010 | Helie et al. |
| 7,704,191 | B2 | 4/2010 | Smith et al. |
| 7,704,192 | B2 | 4/2010 | Dyer et al. |
| 7,708,668 | B2 | 5/2010 | Rodgers, Jr. |
| 7,708,672 | B2 | 5/2010 | Gibson et al. |
| 7,713,172 | B2 | 5/2010 | Watterson et al. |
| 7,713,177 | B2 | 5/2010 | Lo |
| 7,717,826 | B2 | 5/2010 | Cox et al. |

(56) References Cited

U.S. PATENT DOCUMENTS

| | | |
|---|---|---|
| 7,717,827 B2 | 5/2010 | Kurunmäki et al. |
| 7,717,828 B2 | 5/2010 | Simonson et al. |
| 7,717,830 B1 | 5/2010 | Charniga et al. |
| 7,722,503 B1 | 5/2010 | Smith et al. |
| 7,722,509 B2 | 5/2010 | Eder |
| 7,731,634 B2 | 6/2010 | Stewart et al. |
| 7,736,272 B2 | 6/2010 | Martens |
| 7,736,273 B2 | 6/2010 | Cox et al. |
| 7,736,279 B2 | 6/2010 | Dalebout et al. |
| 7,736,280 B2 | 6/2010 | Weier et al. |
| 7,736,281 B2 | 6/2010 | Corbalis et al. |
| 7,740,563 B2 | 6/2010 | Dalebout et al. |
| 7,745,716 B1 | 6/2010 | Murphy |
| 7,749,137 B2 | 7/2010 | Watt et al. |
| 7,753,830 B1 | 7/2010 | Marsh et al. |
| 7,753,861 B1 | 7/2010 | Kahn et al. |
| 7,758,469 B2 | 7/2010 | Dyer et al. |
| 7,762,952 B2 | 7/2010 | Lee et al. |
| 7,766,797 B2 | 8/2010 | Dalebout |
| 7,771,319 B1 | 8/2010 | Lannon |
| 7,771,320 B2 | 8/2010 | Riley et al. |
| 7,771,329 B2 | 8/2010 | Dalebout et al. |
| 7,775,128 B2 | 8/2010 | Roessingh et al. |
| 7,775,936 B2 | 8/2010 | Wilkinson |
| 7,775,943 B2 | 8/2010 | Vittone |
| 7,780,578 B2 | 8/2010 | Packham |
| 7,789,800 B1 | 9/2010 | Watterson et al. |
| 7,794,363 B2 | 9/2010 | Wang |
| 7,795,824 B2 | 9/2010 | Shen et al. |
| 7,806,780 B1 | 10/2010 | Plunkett |
| 7,806,805 B2 | 10/2010 | Barufka et al. |
| 7,811,209 B2 | 10/2010 | Crawford et al. |
| 7,815,550 B2 | 10/2010 | Watterson et al. |
| 7,815,554 B2 | 10/2010 | Gibson et al. |
| 7,837,161 B2 | 11/2010 | Chase |
| 7,837,595 B2 | 11/2010 | Rice |
| 7,839,058 B1 | 11/2010 | Churchill et al. |
| 7,846,070 B2 | 12/2010 | Oglesby et al. |
| 7,854,669 B2 | 12/2010 | Marty et al. |
| 7,862,483 B2 | 1/2011 | Hendrickson et al. |
| 7,871,355 B2 | 1/2011 | Yeh |
| 7,871,357 B2 | 1/2011 | Gibson et al. |
| 7,878,950 B1 | 2/2011 | Bastian |
| 7,883,448 B2 | 2/2011 | Wang |
| 7,887,465 B2 | 2/2011 | Uffelman |
| 7,892,148 B1 | 2/2011 | Stauffer et al. |
| 7,892,149 B2 | 2/2011 | Wu |
| 7,892,150 B1 | 2/2011 | Colley |
| 7,901,325 B2 | 3/2011 | Henderson |
| 7,908,981 B2 | 3/2011 | Agee |
| 7,914,420 B2 | 3/2011 | Daly et al. |
| 7,914,421 B2 | 3/2011 | Weier et al. |
| 7,919,950 B2 | 4/2011 | Uno et al. |
| 7,922,635 B2 | 4/2011 | Lull et al. |
| 7,927,253 B2 | 4/2011 | Vincent |
| 7,931,563 B2 | 4/2011 | Shaw et al. |
| 7,938,751 B2 | 5/2011 | Nicolas et al. |
| 7,938,755 B1 | 5/2011 | Dyer et al. |
| 7,942,783 B2 | 5/2011 | Ochi |
| 7,942,788 B2 | 5/2011 | Wu |
| 7,946,968 B2 | 5/2011 | Kjellberg |
| 7,949,295 B2 | 5/2011 | Kumar et al. |
| 7,951,046 B1 | 5/2011 | Barber, Jr. |
| 7,959,124 B2 | 6/2011 | Phifer et al. |
| 7,972,249 B1 | 7/2011 | Napalan |
| 7,976,437 B1 | 7/2011 | Von Detten |
| 7,978,081 B2 | 7/2011 | Shears et al. |
| 7,985,164 B2 | 7/2011 | Ashby |
| 7,988,600 B2 | 8/2011 | Rodgers, Jr. |
| 8,001,472 B2 | 8/2011 | Gilley et al. |
| 8,002,674 B2 | 8/2011 | Piaget et al. |
| 8,002,684 B2 | 8/2011 | Laurent |
| 8,007,409 B2 | 8/2011 | Elllis |
| 8,012,067 B2 | 9/2011 | Joannou |
| 8,012,068 B1 | 9/2011 | Malcolm |
| 8,029,415 B2 | 10/2011 | Ashby et al. |
| 8,043,173 B2 | 10/2011 | Menalagha et al. |
| 8,047,965 B2 | 11/2011 | Shea |
| 8,047,966 B2 | 11/2011 | Dorogusker et al. |
| 8,047,970 B2 | 11/2011 | Nalley |
| 8,055,469 B2 | 11/2011 | Kulach et al. |
| 8,057,368 B1 | 11/2011 | Lyszczarz |
| 8,062,196 B1 | 11/2011 | Khubani |
| 8,066,514 B2 | 11/2011 | Clarke |
| 8,079,939 B1 | 12/2011 | Wang |
| 8,082,029 B2 | 12/2011 | Honda |
| 8,083,693 B1 | 12/2011 | McKeon et al. |
| 8,103,379 B2 | 1/2012 | Biba et al. |
| 8,104,411 B2 | 1/2012 | Fenton |
| 8,105,213 B2 | 1/2012 | Stewart et al. |
| 8,109,858 B2 | 2/2012 | Redmann |
| 8,113,994 B2 | 2/2012 | Piaget et al. |
| 8,123,527 B2 | 2/2012 | Holljes |
| 8,141,276 B2 | 3/2012 | Ellis |
| 8,147,385 B2 | 4/2012 | Crawford et al. |
| 8,162,804 B2 | 4/2012 | Tagliabue |
| 8,172,729 B2 | 5/2012 | Ellis |
| 8,177,688 B2 | 5/2012 | Burnfield et al. |
| 8,182,399 B2 | 5/2012 | Davis et al. |
| 8,188,700 B2 | 5/2012 | Tseng et al. |
| 8,200,323 B2 | 6/2012 | Dibenedetto et al. |
| 8,221,290 B2 | 7/2012 | Vincent et al. |
| 8,240,430 B2 | 8/2012 | Downey |
| 8,241,187 B2 | 8/2012 | Moon et al. |
| 8,251,874 B2 | 8/2012 | Ashby et al. |
| 8,260,858 B2 | 9/2012 | Belz et al. |
| 8,272,996 B2 | 9/2012 | Weier |
| 8,275,265 B2 | 9/2012 | Kobyakov et al. |
| 8,280,259 B2 | 10/2012 | George et al. |
| 8,287,434 B2 | 10/2012 | Zavadsky et al. |
| 8,306,635 B2 | 11/2012 | Pryor |
| 8,315,823 B2 | 11/2012 | Berme et al. |
| 8,320,578 B2 | 11/2012 | Kahn et al. |
| 8,323,157 B2 | 12/2012 | Campanaro et al. |
| 8,333,681 B2 | 12/2012 | Schmidt |
| 8,343,016 B1 | 1/2013 | Astilean |
| 8,360,904 B2 | 1/2013 | Oleson et al. |
| 8,360,935 B2 | 1/2013 | Olsen et al. |
| 8,360,936 B2 | 1/2013 | Dibenedetto et al. |
| 8,378,647 B2 | 2/2013 | Yonezawa et al. |
| 8,394,005 B2 | 3/2013 | Solow et al. |
| 8,395,366 B2 | 3/2013 | Uno |
| 8,435,160 B1 | 5/2013 | Clum |
| 8,446,275 B2 | 5/2013 | Utter, II |
| 8,449,620 B2 | 5/2013 | Hakansson et al. |
| 8,454,437 B2 | 6/2013 | Dugan |
| 8,459,479 B2 | 6/2013 | Yourist |
| 8,475,346 B2 | 7/2013 | Gerschefske et al. |
| 8,475,367 B1 | 7/2013 | Yuen et al. |
| 8,480,541 B1 | 7/2013 | Brunts |
| 8,485,944 B2 | 7/2013 | Drazan |
| 8,485,945 B2 | 7/2013 | Leonhard |
| 8,487,759 B2 | 7/2013 | Hill |
| 8,505,597 B2 | 8/2013 | Sharperson |
| 8,506,370 B2 | 8/2013 | Homsi |
| 8,512,210 B2 | 8/2013 | Shauli |
| 8,516,723 B2 | 8/2013 | Ferrigan et al. |
| 8,535,247 B2 | 9/2013 | Williams |
| 8,540,560 B2 | 9/2013 | Crowley et al. |
| 8,550,962 B2 | 10/2013 | Piaget et al. |
| 8,562,489 B2 | 10/2013 | Burton et al. |
| 8,573,982 B1 | 11/2013 | Chuang |
| 8,602,951 B2 | 12/2013 | Morris |
| 8,608,624 B2 | 12/2013 | Shabodyash et al. |
| 8,614,595 B2 | 12/2013 | Acatrinei |
| 8,614,902 B2 | 12/2013 | Pansier et al. |
| 8,617,008 B2 | 12/2013 | Marty et al. |
| 8,655,004 B2 | 2/2014 | Prest et al. |
| 8,657,724 B2 | 2/2014 | Yang |
| 8,690,578 B1 | 4/2014 | Nusbaum et al. |
| 8,690,735 B2 | 4/2014 | Watterson et al. |
| 8,690,738 B1 | 4/2014 | Astilian |
| 8,701,567 B1 | 4/2014 | Esfandiari et al. |
| 8,702,430 B2 | 4/2014 | Dibenedetto et al. |

(56) References Cited

U.S. PATENT DOCUMENTS

| | | |
|---|---|---|
| 8,702,567 B2 | 4/2014 | Hu |
| 8,708,870 B2 | 4/2014 | Nalley |
| 8,734,157 B1 | 5/2014 | Hummel, III |
| 8,734,301 B2 | 5/2014 | Remelius |
| 8,734,302 B2 | 5/2014 | Hsieh |
| 8,740,756 B2 | 6/2014 | Shabodyash et al. |
| 8,749,380 B2 | 6/2014 | Vock et al. |
| 8,758,201 B2 | 6/2014 | Ashby et al. |
| 8,762,101 B2 | 6/2014 | Yuen et al. |
| 8,764,609 B1 | 7/2014 | Elahmadie |
| 8,777,820 B2 | 7/2014 | Lo |
| 8,783,326 B1 | 7/2014 | Vaninger et al. |
| 8,784,274 B1 | 7/2014 | Chuang |
| 8,790,222 B2 | 7/2014 | Burger |
| 8,801,581 B2 | 8/2014 | Lai et al. |
| 8,824,697 B2 | 9/2014 | Christoph |
| 8,825,445 B2 | 9/2014 | Hoffman et al. |
| 8,847,988 B2 | 9/2014 | Geisner et al. |
| 8,851,565 B2 | 10/2014 | Hontz et al. |
| 8,864,627 B2 | 10/2014 | Bayerlein et al. |
| 8,876,661 B2 | 11/2014 | Lu |
| 8,888,660 B1 | 11/2014 | Oteman |
| 8,894,551 B2 | 11/2014 | Kerdjoudj |
| 8,920,291 B2 | 12/2014 | Chen et al. |
| 8,926,475 B2 | 1/2015 | Lin et al. |
| 8,926,479 B2 | 1/2015 | Chen et al. |
| 8,956,290 B2 | 2/2015 | Gilley et al. |
| 8,956,715 B2 | 2/2015 | Kim |
| 8,968,163 B1 | 3/2015 | Vidmar |
| 8,979,709 B2 | 3/2015 | Toback et al. |
| 8,986,165 B2 | 3/2015 | Ashby |
| 9,005,085 B2 | 4/2015 | Astilean |
| 9,011,291 B2 | 4/2015 | Birrell |
| 9,015,952 B2 | 4/2015 | Magosaki |
| 9,028,368 B2 | 5/2015 | Ashby et al. |
| 9,038,218 B1 | 5/2015 | Heil et al. |
| 9,039,578 B2 | 5/2015 | Dalebout |
| 9,050,491 B2 | 6/2015 | Gordon et al. |
| 9,050,498 B2 | 6/2015 | Lu et al. |
| 9,072,932 B2 | 7/2015 | Piaget et al. |
| 9,089,732 B2 | 7/2015 | Andon et al. |
| 9,095,740 B2 | 8/2015 | Wu |
| 9,108,079 B2 | 8/2015 | Solow et al. |
| 9,114,275 B2 | 8/2015 | Lu et al. |
| 9,114,276 B2 | 8/2015 | Bayerlein et al. |
| 9,119,983 B2 | 9/2015 | Rhea |
| 9,132,051 B2 | 9/2015 | Heil |
| 9,138,614 B2 | 9/2015 | Lu et al. |
| 9,138,615 B2 | 9/2015 | Olson et al. |
| 9,144,703 B2 | 9/2015 | Dalebout et al. |
| 9,162,102 B1 | 10/2015 | Eder et al. |
| 9,162,106 B1 | 10/2015 | Scheiman |
| 9,168,414 B2 | 10/2015 | Liu et al. |
| 9,174,085 B2 | 11/2015 | Foley |
| 9,186,537 B2 | 11/2015 | Arnold et al. |
| 9,186,549 B2 | 11/2015 | Watterson et al. |
| 9,186,552 B1 | 11/2015 | Deal |
| 9,192,800 B1 | 11/2015 | Meyer et al. |
| 9,199,115 B2 | 12/2015 | Yim et al. |
| 9,199,123 B2 | 12/2015 | Solow |
| 9,201,458 B2 | 12/2015 | Hunt et al. |
| 9,220,940 B2 | 12/2015 | Al |
| 9,221,545 B2 | 12/2015 | Popescu et al. |
| 9,224,291 B2 | 12/2015 | Moll-Carrillo et al. |
| 9,226,692 B2 | 1/2016 | Haas |
| 9,289,063 B2 | 3/2016 | Baugh et al. |
| 9,308,415 B2 | 4/2016 | Crawford et al. |
| 9,311,802 B1 | 4/2016 | Chin et al. |
| 9,333,388 B2 | 5/2016 | Lee et al. |
| 9,339,681 B1 | 5/2016 | Nalley |
| 9,339,683 B2 | 5/2016 | Dilli et al. |
| 9,352,185 B2 | 5/2016 | Hendrickson et al. |
| 9,352,186 B2 | 5/2016 | Watterson |
| 9,352,187 B2 | 5/2016 | Piaget et al. |
| 9,357,551 B2 | 5/2016 | Gutman |
| 9,358,422 B2 | 6/2016 | Brontman |
| 9,364,706 B2 | 6/2016 | Lo |
| 9,364,708 B2 | 6/2016 | Luger et al. |
| 9,364,714 B2 | 6/2016 | Koduri et al. |
| 9,367,668 B2 | 6/2016 | Flynt et al. |
| 9,370,687 B2 | 6/2016 | Hao |
| 9,387,387 B2 | 7/2016 | Dalebout |
| 9,389,718 B1 | 7/2016 | Letourneur |
| 9,409,050 B2 | 8/2016 | Mintz |
| 9,415,257 B2 | 8/2016 | Habing |
| 9,452,315 B1 | 9/2016 | Murray et al. |
| 9,452,320 B2 | 9/2016 | Yang |
| 9,455,784 B2 | 9/2016 | Cune et al. |
| 9,457,224 B2 | 10/2016 | Giannelli et al. |
| 9,463,349 B1 | 10/2016 | Chang |
| 9,480,874 B2 | 11/2016 | Cutler |
| 9,486,658 B2 | 11/2016 | Alexander |
| 9,498,671 B1 | 11/2016 | Softky |
| 9,505,241 B2 | 11/2016 | Cuzin |
| 9,539,458 B1 | 1/2017 | Ross |
| 9,540,071 B2 | 1/2017 | Jordan et al. |
| 9,540,174 B2 | 1/2017 | Josserond et al. |
| 9,560,917 B2 | 2/2017 | Roslund, Jr. |
| 9,573,017 B2 | 2/2017 | Chang |
| 9,579,534 B2 | 2/2017 | Sutkowski et al. |
| 9,579,544 B2 | 2/2017 | Watterson |
| 9,582,976 B2 | 2/2017 | Chin et al. |
| 9,604,099 B2 | 3/2017 | Taylor |
| 9,610,475 B1 | 4/2017 | DeKnock et al. |
| 9,623,286 B1 | 4/2017 | Chen |
| 9,671,316 B2 * | 6/2017 | Hsu .................. G01M 99/005 |
| 9,673,904 B2 | 6/2017 | Palanisamy et al. |
| 9,681,313 B2 | 6/2017 | Malach |
| 9,682,306 B2 | 6/2017 | Lin et al. |
| 9,694,234 B2 | 7/2017 | Dalebout et al. |
| 9,700,780 B2 | 7/2017 | Riley et al. |
| 9,707,441 B2 | 7/2017 | Yang |
| 9,707,447 B1 | 7/2017 | Lopez Babodilla |
| 9,731,158 B1 | 8/2017 | Lo |
| 9,737,747 B1 | 8/2017 | Walsh et al. |
| 9,757,605 B2 | 9/2017 | Olson et al. |
| 9,764,184 B2 | 9/2017 | Kueker et al. |
| 9,776,039 B1 | 10/2017 | Xu |
| 9,782,625 B1 | 10/2017 | Blum et al. |
| 9,795,827 B2 | 10/2017 | Wiener et al. |
| 9,808,673 B2 | 11/2017 | Robinson |
| 9,814,927 B2 | 11/2017 | Forystek |
| 9,814,929 B2 | 11/2017 | Moser |
| 9,814,930 B2 | 11/2017 | Manzke et al. |
| 9,827,458 B2 | 11/2017 | Dalton |
| 9,829,068 B2 | 11/2017 | Marchetti |
| 9,833,658 B2 | 12/2017 | Wiener et al. |
| 9,849,330 B2 | 12/2017 | Lagree |
| 9,889,334 B2 | 2/2018 | Ashby et al. |
| 9,901,767 B2 | 2/2018 | Kuo |
| 9,901,780 B2 | 2/2018 | DeLuca et al. |
| 9,901,805 B2 | 2/2018 | Hughes, Jr. |
| 9,914,011 B2 | 3/2018 | Downey et al. |
| 9,914,014 B2 | 3/2018 | Lagree et al. |
| 9,937,375 B2 | 4/2018 | Zhu |
| 9,943,719 B2 | 4/2018 | Smith et al. |
| 9,948,349 B2 | 4/2018 | Malach |
| 9,950,209 B2 | 4/2018 | Yim et al. |
| 9,956,450 B2 | 5/2018 | Bayerlein et al. |
| 9,968,821 B2 | 5/2018 | Finlayson et al. |
| 9,968,823 B2 | 5/2018 | Cutler |
| 9,987,513 B2 | 6/2018 | Yim et al. |
| 9,987,517 B1 | 6/2018 | Kuo |
| 9,993,680 B2 | 6/2018 | Gordon |
| 10,004,940 B2 | 6/2018 | Badarneh |
| 10,022,590 B2 | 7/2018 | Foley et al. |
| 2001/0001303 A1 | 5/2001 | Ohsuga et al. |
| 2001/0008053 A1 | 7/2001 | Belli |
| 2001/0049470 A1 | 12/2001 | Mault et al. |
| 2001/0051564 A1 | 12/2001 | Iund et al. |
| 2002/0016235 A1 | 2/2002 | Ashby et al. |
| 2002/0019298 A1 | 2/2002 | Eschenbach |
| 2002/0024521 A1 | 2/2002 | Goden |
| 2002/0025888 A1 | 2/2002 | Germanton |

(56) References Cited

U.S. PATENT DOCUMENTS

| | | |
|---|---|---|
| 2002/0026130 A1 | 2/2002 | West |
| 2002/0043909 A1 | 4/2002 | Nielsen |
| 2002/0045519 A1 | 4/2002 | Watterson |
| 2002/0055418 A1 | 5/2002 | Pyles et al. |
| 2002/0055419 A1 | 5/2002 | Hinnebusch |
| 2002/0055420 A1 | 5/2002 | Stearns et al. |
| 2002/0055422 A1 | 5/2002 | Airmet |
| 2002/0066735 A1 | 6/2002 | Hewlitt et al. |
| 2002/0077221 A1 | 6/2002 | Dalebout et al. |
| 2002/0094914 A1 | 7/2002 | Maresh et al. |
| 2002/0107058 A1 | 8/2002 | Namba et al. |
| 2002/0115536 A1 | 8/2002 | Hojo |
| 2002/0128127 A1 | 9/2002 | Chen |
| 2002/0147078 A1 | 10/2002 | Wu |
| 2002/0151413 A1 | 10/2002 | Dalebout |
| 2002/0160883 A1 | 10/2002 | Dugan |
| 2002/0171070 A1 | 11/2002 | Shim |
| 2002/0198084 A1 | 12/2002 | Stearns et al. |
| 2003/0009832 A1 | 1/2003 | Yang et al. |
| 2003/0032524 A1 | 2/2003 | Lamar et al. |
| 2003/0032535 A1 | 2/2003 | Wang |
| 2003/0045406 A1 | 3/2003 | Stone |
| 2003/0060344 A1 | 3/2003 | David |
| 2003/0069108 A1 | 4/2003 | Rubinstein |
| 2003/0073545 A1 | 4/2003 | Liu |
| 2003/0092532 A1 | 5/2003 | Giannelli et al. |
| 2003/0092540 A1 | 5/2003 | Gillen |
| 2003/0096675 A1 | 5/2003 | Wang |
| 2003/0097878 A1 | 5/2003 | Farringdon et al. |
| 2003/0104908 A1 | 6/2003 | Tung |
| 2003/0119635 A1 | 6/2003 | Arbuckle |
| 2003/0128186 A1 | 7/2003 | Laker |
| 2003/0134718 A1 | 7/2003 | Kim |
| 2003/0148853 A1 | 8/2003 | Alessandri |
| 2003/0171189 A1 | 9/2003 | Kaufman |
| 2003/0171190 A1 | 9/2003 | Rice |
| 2003/0176815 A1 | 9/2003 | Baba et al. |
| 2003/0181289 A1 | 9/2003 | Oscar Moavro |
| 2003/0183027 A1 | 10/2003 | Koch |
| 2003/0211916 A1 | 11/2003 | Capuano |
| 2003/0222419 A1 | 12/2003 | Geary |
| 2003/0236153 A1 | 12/2003 | Pan et al. |
| 2004/0005958 A1 | 1/2004 | Kamen et al. |
| 2004/0005961 A1 | 1/2004 | Iund |
| 2004/0014567 A1 | 1/2004 | Mendel |
| 2004/0014571 A1 | 1/2004 | Haynes |
| 2004/0018917 A1 | 1/2004 | Corbalis |
| 2004/0018918 A1 | 1/2004 | Reyes |
| 2004/0023759 A1 | 2/2004 | Duncan et al. |
| 2004/0023761 A1 | 2/2004 | Emery |
| 2004/0023762 A1 | 2/2004 | Lull |
| 2004/0023766 A1 | 2/2004 | Slone |
| 2004/0025754 A1 | 2/2004 | Dye |
| 2004/0029645 A1 | 2/2004 | Chen |
| 2004/0033865 A1 | 2/2004 | Wu |
| 2004/0043873 A1 | 3/2004 | Wilkinson et al. |
| 2004/0051392 A1 | 3/2004 | Badarneh |
| 2004/0053748 A1 | 3/2004 | Lo et al. |
| 2004/0063549 A1 | 4/2004 | Kuo |
| 2004/0067821 A1 | 4/2004 | Kehrbaum |
| 2004/0067833 A1 | 4/2004 | Talish |
| 2004/0082444 A1 | 4/2004 | Golesh |
| 2004/0092367 A1 | 5/2004 | Corbalis |
| 2004/0097331 A1 | 5/2004 | Zillig |
| 2004/0100484 A1 | 5/2004 | Barrett |
| 2004/0102292 A1 | 5/2004 | Pyles et al. |
| 2004/0103432 A1 | 5/2004 | Barrett |
| 2004/0114768 A1 | 6/2004 | Luo |
| 2004/0132586 A1 | 7/2004 | Leighton et al. |
| 2004/0132587 A1 | 7/2004 | Leighton et al. |
| 2004/0136750 A1 | 7/2004 | Yoshioka et al. |
| 2004/0138030 A1 | 7/2004 | Wang |
| 2004/0142800 A1 | 7/2004 | Gerschefske |
| 2004/0144626 A1 | 7/2004 | Saeki |
| 2004/0152566 A1 | 8/2004 | Yeh |
| 2004/0155622 A1 | 8/2004 | Mayhew et al. |
| 2004/0160336 A1 | 8/2004 | Hoch |
| 2004/0162189 A1 | 8/2004 | Hickman |
| 2004/0162191 A1 | 8/2004 | Ercanbrack |
| 2004/0163574 A1 | 8/2004 | Schoenbach |
| 2004/0166999 A1 | 8/2004 | Dodge |
| 2004/0171460 A1 | 9/2004 | Park |
| 2004/0171464 A1 | 9/2004 | Ashby et al. |
| 2004/0171465 A1 | 9/2004 | Hald |
| 2004/0176215 A1 | 9/2004 | Gramaccioni |
| 2004/0176217 A1 | 9/2004 | Watterson |
| 2004/0177531 A1 | 9/2004 | Dibenedetto et al. |
| 2004/0180719 A1 | 9/2004 | Feldman |
| 2004/0181972 A1 | 9/2004 | Csorba |
| 2004/0198555 A1 | 10/2004 | Anderson |
| 2004/0198559 A1 | 10/2004 | Grossi |
| 2004/0198571 A1 | 10/2004 | Howell et al. |
| 2004/0224740 A1 | 11/2004 | Ball et al. |
| 2004/0224825 A1 | 11/2004 | Giannelli et al. |
| 2004/0224827 A1 | 11/2004 | Ashley |
| 2004/0242378 A1 | 12/2004 | Pan |
| 2004/0242379 A1 | 12/2004 | Juva |
| 2004/0242380 A1 | 12/2004 | Kuivala |
| 2004/0248699 A1 | 12/2004 | Colley |
| 2004/0254020 A1 | 12/2004 | Dragusin |
| 2004/0256524 A1 | 12/2004 | Beck et al. |
| 2004/0259689 A1 | 12/2004 | Wilkins et al. |
| 2004/0266587 A1 | 12/2004 | Miller |
| 2005/0003931 A1 | 1/2005 | Mills et al. |
| 2005/0008992 A1 | 1/2005 | Westergaard et al. |
| 2005/0009668 A1 | 1/2005 | Savettiere |
| 2005/0023292 A1 | 2/2005 | Market et al. |
| 2005/0032611 A1 | 2/2005 | Webber |
| 2005/0037898 A1 | 2/2005 | Chang |
| 2005/0037904 A1 | 2/2005 | Chang |
| 2005/0043145 A1 | 2/2005 | Anderson et al. |
| 2005/0043146 A1 | 2/2005 | Lo et al. |
| 2005/0043155 A1 | 2/2005 | Yannitte |
| 2005/0049117 A1 | 3/2005 | Rodgers |
| 2005/0049121 A1 | 3/2005 | Dalebout |
| 2005/0054492 A1 | 3/2005 | Neff |
| 2005/0064994 A1 | 3/2005 | Matsumoto |
| 2005/0075213 A1 | 4/2005 | Arick |
| 2005/0090770 A1 | 4/2005 | Chen |
| 2005/0096187 A1 | 5/2005 | Hsu |
| 2005/0096189 A1 | 5/2005 | Chen |
| 2005/0107220 A1 | 5/2005 | Wang |
| 2005/0107226 A1 | 5/2005 | Monda |
| 2005/0113158 A1 | 5/2005 | Sterchi et al. |
| 2005/0129903 A1 | 6/2005 | Carr |
| 2005/0131319 A1 | 6/2005 | Der Meer |
| 2005/0132838 A1 | 6/2005 | Lin |
| 2005/0143226 A1 | 6/2005 | Heidecke |
| 2005/0143228 A1 | 6/2005 | Lee |
| 2005/0148398 A1 | 7/2005 | Lochtefeld et al. |
| 2005/0148439 A1 | 7/2005 | Wu |
| 2005/0148440 A1 | 7/2005 | Denton |
| 2005/0148442 A1 | 7/2005 | Watterson |
| 2005/0159273 A1 | 7/2005 | Chen |
| 2005/0164839 A1 | 7/2005 | Watterson |
| 2005/0170935 A1 | 8/2005 | Manser |
| 2005/0170936 A1 | 8/2005 | Quinn |
| 2005/0172311 A1 | 8/2005 | Hjelt et al. |
| 2005/0178210 A1 | 8/2005 | Lanham |
| 2005/0181347 A1 | 8/2005 | Barnes et al. |
| 2005/0181911 A1 | 8/2005 | Porth |
| 2005/0192162 A1 | 9/2005 | Pan |
| 2005/0196737 A1 | 9/2005 | Mann |
| 2005/0202934 A1 | 9/2005 | Olrik et al. |
| 2005/0209050 A1 | 9/2005 | Bartels |
| 2005/0209051 A1 | 9/2005 | Santomassimo et al. |
| 2005/0209061 A1 | 9/2005 | Crawford et al. |
| 2005/0209062 A1 | 9/2005 | Anderson et al. |
| 2005/0215397 A1 | 9/2005 | Watterson |
| 2005/0233861 A1 | 10/2005 | Hickman |
| 2005/0233871 A1 | 10/2005 | Anders |
| 2005/0239607 A1 | 10/2005 | Chang |
| 2005/0245370 A1 | 11/2005 | Boland |
| 2005/0250622 A1 | 11/2005 | Chang |

(56) References Cited

U.S. PATENT DOCUMENTS

| | | |
|---|---|---|
| 2005/0266961 A1 | 12/2005 | Shum et al. |
| 2005/0272562 A1 | 12/2005 | Alessandri et al. |
| 2005/0272577 A1 | 12/2005 | Olson |
| 2005/0277520 A1 | 12/2005 | Van Waes |
| 2005/0281963 A1 | 12/2005 | Cook |
| 2005/0283911 A1 | 12/2005 | Roussy |
| 2005/0288155 A1 | 12/2005 | Yang |
| 2006/0003869 A1 | 1/2006 | Huang et al. |
| 2006/0004265 A1 | 1/2006 | Pulkkinen et al. |
| 2006/0019804 A1 | 1/2006 | Young |
| 2006/0035757 A1 | 2/2006 | Flick et al. |
| 2006/0035758 A1 | 2/2006 | Rogozinski |
| 2006/0040797 A1 | 2/2006 | Chang |
| 2006/0047447 A1 | 3/2006 | Brady et al. |
| 2006/0053586 A1 | 3/2006 | Chase |
| 2006/0053587 A1 | 3/2006 | Chase |
| 2006/0058158 A1 | 3/2006 | McAvoy |
| 2006/0058162 A1 | 3/2006 | Vieno et al. |
| 2006/0063644 A1 | 3/2006 | Yang |
| 2006/0075544 A1 | 4/2006 | Kriesel |
| 2006/0079800 A1 | 4/2006 | Martikka et al. |
| 2006/0100069 A1 | 5/2006 | Dibble et al. |
| 2006/0100546 A1 | 5/2006 | Silk |
| 2006/0122035 A1 | 6/2006 | Felix |
| 2006/0122038 A1 | 6/2006 | Chou Lin |
| 2006/0122044 A1 | 6/2006 | Ho |
| 2006/0123814 A1 | 6/2006 | Choi et al. |
| 2006/0128534 A1 | 6/2006 | Roque |
| 2006/0135274 A1 | 6/2006 | Henry |
| 2006/0135322 A1 | 6/2006 | Rocker |
| 2006/0148622 A1 | 7/2006 | Chen |
| 2006/0151303 A1 | 7/2006 | Motoda |
| 2006/0160665 A1 | 7/2006 | Tai |
| 2006/0160666 A1 | 7/2006 | Wang |
| 2006/0166791 A1 | 7/2006 | Liao |
| 2006/0166799 A1 | 7/2006 | Boland et al. |
| 2006/0172862 A1 | 8/2006 | Badarneh et al. |
| 2006/0189439 A1 | 8/2006 | Baudhuin |
| 2006/0189440 A1 | 8/2006 | Gravagne |
| 2006/0189462 A1 | 8/2006 | Pearson et al. |
| 2006/0194679 A1 | 8/2006 | Hatcher |
| 2006/0199706 A1 | 9/2006 | Wehrell |
| 2006/0205568 A1 | 9/2006 | Huang |
| 2006/0217236 A1 | 9/2006 | Watterson |
| 2006/0217245 A1 | 9/2006 | Golesh et al. |
| 2006/0223680 A1 | 10/2006 | Chang |
| 2006/0229163 A1 | 10/2006 | Waters |
| 2006/0229170 A1 | 10/2006 | Ozawa et al. |
| 2006/0232147 A1 | 10/2006 | Cheng |
| 2006/0234832 A1 | 10/2006 | Toyama et al. |
| 2006/0240947 A1 | 10/2006 | Qu |
| 2006/0240951 A1 | 10/2006 | Wang |
| 2006/0240959 A1 | 10/2006 | Huang |
| 2006/0244187 A1 | 11/2006 | Downey |
| 2006/0247109 A1 | 11/2006 | Powell |
| 2006/0248965 A1 | 11/2006 | Wyatt |
| 2006/0252602 A1 | 11/2006 | Brown |
| 2006/0252608 A1 | 11/2006 | Kang et al. |
| 2006/0258513 A1 | 11/2006 | Routley |
| 2006/0258515 A1 | 11/2006 | Kang et al. |
| 2006/0264306 A1 | 11/2006 | Tischler |
| 2006/0270522 A1 | 11/2006 | Yonehana et al. |
| 2006/0276306 A1 | 12/2006 | Pan et al. |
| 2006/0279294 A1 | 12/2006 | Cehelnik |
| 2006/0287089 A1 | 12/2006 | Addington et al. |
| 2006/0287147 A1 | 12/2006 | Kriesel |
| 2006/0287163 A1 | 12/2006 | Wang |
| 2006/0288846 A1 | 12/2006 | Logan |
| 2007/0004561 A1 | 1/2007 | Yoo |
| 2007/0004562 A1 | 1/2007 | Pan et al. |
| 2007/0004569 A1 | 1/2007 | Cao |
| 2007/0006489 A1 | 1/2007 | Case, Jr. et al. |
| 2007/0010383 A1 | 1/2007 | Pertegaz-Esteban |
| 2007/0015635 A1 | 1/2007 | Donner |
| 2007/0015636 A1 | 1/2007 | Molter |
| 2007/0027002 A1 | 2/2007 | Clark et al. |
| 2007/0037667 A1 | 2/2007 | Gordon |
| 2007/0038137 A1 | 2/2007 | Arand et al. |
| 2007/0042868 A1 | 2/2007 | Fisher |
| 2007/0049462 A1 | 3/2007 | Asukai et al. |
| 2007/0049464 A1 | 3/2007 | Chou |
| 2007/0049465 A1 | 3/2007 | Wu |
| 2007/0049466 A1 | 3/2007 | Hubbard |
| 2007/0049470 A1 | 3/2007 | Pyles et al. |
| 2007/0054790 A1 | 3/2007 | Dodge et al. |
| 2007/0060449 A1 | 3/2007 | Lo |
| 2007/0060450 A1 | 3/2007 | Lo |
| 2007/0060451 A1 | 3/2007 | Lucas |
| 2007/0066448 A1 | 3/2007 | Pan et al. |
| 2007/0072748 A1 | 3/2007 | Lee |
| 2007/0072752 A1 | 3/2007 | Koch |
| 2007/0079691 A1 | 4/2007 | Turner |
| 2007/0087908 A1 | 4/2007 | Pan et al. |
| 2007/0111858 A1 | 5/2007 | Dugan |
| 2007/0111866 A1 | 5/2007 | McVay et al. |
| 2007/0117683 A1 | 5/2007 | Ercanbrack et al. |
| 2007/0123389 A1 | 5/2007 | Martin |
| 2007/0123390 A1 | 5/2007 | Mathis |
| 2007/0123395 A1 | 5/2007 | Ellis |
| 2007/0123396 A1 | 5/2007 | Ellis |
| 2007/0135264 A1 | 6/2007 | Rosenberg |
| 2007/0137331 A1 | 6/2007 | Kachouh |
| 2007/0142177 A1 | 6/2007 | Simms et al. |
| 2007/0142179 A1 | 6/2007 | Terao et al. |
| 2007/0142183 A1 | 6/2007 | Chang |
| 2007/0149363 A1 | 6/2007 | Wang |
| 2007/0151489 A1 | 7/2007 | Byrne |
| 2007/0155277 A1 | 7/2007 | Amitai et al. |
| 2007/0155495 A1 | 7/2007 | Goo |
| 2007/0161468 A1 | 7/2007 | Yanagisawa et al. |
| 2007/0167292 A1 | 7/2007 | Kuo |
| 2007/0179023 A1 | 8/2007 | Dyer |
| 2007/0184953 A1 | 8/2007 | Luberski et al. |
| 2007/0190508 A1 | 8/2007 | Dalton |
| 2007/0191141 A1 | 8/2007 | Weber |
| 2007/0191190 A1 | 8/2007 | Kuo |
| 2007/0197274 A1 | 8/2007 | Dugan |
| 2007/0197345 A1 | 8/2007 | Wallace et al. |
| 2007/0197353 A1 | 8/2007 | Hundley |
| 2007/0197920 A1 | 8/2007 | Adams |
| 2007/0201727 A1 | 8/2007 | Birrell et al. |
| 2007/0204430 A1 | 9/2007 | Chase |
| 2007/0214630 A1 | 9/2007 | Kim |
| 2007/0219066 A1 | 9/2007 | Wang |
| 2007/0225119 A1 | 9/2007 | Schenk |
| 2007/0225120 A1 | 9/2007 | Schenk |
| 2007/0225126 A1 | 9/2007 | Yoo |
| 2007/0225127 A1 | 9/2007 | Pan et al. |
| 2007/0225622 A1 | 9/2007 | Huang et al. |
| 2007/0232455 A1 | 10/2007 | Hanoun |
| 2007/0232463 A1 | 10/2007 | Wu |
| 2007/0245612 A1 | 10/2007 | Tresenfeld |
| 2007/0247320 A1 | 10/2007 | Morahan |
| 2007/0249467 A1 | 10/2007 | Hong et al. |
| 2007/0270294 A1 | 11/2007 | Sheets |
| 2007/0270667 A1 | 11/2007 | Coppi et al. |
| 2007/0270726 A1 | 11/2007 | Chou |
| 2007/0281828 A1 | 12/2007 | Rice |
| 2007/0281831 A1 | 12/2007 | Wang |
| 2007/0284495 A1 | 12/2007 | Charles |
| 2007/0296313 A1 | 12/2007 | Wang |
| 2007/0298935 A1 | 12/2007 | Badarneh |
| 2007/0298937 A1 | 12/2007 | Shah |
| 2008/0001772 A1 | 1/2008 | Saito |
| 2008/0001866 A1 | 1/2008 | Martin |
| 2008/0004162 A1 | 1/2008 | Chen |
| 2008/0018211 A1 | 1/2008 | Dye |
| 2008/0020898 A1 | 1/2008 | Pyles et al. |
| 2008/0020902 A1 | 1/2008 | Arnold |
| 2008/0020907 A1 | 1/2008 | Lin |
| 2008/0026658 A1 | 1/2008 | Kriesel |
| 2008/0026838 A1 | 1/2008 | Dunstan et al. |
| 2008/0032864 A1 | 2/2008 | Hakki |
| 2008/0032870 A1 | 2/2008 | Wu |

(56) References Cited

U.S. PATENT DOCUMENTS

| | | |
|---|---|---|
| 2008/0032871 A1 | 2/2008 | Yeh |
| 2008/0039301 A1 | 2/2008 | Halbridge |
| 2008/0046246 A1 | 2/2008 | Hakki |
| 2008/0051256 A1 | 2/2008 | Ashby et al. |
| 2008/0057889 A1 | 3/2008 | Jan |
| 2008/0058169 A1 | 3/2008 | Fox |
| 2008/0058170 A1 | 3/2008 | Giannascoli et al. |
| 2008/0067302 A1 | 3/2008 | Olivera |
| 2008/0070756 A1 | 3/2008 | Chu |
| 2008/0076637 A1 | 3/2008 | Gilley et al. |
| 2008/0076972 A1 | 3/2008 | Dorogusker et al. |
| 2008/0077619 A1 | 3/2008 | Gilley et al. |
| 2008/0096745 A1 | 4/2008 | Perry |
| 2008/0103024 A1 | 5/2008 | Habing |
| 2008/0103034 A1 | 5/2008 | Mihara et al. |
| 2008/0108917 A1 | 5/2008 | Joutras et al. |
| 2008/0119333 A1 | 5/2008 | Bowser |
| 2008/0139370 A1 | 6/2008 | Charnitski |
| 2008/0153670 A1 | 6/2008 | Mckirdy |
| 2008/0153682 A1 | 6/2008 | Chen et al. |
| 2008/0155077 A1 | 6/2008 | James |
| 2008/0161170 A1 | 7/2008 | Lumpee |
| 2008/0161653 A1 | 7/2008 | Lin et al. |
| 2008/0171640 A1 | 7/2008 | Chang |
| 2008/0171922 A1 | 7/2008 | Teller |
| 2008/0176717 A1 | 7/2008 | Wang |
| 2008/0176718 A1 | 7/2008 | Wang |
| 2008/0182724 A1 | 7/2008 | Guthrie |
| 2008/0187689 A1 | 8/2008 | Dierkens et al. |
| 2008/0188362 A1 | 8/2008 | Chen |
| 2008/0190745 A1 | 8/2008 | Taniguchi et al. |
| 2008/0191864 A1 | 8/2008 | Wolfson |
| 2008/0200287 A1 | 8/2008 | Marty et al. |
| 2008/0200310 A1 | 8/2008 | Tagliabue |
| 2008/0207407 A1 | 8/2008 | Yeh |
| 2008/0214358 A1 | 9/2008 | Ogg et al. |
| 2008/0214971 A1 | 9/2008 | Talish |
| 2008/0216717 A1 | 9/2008 | Jones |
| 2008/0228110 A1 | 9/2008 | Berme |
| 2008/0229875 A1 | 9/2008 | Ray |
| 2008/0234110 A1 | 9/2008 | Webber et al. |
| 2008/0234111 A1 | 9/2008 | Packham |
| 2008/0242511 A1 | 10/2008 | Munoz et al. |
| 2008/0244870 A1 | 10/2008 | Chase |
| 2008/0245944 A1 | 10/2008 | Chase |
| 2008/0248926 A1 | 10/2008 | Cole et al. |
| 2008/0248935 A1 | 10/2008 | Solow |
| 2008/0250729 A1 | 10/2008 | Kriesel |
| 2008/0255794 A1 | 10/2008 | Levine |
| 2008/0279896 A1 | 11/2008 | Heinen et al. |
| 2008/0280732 A1 | 11/2008 | Jones |
| 2008/0280733 A1 | 11/2008 | Dickie et al. |
| 2008/0280734 A1 | 11/2008 | Dickie et al. |
| 2008/0280735 A1 | 11/2008 | Dickie et al. |
| 2008/0287262 A1 | 11/2008 | Chou |
| 2008/0300115 A1 | 12/2008 | Erlandson |
| 2008/0300914 A1 | 12/2008 | Karkanias et al. |
| 2008/0312047 A1 | 12/2008 | Feng |
| 2008/0318737 A1 | 12/2008 | Chu |
| 2009/0001831 A1 | 1/2009 | Cho et al. |
| 2009/0011907 A1 | 1/2009 | Radow |
| 2009/0023553 A1 | 1/2009 | Shim |
| 2009/0027925 A1 | 1/2009 | Kanouda et al. |
| 2009/0029831 A1 | 1/2009 | Weier |
| 2009/0036276 A1 | 2/2009 | Loach |
| 2009/0042696 A1 | 2/2009 | Wang |
| 2009/0042698 A1 | 2/2009 | Wang |
| 2009/0048073 A1 | 2/2009 | Roimicher |
| 2009/0048079 A1 | 2/2009 | Nalley |
| 2009/0048493 A1 | 2/2009 | James et al. |
| 2009/0053682 A1 | 2/2009 | Stern |
| 2009/0054214 A1 | 2/2009 | Kadar |
| 2009/0054751 A1 | 2/2009 | Babashan et al. |
| 2009/0069159 A1 | 3/2009 | Wang |
| 2009/0069722 A1 | 3/2009 | Flaction et al. |
| 2009/0075781 A1 | 3/2009 | Schwarzberg et al. |
| 2009/0075784 A1 | 3/2009 | Hoggan |
| 2009/0080808 A1 | 3/2009 | Hagen |
| 2009/0093347 A1 | 4/2009 | Wang |
| 2009/0100718 A1 | 4/2009 | Gerber |
| 2009/0105047 A1 | 4/2009 | Guidi et al. |
| 2009/0105052 A1 | 4/2009 | Dalebout et al. |
| 2009/0105548 A1 | 4/2009 | Bart |
| 2009/0111664 A1 | 4/2009 | Kau |
| 2009/0111665 A1 | 4/2009 | Wang |
| 2009/0111666 A1 | 4/2009 | Wang |
| 2009/0111670 A1 | 4/2009 | Williams |
| 2009/0118098 A1 | 5/2009 | Yeh |
| 2009/0119032 A1 | 5/2009 | Meyer |
| 2009/0120208 A1 | 5/2009 | Meyer |
| 2009/0120210 A1 | 5/2009 | Phillips et al. |
| 2009/0124463 A1 | 5/2009 | Lin |
| 2009/0124464 A1 | 5/2009 | Kastelic |
| 2009/0124465 A1 | 5/2009 | Wang |
| 2009/0124466 A1 | 5/2009 | Zhang |
| 2009/0128516 A1 | 5/2009 | Rimon et al. |
| 2009/0144639 A1 | 6/2009 | Nims et al. |
| 2009/0156363 A1 | 6/2009 | Guidi et al. |
| 2009/0156364 A1 | 6/2009 | Simeoni |
| 2009/0158871 A1 | 6/2009 | Chuo |
| 2009/0163326 A1 | 6/2009 | Wang |
| 2009/0163327 A1 | 6/2009 | Huang et al. |
| 2009/0170667 A1 | 7/2009 | Irving et al. |
| 2009/0170672 A1 | 7/2009 | Mcmullen |
| 2009/0176625 A1 | 7/2009 | Giannelli et al. |
| 2009/0176628 A1 | 7/2009 | Radding et al. |
| 2009/0180646 A1 | 7/2009 | Vulfson et al. |
| 2009/0181829 A1 | 7/2009 | Wu |
| 2009/0181830 A1 | 7/2009 | Wu |
| 2009/0181831 A1 | 7/2009 | Kuo |
| 2009/0181833 A1 | 7/2009 | Cassidy |
| 2009/0197740 A1 | 8/2009 | Julskjaer et al. |
| 2009/0209393 A1 | 8/2009 | Crater et al. |
| 2009/0221405 A1 | 9/2009 | Wang |
| 2009/0221407 A1 | 9/2009 | Hauk |
| 2009/0227424 A1 | 9/2009 | Hirata et al. |
| 2009/0227432 A1 | 9/2009 | Pacheco |
| 2009/0232420 A1 | 9/2009 | Eisenberg et al. |
| 2009/0240858 A1 | 9/2009 | Takebayashi |
| 2009/0246746 A1 | 10/2009 | Roerdink et al. |
| 2009/0253554 A1 | 10/2009 | Mcintosh |
| 2009/0258710 A1 | 10/2009 | Quatrochi et al. |
| 2009/0258763 A1 | 10/2009 | Richter |
| 2009/0269728 A1 | 10/2009 | Verstegen et al. |
| 2009/0286653 A1 | 11/2009 | Wiber |
| 2009/0293319 A1 | 12/2009 | Avni |
| 2009/0312158 A1 | 12/2009 | Trevino et al. |
| 2010/0015585 A1 | 1/2010 | Baker |
| 2010/0016127 A1 | 1/2010 | Farnsworth et al. |
| 2010/0022354 A1 | 1/2010 | Fisher |
| 2010/0024590 A1 | 2/2010 | O'neill |
| 2010/0032533 A1 | 2/2010 | Chen et al. |
| 2010/0035726 A1 | 2/2010 | Fisher et al. |
| 2010/0041516 A1 | 2/2010 | Kodama |
| 2010/0048358 A1 | 2/2010 | Tchao et al. |
| 2010/0062904 A1 | 3/2010 | Crawford et al. |
| 2010/0062914 A1 | 3/2010 | Splane |
| 2010/0063426 A1 | 3/2010 | Planke |
| 2010/0064255 A1 | 3/2010 | Rottler et al. |
| 2010/0079291 A1 | 4/2010 | Kroll et al. |
| 2010/0081548 A1 | 4/2010 | Labedz |
| 2010/0087298 A1 | 4/2010 | Zaccherini |
| 2010/0099541 A1 | 4/2010 | Patel |
| 2010/0105527 A1 | 4/2010 | Johnson |
| 2010/0113223 A1 | 5/2010 | Chiles et al. |
| 2010/0125026 A1 | 5/2010 | Zavadsky et al. |
| 2010/0130337 A1 | 5/2010 | Stewart |
| 2010/0137105 A1 | 6/2010 | McLaughlin |
| 2010/0144501 A1 | 6/2010 | Berhanu |
| 2010/0156625 A1 | 6/2010 | Ruha |
| 2010/0167883 A1 | 7/2010 | Grind |
| 2010/0173276 A1 | 7/2010 | Vasin |
| 2010/0173755 A1 | 7/2010 | P Erez De Lazarraga |
| 2010/0175634 A1 | 7/2010 | Chang et al. |

(56) References Cited

U.S. PATENT DOCUMENTS

| | | |
|---|---|---|
| 2010/0184568 A1 | 7/2010 | Schippers |
| 2010/0190615 A1 | 7/2010 | Baker et al. |
| 2010/0192715 A1 | 8/2010 | Vauchel et al. |
| 2010/0197462 A1 | 8/2010 | Piane, Jr. |
| 2010/0197465 A1 | 8/2010 | Stevenson |
| 2010/0216599 A1 | 8/2010 | Watterson |
| 2010/0216600 A1 | 8/2010 | Noffsinger |
| 2010/0216607 A1 | 8/2010 | Mueller |
| 2010/0222179 A1 | 9/2010 | Temple et al. |
| 2010/0222182 A1 | 9/2010 | Park |
| 2010/0227740 A1 | 9/2010 | Liu |
| 2010/0235667 A1 | 9/2010 | Mucignat et al. |
| 2010/0240458 A1 | 9/2010 | Gaiba et al. |
| 2010/0255959 A1 | 10/2010 | Dalebout et al. |
| 2010/0267524 A1 | 10/2010 | Stewart et al. |
| 2010/0279822 A1 | 11/2010 | Ford |
| 2010/0285933 A1 | 11/2010 | Nalley |
| 2010/0289466 A1 | 11/2010 | Telefus |
| 2010/0289772 A1 | 11/2010 | Miller |
| 2010/0292050 A1 | 11/2010 | DiBenedetto et al. |
| 2010/0304931 A1 | 12/2010 | Stumpf |
| 2010/0304932 A1 | 12/2010 | Kolman et al. |
| 2010/0311552 A1 | 12/2010 | Sumners |
| 2010/0320956 A1 | 12/2010 | Lumsden et al. |
| 2011/0003664 A1 | 1/2011 | Richard |
| 2011/0021319 A1 | 1/2011 | Nissila et al. |
| 2011/0028282 A1 | 2/2011 | Sbragia |
| 2011/0034300 A1 | 2/2011 | Hall |
| 2011/0054359 A1 | 3/2011 | Sazonov et al. |
| 2011/0056328 A1 | 3/2011 | Ko |
| 2011/0061840 A1 | 3/2011 | Goldmann |
| 2011/0065371 A1 | 3/2011 | Leff |
| 2011/0065373 A1 | 3/2011 | Goldmann |
| 2011/0067361 A1 | 3/2011 | Sloan |
| 2011/0073743 A1 | 3/2011 | Shamie |
| 2011/0077055 A1 | 3/2011 | Pakula et al. |
| 2011/0082013 A1 | 4/2011 | Bastian |
| 2011/0086707 A1 | 4/2011 | Loveland |
| 2011/0087137 A1 | 4/2011 | Hanoun |
| 2011/0087445 A1 | 4/2011 | Sobolewski |
| 2011/0087446 A1 | 4/2011 | Redmond |
| 2011/0093100 A1 | 4/2011 | Ramsay |
| 2011/0098157 A1 | 4/2011 | Whalen et al. |
| 2011/0098615 A1 | 4/2011 | Whalen et al. |
| 2011/0109283 A1 | 5/2011 | Kapels et al. |
| 2011/0112771 A1 | 5/2011 | French |
| 2011/0118089 A1 | 5/2011 | Ellis |
| 2011/0124466 A1 | 5/2011 | Nishimura |
| 2011/0124476 A1 | 5/2011 | Holley |
| 2011/0131005 A1 | 6/2011 | Ueshima et al. |
| 2011/0136627 A1 | 6/2011 | Williams |
| 2011/0143769 A1 | 6/2011 | Jones et al. |
| 2011/0143898 A1 | 6/2011 | Trees |
| 2011/0152037 A1 | 6/2011 | Tsou |
| 2011/0152038 A1 | 6/2011 | Freitag |
| 2011/0152039 A1 | 6/2011 | Hendrickson et al. |
| 2011/0152635 A1 | 6/2011 | Morris et al. |
| 2011/0165995 A1 | 7/2011 | Paulus |
| 2011/0172060 A1 | 7/2011 | Morales et al. |
| 2011/0175744 A1 | 7/2011 | Englert et al. |
| 2011/0181420 A1 | 7/2011 | Mack et al. |
| 2011/0188269 A1 | 8/2011 | Hosotani |
| 2011/0197157 A1 | 8/2011 | Hoffman et al. |
| 2011/0199799 A1 | 8/2011 | Hui et al. |
| 2011/0201481 A1 | 8/2011 | Lo |
| 2011/0202236 A1 | 8/2011 | Galasso et al. |
| 2011/0205164 A1 | 8/2011 | Hansen et al. |
| 2011/0221672 A1 | 9/2011 | Osterhout |
| 2011/0247530 A1 | 10/2011 | Coffman |
| 2011/0252597 A1 | 10/2011 | Burris et al. |
| 2011/0257797 A1 | 10/2011 | Burris et al. |
| 2011/0269517 A1 | 11/2011 | Englert et al. |
| 2011/0269604 A1 | 11/2011 | Tseng |
| 2011/0275482 A1 | 11/2011 | Brodess et al. |
| 2011/0275489 A1 | 11/2011 | Apau |
| 2011/0275499 A1 | 11/2011 | Eschenbach |
| 2011/0281691 A1 | 11/2011 | Ellis |
| 2011/0283188 A1 | 11/2011 | Farrenkopf et al. |
| 2011/0283231 A1 | 11/2011 | Richstein et al. |
| 2011/0308919 A1 | 12/2011 | Hahn |
| 2011/0312473 A1 | 12/2011 | Chu et al. |
| 2011/0319229 A1 | 12/2011 | Corbalis et al. |
| 2012/0004075 A1 | 1/2012 | Kissel et al. |
| 2012/0004080 A1 | 1/2012 | Webb |
| 2012/0010053 A1 | 1/2012 | Bayerlein et al. |
| 2012/0015778 A1 | 1/2012 | Lee et al. |
| 2012/0015779 A1 | 1/2012 | Powch et al. |
| 2012/0015784 A1 | 1/2012 | Reed |
| 2012/0020135 A1 | 1/2012 | McCune |
| 2012/0021873 A1 | 1/2012 | Brunner |
| 2012/0021875 A1 | 1/2012 | Karl |
| 2012/0032896 A1 | 2/2012 | Vesely |
| 2012/0071301 A1 | 3/2012 | Kaylor et al. |
| 2012/0088633 A1 | 4/2012 | Crafton |
| 2012/0088634 A1 | 4/2012 | Heidecke |
| 2012/0088640 A1 | 4/2012 | Wissink |
| 2012/0116684 A1 | 5/2012 | Ingrassia et al. |
| 2012/0132877 A1 | 5/2012 | Wang |
| 2012/0133192 A1 | 5/2012 | Simpson |
| 2012/0165162 A1 | 6/2012 | Lu |
| 2012/0169603 A1 | 7/2012 | Peterson et al. |
| 2012/0174833 A1 | 7/2012 | Early |
| 2012/0178590 A1 | 7/2012 | Lu |
| 2012/0187012 A1 | 7/2012 | TeVault et al. |
| 2012/0190502 A1 | 7/2012 | Paulus et al. |
| 2012/0212505 A1 | 8/2012 | Burroughs et al. |
| 2012/0218184 A1 | 8/2012 | Wissmar |
| 2012/0230504 A1 | 9/2012 | Kuroda |
| 2012/0242774 A1 | 9/2012 | Numano et al. |
| 2012/0248263 A1 | 10/2012 | Grotenhuis |
| 2012/0252580 A1 | 10/2012 | Dugan |
| 2012/0253234 A1 | 10/2012 | Yang et al. |
| 2012/0253489 A1 | 10/2012 | Dugan |
| 2012/0258433 A1 | 10/2012 | Hope et al. |
| 2012/0263892 A1 | 10/2012 | Rodgers |
| 2012/0270705 A1 | 10/2012 | Lo |
| 2012/0271143 A1 | 10/2012 | Aragones et al. |
| 2012/0277040 A1 | 11/2012 | Vincent et al. |
| 2012/0277891 A1 | 11/2012 | Aragones et al. |
| 2012/0293141 A1 | 11/2012 | Zhang et al. |
| 2012/0296455 A1 | 11/2012 | Ohnemus et al. |
| 2012/0298017 A1 | 11/2012 | Chen |
| 2012/0300515 A1 | 11/2012 | Carletti et al. |
| 2012/0319604 A1 | 12/2012 | Walters |
| 2012/0326873 A1 | 12/2012 | Utter, II |
| 2013/0002533 A1 | 1/2013 | Burroughs et al. |
| 2013/0004010 A1 | 1/2013 | Royer |
| 2013/0009993 A1 | 1/2013 | Horseman |
| 2013/0018494 A1 | 1/2013 | Amini |
| 2013/0034671 A1 | 2/2013 | George |
| 2013/0035612 A1 | 2/2013 | Mason et al. |
| 2013/0040783 A1 | 2/2013 | Duda et al. |
| 2013/0041590 A1 | 2/2013 | Burich et al. |
| 2013/0041617 A1 | 2/2013 | Pease et al. |
| 2013/0044521 A1 | 2/2013 | Zhao et al. |
| 2013/0050973 A1 | 2/2013 | Rohrbach |
| 2013/0053222 A1 | 2/2013 | Lo |
| 2013/0053990 A1 | 2/2013 | Ackland |
| 2013/0092647 A1 | 4/2013 | Chen |
| 2013/0095959 A1 | 4/2013 | Marty |
| 2013/0095978 A1 | 4/2013 | Sauter |
| 2013/0130868 A1 | 5/2013 | Hou |
| 2013/0130869 A1 | 5/2013 | Hou |
| 2013/0139736 A1 | 6/2013 | Flaherty |
| 2013/0141235 A1 | 6/2013 | Utter, II |
| 2013/0150214 A1 | 6/2013 | Wu |
| 2013/0154441 A1 | 6/2013 | Redmond |
| 2013/0165297 A1 | 6/2013 | Daly |
| 2013/0172152 A1 | 7/2013 | Watterson |
| 2013/0182781 A1 | 7/2013 | Matsutani |
| 2013/0185003 A1 | 7/2013 | Carbeck et al. |
| 2013/0190136 A1 | 7/2013 | Watterson |
| 2013/0190143 A1 | 7/2013 | Greenhill et al. |
| 2013/0190657 A1 | 7/2013 | Flaction et al. |

(56) References Cited

U.S. PATENT DOCUMENTS

| | | |
|---|---|---|
| 2013/0196821 A1 | 8/2013 | Watterson et al. |
| 2013/0196826 A1 | 8/2013 | Colledge |
| 2013/0196827 A1 | 8/2013 | Chang |
| 2013/0211858 A1 | 8/2013 | Ohnemus et al. |
| 2013/0228063 A1 | 9/2013 | Turner |
| 2013/0228422 A1 | 9/2013 | Mathieu |
| 2013/0231219 A1 | 9/2013 | Huang |
| 2013/0237383 A1 | 9/2013 | Chen |
| 2013/0245966 A1 | 9/2013 | Burroughs et al. |
| 2013/0263418 A1 | 10/2013 | Johnson, Jr. |
| 2013/0267386 A1 | 10/2013 | Her |
| 2013/0274040 A1 | 10/2013 | Coza et al. |
| 2013/0274069 A1 | 10/2013 | Watterson et al. |
| 2013/0274071 A1 | 10/2013 | Wang |
| 2013/0280682 A1 | 10/2013 | Levine et al. |
| 2013/0324368 A1 | 12/2013 | Aragones et al. |
| 2013/0325394 A1 | 12/2013 | Yuen et al. |
| 2013/0338802 A1 | 12/2013 | Winsper et al. |
| 2013/0346043 A1 | 12/2013 | Mewes et al. |
| 2014/0011645 A1 | 1/2014 | Johnson et al. |
| 2014/0026788 A1 | 1/2014 | Kallio, III et al. |
| 2014/0031703 A1 | 1/2014 | Rayner et al. |
| 2014/0039840 A1 | 2/2014 | Yuen et al. |
| 2014/0052280 A1 | 2/2014 | Yuen et al. |
| 2014/0056461 A1 | 2/2014 | Afshar |
| 2014/0073488 A1 | 3/2014 | Wu |
| 2014/0080678 A1 | 3/2014 | Wu |
| 2014/0085077 A1 | 3/2014 | Luna et al. |
| 2014/0100464 A1 | 4/2014 | Kaleal et al. |
| 2014/0102340 A1 | 4/2014 | Kooistra |
| 2014/0121066 A1 | 5/2014 | Huang et al. |
| 2014/0139450 A1 | 5/2014 | Levesque et al. |
| 2014/0156228 A1 | 6/2014 | Molettiere et al. |
| 2014/0187383 A1 | 7/2014 | Martin |
| 2014/0195103 A1 | 7/2014 | Nassef |
| 2014/0221160 A1 | 8/2014 | Hardy et al. |
| 2014/0222173 A1 | 8/2014 | Giedwoyn et al. |
| 2014/0265690 A1 | 9/2014 | Henderson |
| 2014/0270375 A1 | 9/2014 | Canavan et al. |
| 2014/0274564 A1 | 9/2014 | Greenbaum |
| 2014/0274579 A1 | 9/2014 | Olson |
| 2014/0358473 A1 | 12/2014 | Goel et al. |
| 2014/0360413 A1 | 12/2014 | Schenk |
| 2015/0001048 A1 | 1/2015 | Koppes et al. |
| 2015/0003621 A1 | 1/2015 | Trammell |
| 2015/0004579 A1 | 1/2015 | Shelton |
| 2015/0016623 A1 | 1/2015 | Trammell |
| 2015/0044648 A1 | 2/2015 | White et al. |
| 2015/0048807 A1 | 2/2015 | Fan et al. |
| 2015/0065273 A1 | 3/2015 | Lake |
| 2015/0065301 A1 | 3/2015 | Oteman |
| 2015/0105220 A1 | 4/2015 | Hong |
| 2015/0192929 A1 | 7/2015 | Rihn et al. |
| 2015/0199494 A1 | 7/2015 | Koduri et al. |
| 2015/0201722 A1 | 7/2015 | Brouard |
| 2015/0202487 A1 | 7/2015 | Wu |
| 2015/0209610 A1 | 7/2015 | Dalebout et al. |
| 2015/0209617 A1 | 7/2015 | Hsiao |
| 2015/0246751 A1 | 9/2015 | Spivack et al. |
| 2015/0250304 A1 | 9/2015 | Dalebout |
| 2015/0251047 A1 | 9/2015 | Maanitty |
| 2015/0251048 A1 | 9/2015 | Dalebout |
| 2015/0251055 A1 | 9/2015 | Ashby |
| 2015/0253210 A1 | 9/2015 | Ashby et al. |
| 2015/0265903 A1 | 9/2015 | Kolen et al. |
| 2015/0295397 A1 | 10/2015 | Lin et al. |
| 2015/0314184 A1 | 11/2015 | Moya Saez |
| 2015/0346994 A1 | 12/2015 | Chanyontpatanakul |
| 2015/0352396 A1 | 12/2015 | Dalebout |
| 2015/0352401 A1 | 12/2015 | Johnson |
| 2015/0352402 A1 | 12/2015 | Arnold et al. |
| 2015/0367158 A1 | 12/2015 | Pretz et al. |
| 2015/0367176 A1 | 12/2015 | Bejestan et al. |
| 2016/0008650 A1 | 1/2016 | Jue et al. |
| 2016/0016035 A1 | 1/2016 | Hao |
| 2016/0027325 A1 | 1/2016 | Malhotra |
| 2016/0038785 A1 | 2/2016 | Netter |
| 2016/0047446 A1 | 2/2016 | Hung |
| 2016/0066818 A1 | 3/2016 | Cowley et al. |
| 2016/0096064 A1 | 4/2016 | Gatti |
| 2016/0121161 A1 | 5/2016 | Mountain |
| 2016/0193518 A1 | 7/2016 | Baxter |
| 2016/0211841 A1 | 7/2016 | Harrison |
| 2016/0219968 A1 | 8/2016 | Martin |
| 2016/0263426 A1 | 9/2016 | Mueller et al. |
| 2016/0303421 A1 | 10/2016 | Tyger et al. |
| 2016/0317861 A1 | 11/2016 | Dalebout |
| 2016/0367851 A1 | 12/2016 | Astilean et al. |
| 2017/0056726 A1 | 3/2017 | Dalebout et al. |
| 2017/0068782 A1 | 3/2017 | Pillai et al. |
| 2017/0113093 A1 | 4/2017 | Bellavista et al. |
| 2017/0120102 A1 | 5/2017 | Chen |
| 2017/0128784 A1 | 5/2017 | Molins et al. |
| 2017/0136280 A1 | 5/2017 | Lee |
| 2017/0136288 A1 | 5/2017 | Huang |
| 2017/0136289 A1 | 5/2017 | Frank |
| 2017/0136291 A1 | 5/2017 | Huang |
| 2017/0136339 A1 | 5/2017 | Habiche |
| 2017/0165523 A1 | 6/2017 | Chou |
| 2017/0189745 A1 | 7/2017 | Hamilton et al. |
| 2017/0216660 A1 | 8/2017 | Lernihan |
| 2017/0266483 A1 | 9/2017 | Dalebout et al. |
| 2017/0266532 A1 | 9/2017 | Watterson |
| 2017/0266533 A1 | 9/2017 | Dalebout |
| 2017/0266534 A1 | 9/2017 | Watterson |
| 2017/0266535 A1 | 9/2017 | Watterson |
| 2017/0274242 A1 | 9/2017 | Corbalis |
| 2017/0326411 A1 | 11/2017 | Watterson |
| 2017/0340917 A1 | 11/2017 | Chang |
| 2017/0368442 A1 | 12/2017 | Baudhuin |
| 2018/0001135 A1 | 1/2018 | Powell |
| 2018/0036585 A1 | 2/2018 | Powell |
| 2018/0056111 A1 | 3/2018 | Chiang et al. |
| 2018/0092603 A1 | 4/2018 | Duan et al. |
| 2018/0099179 A1 | 4/2018 | Chatterton et al. |
| 2018/0099180 A1 | 4/2018 | Wilkinson |
| 2018/0099181 A1 | 4/2018 | Powell et al. |
| 2018/0104533 A1 | 4/2018 | Powell et al. |
| 2018/0111018 A1 | 4/2018 | Lee |
| 2018/0117385 A1 | 5/2018 | Watterson et al. |
| 2018/0117388 A1 | 5/2018 | Porter |
| 2018/0117419 A1 | 5/2018 | Jackson |
| 2018/0147440 A1 | 5/2018 | Lin |
| 2018/0154205 A1 | 6/2018 | Watterson |
| 2018/0154208 A1 | 6/2018 | Powell et al. |

* cited by examiner

COOLING AN EXERCISE DEVICE DURING A DIVE MOTOR RUNWAY CONDITION

RELATED APPLICATIONS

This application is a continuation-in-part of U.S. patent application Ser. No. 15/730,516 filed on Oct. 11, 2017 and titled "Systems and Methods for Reducing Runaway Resistance on an Exercise Device, which is incorporated herein by reference in its entirety and which claims priority to and the benefit of U.S. Provisional Patent Application Ser. No. 62/407,073, filed Oct. 12, 2016, entitled "Systems and Methods for Reducing Runaway Resistance on an Exercise Device", which is also herein incorporated by reference for all that it contains.

BACKGROUND

Aerobic exercise is a popular form of exercise that improves one's cardiovascular health by reducing blood pressure and providing other benefits to the human body. Aerobic exercise generally involves low intensity physical exertion over a long duration of time. Typically, the human body can adequately supply enough oxygen to meet the body's demands at the intensity levels involved with aerobic exercise. Popular forms of aerobic exercise include running, jogging, swimming, and cycling, among other activities. In contrast, anaerobic exercise typically involves high intensity exercises over a short duration of time. Popular forms of anaerobic exercise include strength training and short distance running.

Many people choose to perform aerobic exercises indoors, such as in a gym or in their home. Often, a user will use an aerobic exercise machine to perform an aerobic workout indoors. One type of aerobic exercise machine is a treadmill, which is a machine that has a running deck attached to a support frame. The running deck can support the weight of a person using the machine. The running deck incorporates a conveyor belt that is driven by a motor. A user can run or walk in place on the conveyor belt by running or walking at the conveyor belt's speed. The speed and other operations of the treadmill are generally controlled through a control module that is also attached to the support frame and within convenient reach of the user. The control module can include a display, buttons for increasing or decreasing a speed of the conveyor belt, controls for adjusting a tilt angle of the running deck, or other controls. Other popular exercise machines that allow a user to perform aerobic exercises indoors include elliptical trainers, rowing machines, stepper machines, and stationary bikes, to name a few.

One type of treadmill is disclosed in U.S. Pat. No. 6,042,513 issued to John Koteles, et al. In this reference, a runaway protection mechanism is provided for use in, for example, an exercise treadmill for driving its moving treadmill belt. According to Koteles, an electric motor is connected to an electric power source, such as an alternating-current wall outlet. The runaway protection mechanism includes a disconnect mechanism for disconnecting the motor from the electric power source and thereby de-energizing the motor during a runaway condition. The runaway protection mechanism further includes a safety mechanism for comparing the actual motor speed with a desired motor speed and activating the disconnect mechanism when the actual speed exceeds the desired speed by a predetermined amount.

SUMMARY

In one embodiment, a treadmill includes a deck, a first pulley incorporated into the deck, a second pulley incorporated into the deck, a tread belt surrounding the first pulley and the second pulley, a drive motor in mechanical communication with at least one of the first pulley and the second pulley to move the tread belt in a first direction, and a runaway load component in electrical communication with the drive motor. The runaway load component draws electrical power generated by the drive motor during a runaway motor condition.

The motor runaway condition can be induced when a user moves the tread belt with a force that is greater than the force outputted by the motor.

The motor runaway condition can exist when a user moves the tread belt at a force that is greater than the force outputted by the motor when an incline angle of the deck exceeds a threshold angle.

The runaway load component can turn on during a motor runaway condition.

The runaway load component can be a dump resistor.

The runaway load component can be located in a housing that contains the drive motor.

The runaway load component can be a cooling fan.

The cooling fan can be positioned to direct an airflow towards the drive motor.

The cooling fan can be located adjacent to a lift motor that controls an elevation for a portion of the deck.

The cooling fan can be positioned to cool a housing that contains the drive motor.

The cooling fan can be positioned to direct an airflow over a dump resistor.

In one embodiment, a treadmill includes a deck, a first pulley incorporated into the deck, a second pulley incorporated into the deck, a tread belt surrounding the first pulley and the second pulley, a drive motor in mechanical communication with at least one of the first pulley and the second pulley to move the tread belt in a first direction, and a cooling fan in electrical communication with the drive motor. The cooling fan draws electrical power generated by the drive motor during a runaway motor condition.

The motor runaway condition can be induced when a user moves the tread belt with a force that is greater than the force that is outputted by the motor.

The motor runaway condition can exist when a user moves the tread belt at a force that is greater than the force that is outputted by the motor when an incline angle of the deck exceeds a threshold angle.

The cooling fan can be positioned to direct an airflow towards the drive motor.

The cooling fan can be located adjacent to a lift motor that controls an elevation for a portion of the deck.

The cooling fan can be positioned to cool a housing that contains the drive motor.

The cooling fan can be positioned to direct an airflow over a dump resistor.

In an embodiment, a treadmill includes a deck, a first pulley incorporated into the deck, a second pulley incorporated into the deck, a tread belt surrounding the first pulley and the second pulley, a housing incorporated into the deck, a drive motor disposed within the housing and in mechanical communication with at least one of the first pulley and the second pulley to move the tread belt in a first direction, a dump resistor in electrical communication with the drive motor, and a cooling fan disposed within the housing and in electrical communication with the drive motor. The cooling fan draws electrical power generated by the drive motor during a runaway motor condition. The dump resistor also draws power from the drive motor during the runaway motor condition. The motor runaway condition exists the user moves the tread belt at the force that is greater than that which is outputted with the motor when an incline angle of the deck exceeds a threshold angle.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse the object's length. For the purposes of this disclosure, an "output speed" generally refers to a speed of the motor's drive shaft that correlates to the amount of electricity supplied to the motor. Such an output speed can be affected, but not controlled, by the mechanical load on the motor because the amount of electricity supplied to the motor can varying depending on the motor's mechanical load. Additionally, for the purposes of this disclosure, the term "runaway" generally refers to instances where the drive shaft operates at an actual speed that is inconsistent the motor's output speed. Examples of runaway motor condition include where drive shaft is turned in reverse, the drive shaft rotates at a speed faster than the output speed, other conditions, or combinations thereof.

Further, for the purposes of this disclosure, the term "runaway mitigation" can generally refer to at least bringing the output speed and the actual speed of the drive shaft into closer alignment. In some cases, a runaway mitigation mechanism increases a mechanical load on the motor. Under some conditions, the runaway condition causes the electrical motor to generate electricity. For purposes of this disclosure, the term "runaway load component" is a component that is in electrical communication with the motor and draws on the power generated by the motor, at times during a runaway condition, not the power source that provided electrical power to the motor. In some cases, the runaway load component is a cooling fan.

Figure 1:
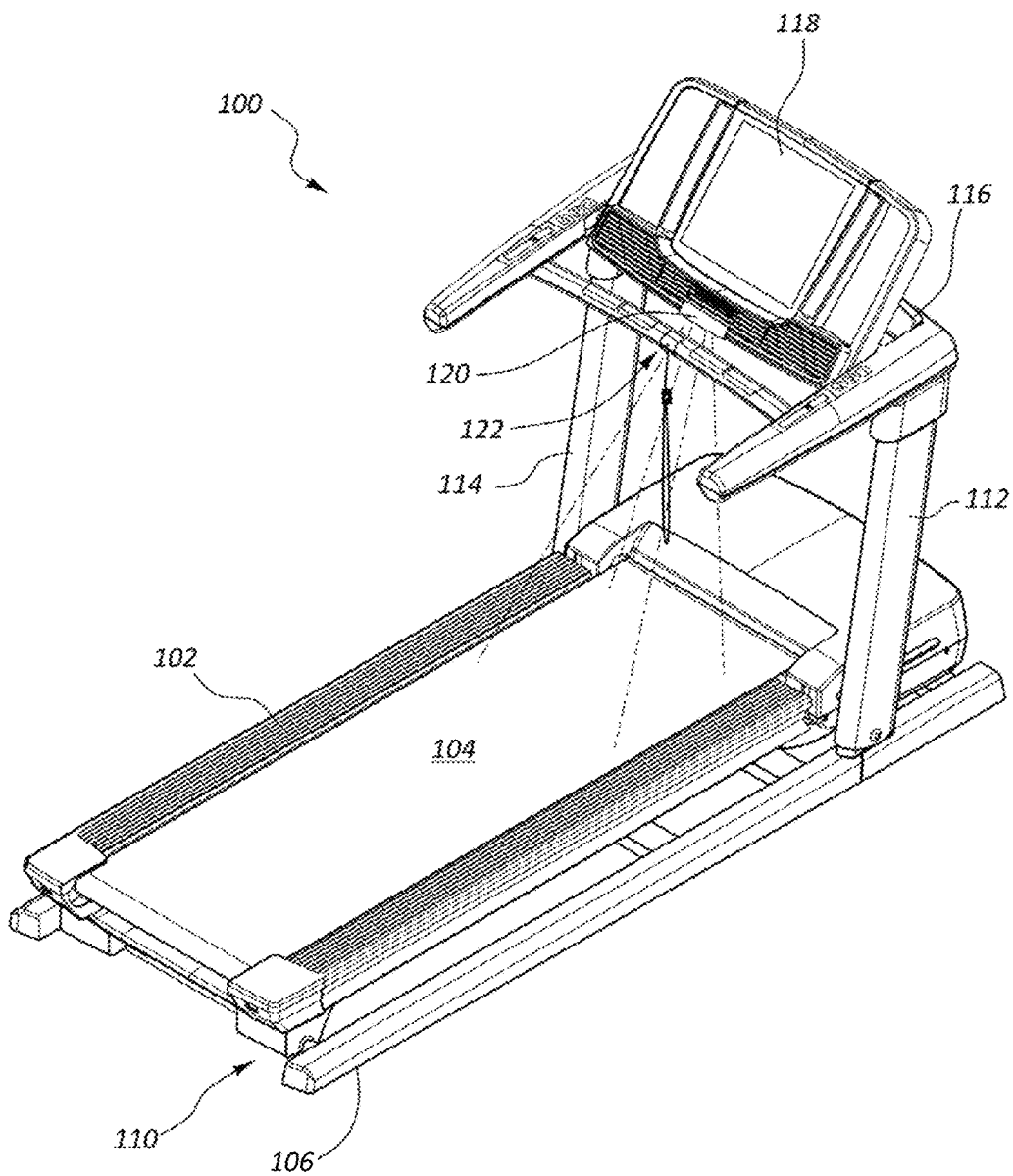
FIG. 1 depicts an example of a treadmill in accordance with aspects of the present disclosure.

FIG. 1 depicts an example of a treadmill 100 having a deck 102 with a first pulley disposed in a front portion of the deck 102 and a second pulley incorporated into a rear portion of the deck 102. A tread belt 104 surrounds the first pulley and the second pulley. A motor is in mechanical communication with either the first pulley or the second pulley. A motor (not shown) drives the tread belt 104. With the deck 102 oriented in a substantially horizontal position, a user's body weight pushes the underside of the tread belt 104 into the deck's upper surface, which generates an amount of friction between the belt and the deck, which increases the load on the motor. Additionally, the tread belt carries the portion of the user's weight along the length of the deck as the motor operates, which also increases the load on the motor.

The rear portion of the deck 102 is attached to a base member 106 of the treadmill's frame 108. A pivot connection 110 between the rear portion of the deck 102 and the base member 106 allows the front portion of the deck 102 to incline upwards or decline downwards. When the deck 102 inclines or declines, the base member 106 remains stationary.

A first side post 112 is attached to a first side of the base member 106, and a second side post 114 is attached to a second side of the base member 106. In the example depicted in FIG. 1, the first side post 112 and the second side post 114 also remain stationary as the deck 102 inclines and/or declines. The first side post 112 and the second side post 114 collectively support a console 116. The console 116 includes a display 118 and an input mechanism 120 for controlling the deck's incline angle.

Figure 2:
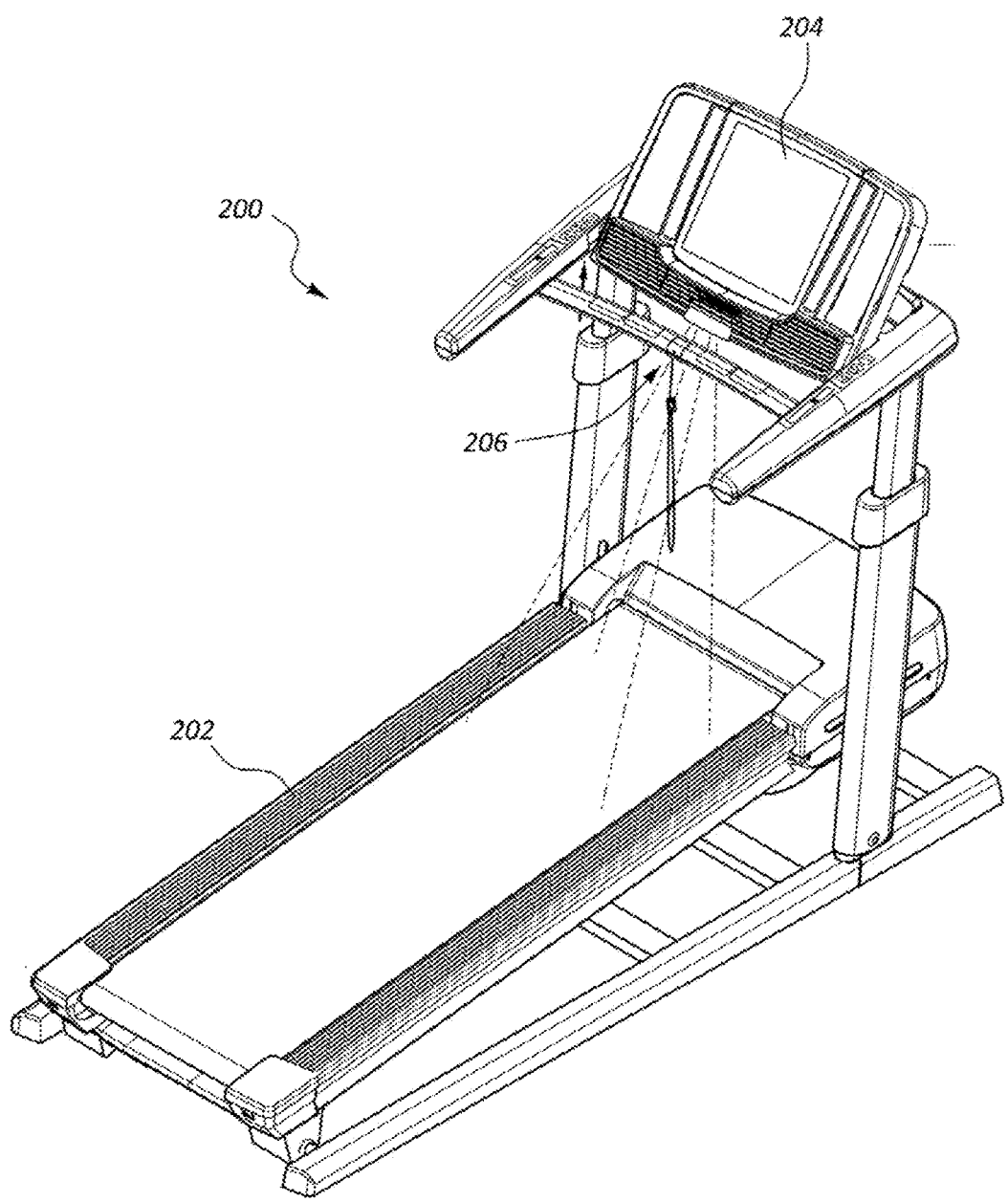
FIG. 2 depicts an example of a treadmill in accordance with aspects of the present disclosure.

FIG. 2 depicts an example of a treadmill 200. In this example, the deck 202 is inclined so that the front portion of the deck 202 is elevated. At this inclined angle, the user can perform an exercise on the deck 202. At the inclined angle, gravity pulls on the user's mass, which offsets at least some of the mechanical load on the motor for driving the tread belt as the user pushes against the tread belt during the performance of an exercise. Often, the power supplied to the motor is reduced accordingly to slow the tread belt and keep the tread belt traveling at the desired, consistent speed. Under these conditions, the tread belt is still traveling at the output speed that is consistent with the amount of electricity supplied to the motor because the amount of electricity supplied is reduced to be consistent with the reduced mechanical load. At some angles, the user's body weight applies a force sufficiently large that the motor receives a minimal amount of electrical power to keep the tread belt operating at the output speed.

However, in some circumstances, the summation of the angle of the deck, the weight of the user, the friction between the tread belt and the deck, other factors, or combinations thereof cause the drive shaft's motor to rotate at a faster speed than the output speed of the motor. This condition can be referred to as a runaway condition. While this example is described as a runaway condition, in other case, the runaway condition can be caused by a different set of circumstances.

The runaway condition can cause the motor to generate electrical power and/or cause damage to the motor or other components of the treadmill.

Figure 3:
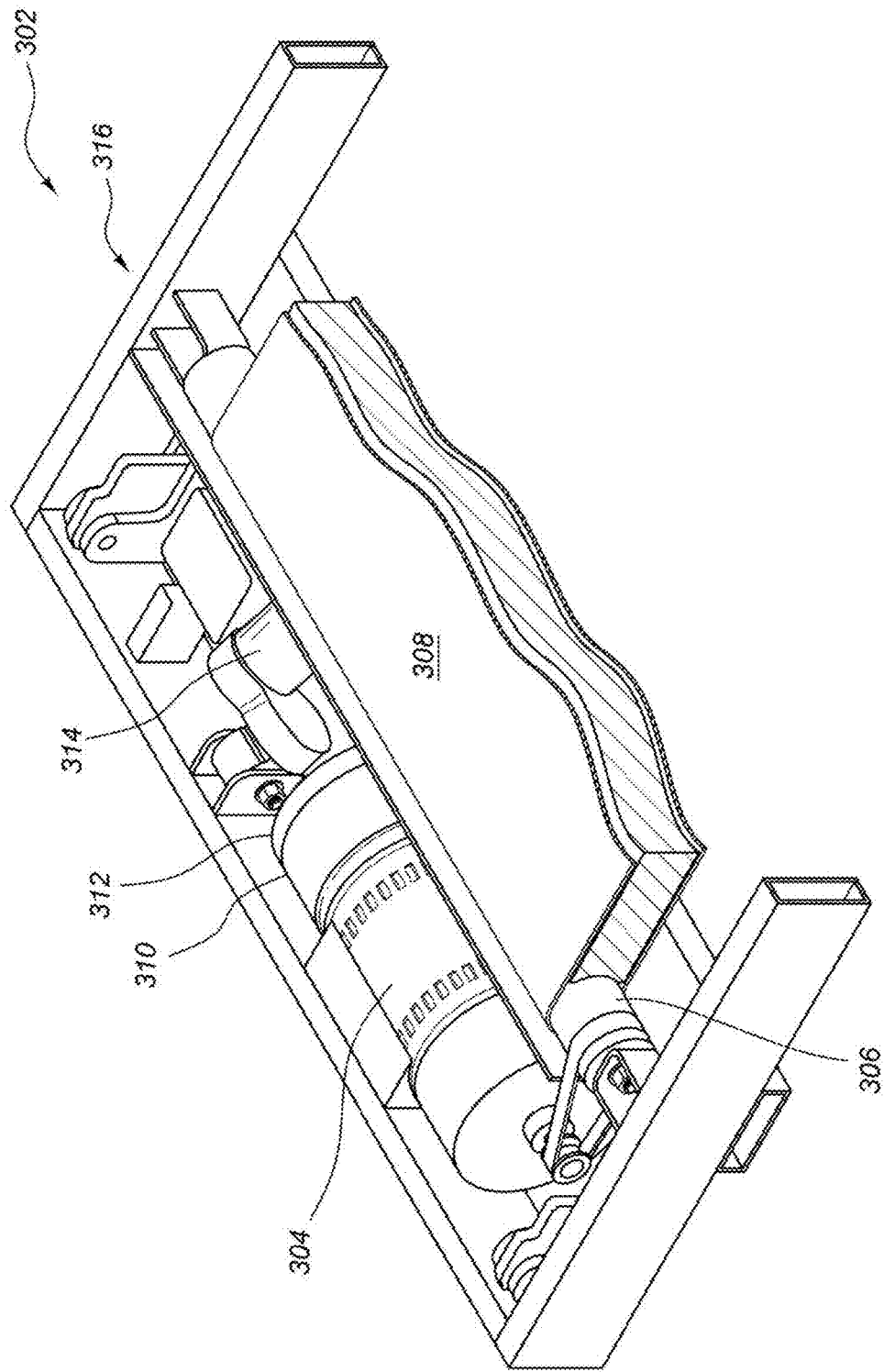
FIG. 3 depicts a partial cut-away view of an example of a treadmill motor in accordance with aspects of the present disclosure.

FIG. 3 illustrates an example of a treadmill 302 with a portion of the housing removed for illustrative purposes. Inside the housing, a drive motor 304 is disposed adjacent to a pulley 306 that moves the tread belt 308 in a rotational direction. The drive motor 304 is attached to the pulley 306 with a drive shaft. A power supply (not shown) supplies power to the motor to drive the rotation of the drive shaft. The power supply can be an external source, such as an alternating current system incorporated into a residence or other building, a generator, an alternative power source, another type power source, or combinations thereof. In some instances, the power supply can be internal to the housing and/or treadmill 302. Attached to and coaxial with the drive motor 304 is a flywheel 310. The flywheel 310 rotates with the drive motor 304.

A lift motor 314 is connected to the deck 316 and also to the base frame (not shown) of the treadmill. When activated, the lift motor 314 causes a rod to extend downward, which pushes against the front portion of the deck and the base frame causing the front portion of the deck to raise. In other situations, when the lift motor 314 is activated, the rod is retracted, which causes the front portion of the deck to lower. In these cases, the lift motor 314 can be transversely oriented with respect to the fan assembly 312. While this example has been described as having a lift motor as part of a system for inclining the deck, any appropriate mechanism can be used to incline the deck.

Figure 4:
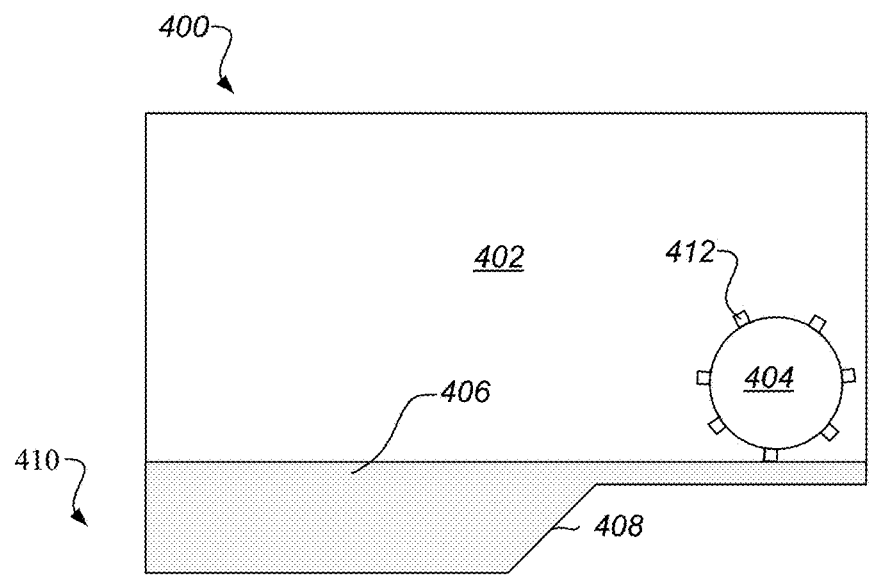
FIG. 4 depicts an example of a runaway mitigation mechanism in accordance with aspects of the present disclosure.

FIG. 4 depicts an example of a runaway mitigation mechanism 400. In this example, the runaway mitigation mechanism 400 includes a container 402 and a portion of the drive shaft 404 is partially disposed within the container 402. The container 402 includes a fluid 406, such as an oil-based or other viscous fluid. In some cases, the container 402 moves with the deck. When the deck is in a level orientation, the container is held at a corresponding orientation. On the other hand, when the deck is inclined at an angle, the container 402 is held in a tilted orientation.

In the level orientation, the fluid 406 resides under the drive shaft 404 without making contact with the drive shaft 404. In the illustrated example, the container 402 includes a trough 408 defined in the far portion 410 of the container 402 where the fluid 406 can pool away from the drive shaft 404. In alternative embodiments, no trough is included.

In the illustrated example, at least one vane 412 is attached to the drive shaft 404. While this example has been depicted with a vane, any appropriate number or shape of vanes can be incorporated into the drive shaft 404.

Figure 5:
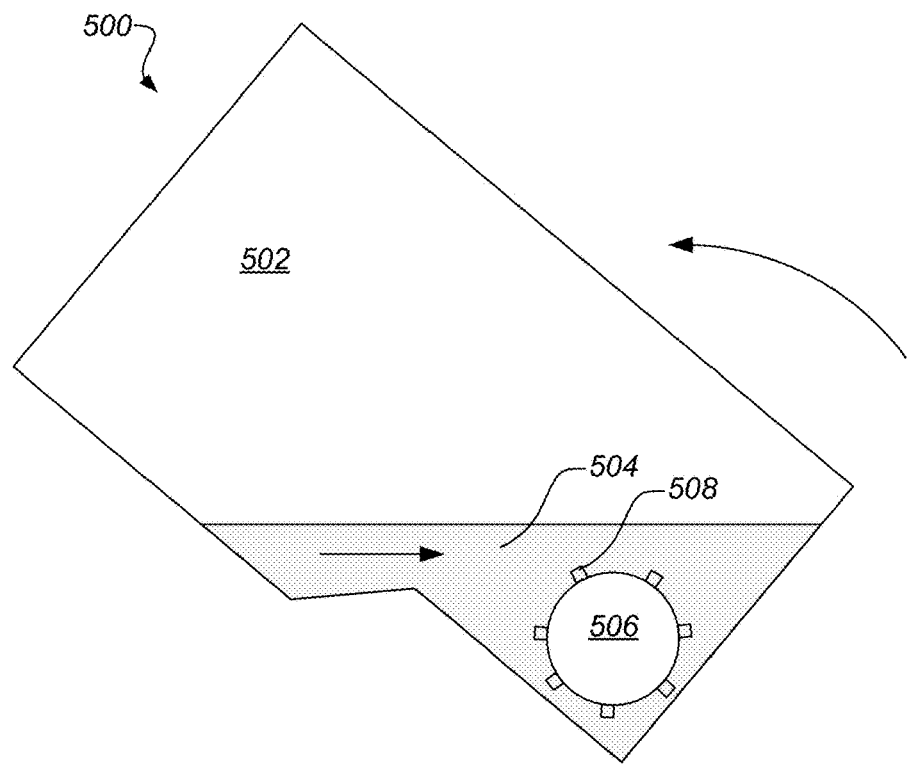
FIG. 5 depicts an example of a runaway mitigation mechanism in accordance with aspects of the present disclosure.

FIG. 5 depicts an example of a runaway mitigation mechanism 500 where the container 502 is oriented in a tilted orientation. With the container 502 in a tilted orientation, the fluid 504 pools in the proximity of the drive shaft 506 so that the fluid 504 is in contact with the drive shaft 506. In the illustrated example, the drive shaft 506 is immersed in the fluid 504 so that an entire circumference of the drive shaft 506 is in contact with the fluid 504. In some examples, the contact with the drive shaft 506 resists rotation of the drive shaft 506. In some cases, the viscosity of the fluid 504 resists the movement of the vanes 508.

Figure 6:
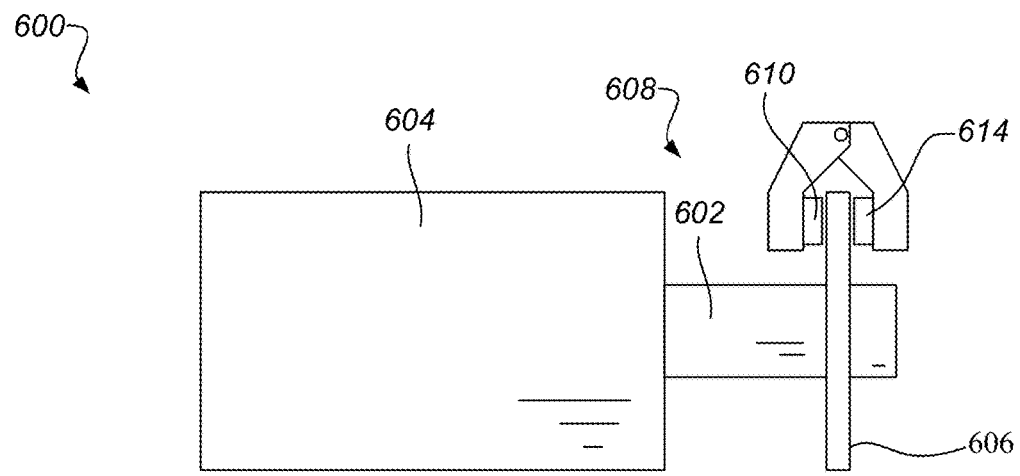
FIG. 6 depicts an example of a runaway mitigation mechanism in accordance with aspects of the present disclosure.

FIG. 6 depicts an example of a runaway mitigation mechanism 600. In this example, a drive shaft 602 extends beyond a motor casing 604, and a rotary disc 606 is rigidly attached to the drive shaft 602. A compression brake 608 is positioned adjacent to the rotary disc 606. The compression brake 608 includes a first pad 610 adjacent a first side of the rotary disc 606, and a second pad 614 adjacent a second side of the rotary disc 606. When activated, the first pad 610 and the second pad 614 move towards the rotary disc 606 simultaneously and apply a compressive load to the rotary disc 606 which resists rotational movement of the rotary disc 606. This increases the mechanical load on the motor 606 because of the increased resistance to rotate the drive shaft 602. Under certain conditions, the compression brake 608 applies a compressive load that is sufficient to prevent the rotary disc 606, and therefore the drive shaft 602, from rotating at all. Under other conditions, the compression brake 608 can apply a compressive load that merely increases the resistance to the rotational movement of the rotary disc 606, but is not sufficient to stop the drive shaft 602 from rotating. When a runaway condition is sensed or at least determined to exist, the compression brake 608 can be activated to increase the mechanical resistance to the motor to at least mitigate the runaway condition.

Figure 7:
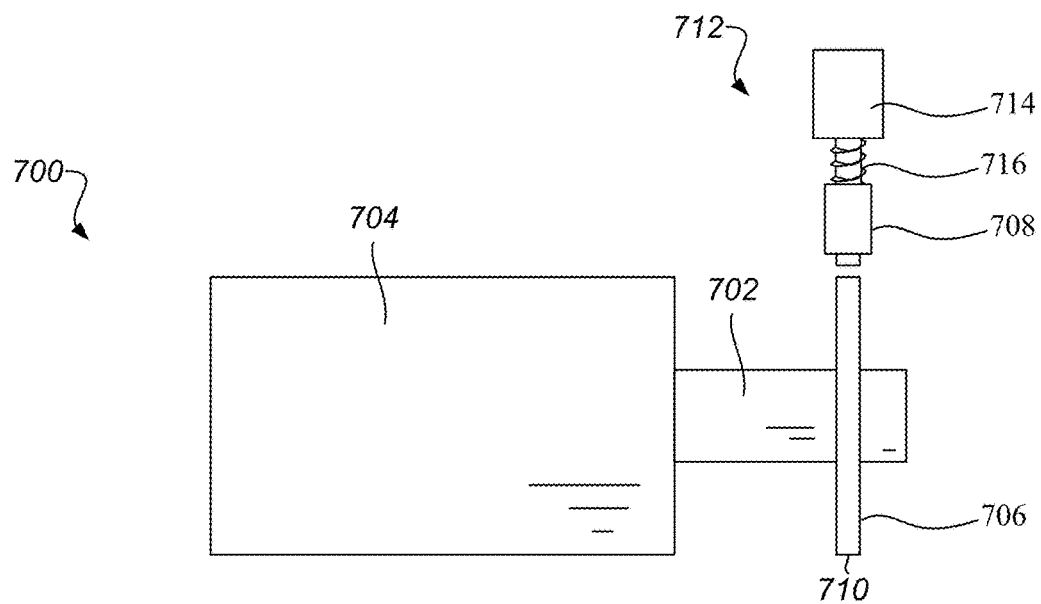
FIG. 7 depicts an example of a runaway mitigation mechanism in accordance with aspects of the present disclosure.

FIG. 7 depicts an example of a runaway mitigation mechanism 700. In this example, a drive shaft 702 extends beyond a motor casing 704, and a rotary disc 706 is rigidly attached to the drive shaft 702. In the illustrated example, the rotary disc 706 includes at least some magnetically conductive material. A magnetic unit 708 is positioned adjacent to the rim 710 of the rotary disc 706. The magnetic unit 708 can apply a magnetic force on the rotary disc 706 that resists movement of the rotary disc 706 and therefore movement of the drive shaft 702.

The magnetic unit 708 is positionable with a linear actuator 712. The linear actuator 712 includes an actuator motor 714 and a screw rod 716. As the motor operates in a first direction, the screw rod 716 moves the magnetic unit 708 in a direction towards the rotary disc 706. As the motor operates in a second direction, the screw rod 716 moves the magnetic unit 708 in another direction away from the rotary disc 706. As the magnetic unit 708 approaches the rotary disc 706, the magnetic load applied to the rotary disc 706 increases so that more resistance is applied to the rotary disc's movement and mechanical resistance on the motor increases. As the magnetic unit 708 moves away from the rotary disc 706, the magnetic load on the rotary disc 706 decreases, which lowers mechanical resistance on the motor. In alternative embodiments, the magnetic unit is an electromagnet that produces a magnetic field that is proportional to the power supplied to the magnetic unit. In this example, the magnetic strength applied to the rotary disc is adjustable by varying the power to the magnetic unit.

Figure 8:
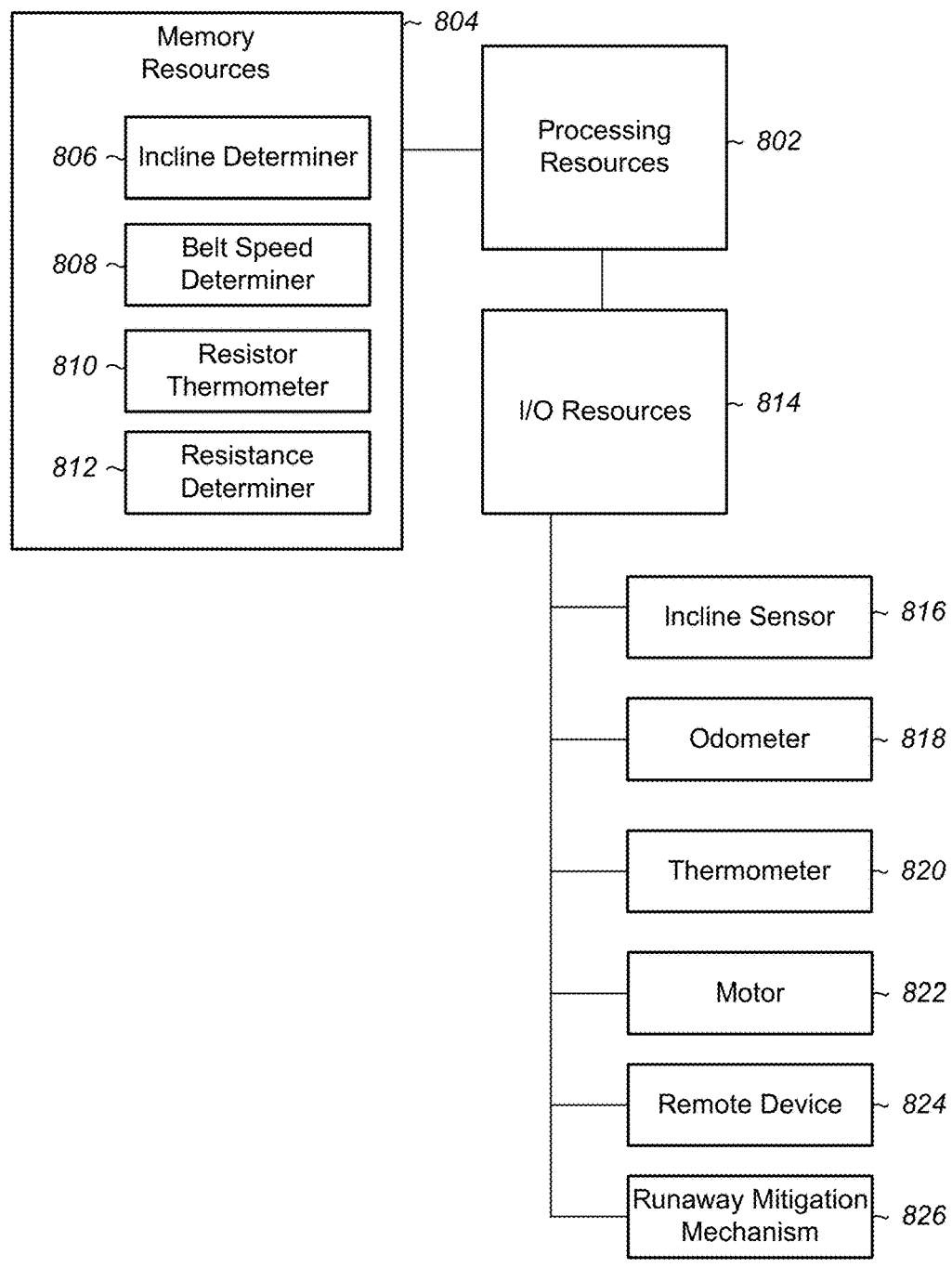
FIG. 8 depicts a block diagram of an example of a runaway mitigation system in accordance with aspects of the present disclosure.

FIG. 8 illustrates a perspective view of an example of a runaway mitigation system 800 in accordance with the present disclosure. The runaway mitigation system 800 can include a combination of hardware and programmed instructions for executing the functions of the runaway mitigation system 800. In this example, the runaway mitigation system 800 includes processing resources 802 that are in communication with memory resources 804. Processing resources 802 include at least one processor and other resources used to process the programmed instructions. The memory resources 804 represent generally any memory capable of storing data such as programmed instructions or data structures used by the runaway mitigation system 800. The programmed instructions and data structures shown stored in the memory resources 804 include an incline determiner 806, a belt speed determiner 808, a resistor thermometer 810, and a resistance determiner 812.

Input/output (I/O) resources 814 are in communication with the processing resources 802. The I/O resources 814 can include any appropriate type of mechanism for communicating with remote devices. For example, the I/O resources 814 can include a transmitter, a wireless transmitter, a receiver, a transceiver, a port for receiving an external memory, a network interface, another I/O resource, or combinations thereof.

The I/O resources can be in communication with any appropriate device. In the illustrated example, the I/O resources 814 are in communication with an incline sensor 816, an odometer 818, a thermometer 820, a motor 822, another remote device 824, a runaway mitigation mechanism 826, or combinations thereof. These remote devices can be located on the treadmill, can be independent of the treadmill, can be in communication with the I/O resources over a network, can be part of a wearable device, or combinations thereof.

Figure 9:
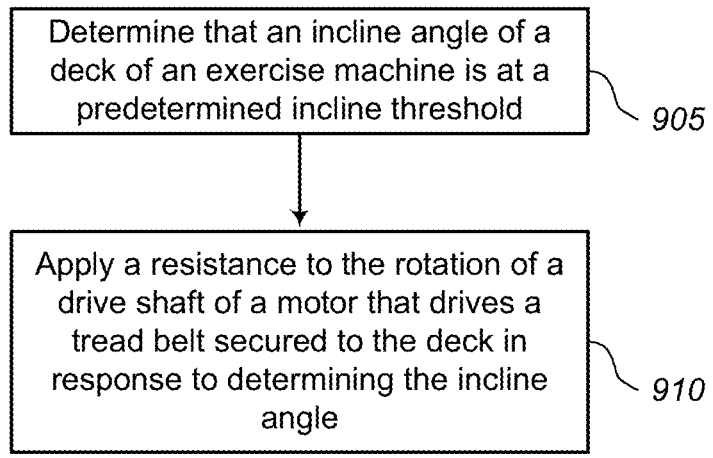
FIG. 9 depicts an example of a method for mitigating runaway on a treadmill motor in accordance with aspects of the present disclosure.

FIG. 9 shows a flowchart illustrating a method 900 for mitigating a runaway condition. The operations of method 900 can be implemented by a runaway mitigation system or its components as described herein. In some examples, a runaway mitigation system can execute a set of codes to control the functional elements of the device to perform the functions described below. Additionally or alternatively, the runaway mitigation system can perform aspects the functions described below using special-purpose hardware. At block 905, an incline angle of the deck of an exercise machine is determined to be at a predetermined incline threshold. At block 910, a resistance is applied to the rotation of a drive shaft of a motor that drives a tread belt secured to the deck in response to determining the incline angle.

Figure 10:
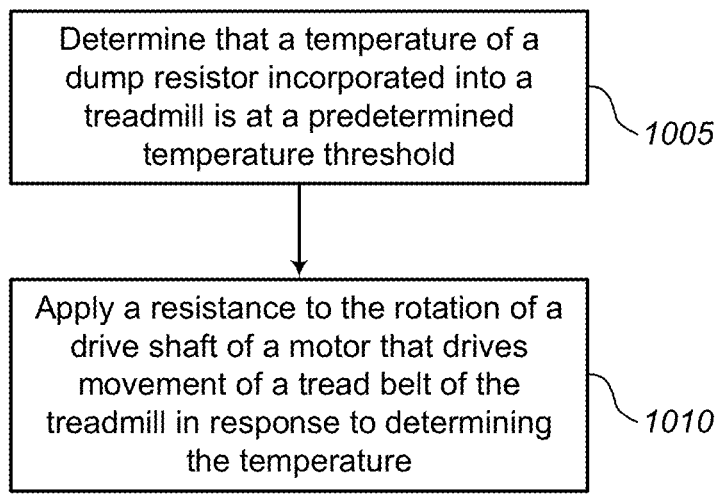
FIG. 10 depicts an example of a method for mitigating runaway on a treadmill motor in accordance with aspects of the present disclosure.

FIG. 10 shows a flowchart illustrating a method 1000 for mitigating a runaway condition. The operations of method 1000 can be implemented by a runaway mitigation system or its components as described herein. In some examples, a runaway mitigation system can execute a set of codes to control the functional elements of the device to perform the functions described below. Additionally or alternatively, the runaway mitigation system can perform aspects the functions described below using special-purpose hardware. At block 1005, a temperature of a dump resistor incorporated into a treadmill is determined to be at a predetermined temperature threshold. At block 1010, a resistance is applied to the rotation of a drive shaft of a motor that drives movement of a tread belt of the treadmill in response to determining the temperature.

Figure 11:
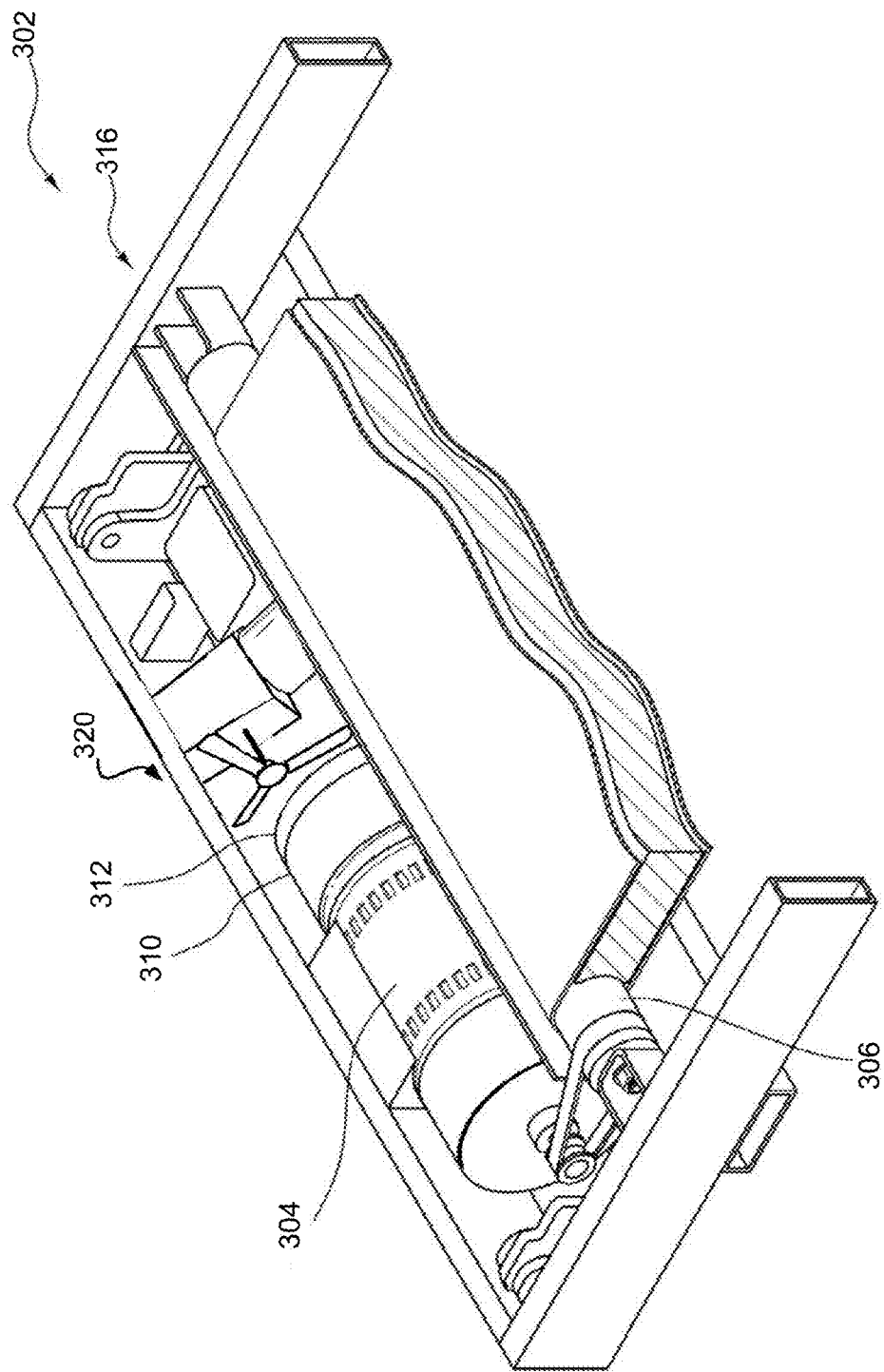
FIG. 11 depicts an example of a treadmill motor in accordance with aspects of the present disclosure.

FIG. 11 depicts an example of a treadmill 302 with a portion of the housing removed for illustrative purposes. Inside the housing, a drive motor 304 is disposed adjacent to a pulley 306 that moves the tread belt 308 in a rotational direction. The drive motor 304 is attached to the pulley 306 with a drive shaft. A power supply (not shown) supplies power to the drive motor 304 to drive the rotation of the drive shaft. Attached to and coaxial with the drive motor 304 is a flywheel 310. The flywheel 310 rotates with the drive motor 304. A lift motor 314 is connected to the deck 316 and also to the base frame (not shown) of the treadmill. A cooling fan 320 is located within the housing and is adjacent to the drive motor 304 and flywheel 310. The cooling fan 320 is positioned to direct an airflow over the drive motor 304 and or lift motor.

Figure 12:
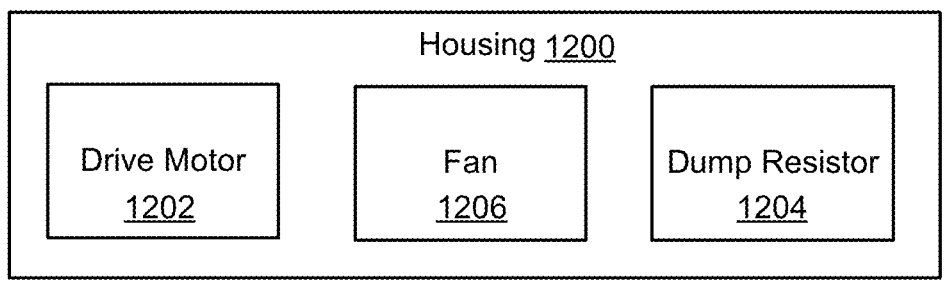
FIG. 12 depicts an example of a housing in accordance with aspects of the present disclosure.

FIG. 12 depicts an example of a housing 1200 incorporated into a treadmill deck. The housing 1200 includes a drive motor 1202, a dump resistor 1204, and a cooling fan 1206. During a runaway motor condition, the dump resistor 1204 and the cooling fan 1206 can both draw on the electrical power generated by the drive motor 1202. As a result, the dump resistor 1204 and the cooling fan 1206 can dissipate the electrical power generated by the drive motor 1202.

General Description

In general, the systems and methods disclosed herein can provide users with an exercise machine that mitigates the effects of motor runaway. Not all commercial treadmills experience motor runaway due to a deck incline angle. However, in some cases where the treadmill deck inclines at a steeper angle than the industry's conventional treadmills do, the mechanical load on the treadmill motor can drop to a point where the motor that drives the tread belt experiences a runaway condition. In some situations, a runaway condition can result in the motor producing electricity. This electricity has to be directed somewhere, and in some cases, the runaway electricity is directed to a dump resistor where the excess electricity is converted to heat. This excess heat can raise the temperature of other components in the treadmill, which can reduce their useful life.

The load on the motor can be affected by multiple factors, such as the weight of the user, the angle of the deck, the friction between the tread belt and the deck's platform, the friction of the pulleys, the weight of the pulleys, the weight of the tread belt, other factors, or combinations thereof. When the angle of the treadmill's deck is substantially horizontal, the tread belt moves the user along the length of the deck. As the angle of the deck inclines, the user's mass interacts with gravity and pushes down on the tread belt as the user performs an exercise. For example, as the user applies a load on the tread belt when he or she pushes off of the tread belt during a walking or running exercise, the leg applies a downward force on the tread belt which helps move the tread belt along in the same direction that the motor is driving the tread belt. The amount of force that contributes to the movement of the tread belt from the user depends in part on how hard the user applies the force and also the steepness of the incline angle. As a general rule, the steeper the incline angle, the more force that the user applies due to gravity pulling on the user. The weight of the user also affects the load to the tread belt as a heavier user can apply a greater load to the tread belt.

With the load applied by the user's weight moving the tread belt, at least in part, the electrical load on the motor can be reduced to keep the tread belt moving at the desired speed. In some cases, the weight of the user can cause the tread belt to move faster than the speed that the motor would otherwise run given the power load and the angle. In these cases, the motor can generate electricity as part of a runaway condition.

A runaway mitigation mechanism can apply an increased load on the motor, which can result in mitigating and/or eliminating the runaway condition. When mitigating the runaway condition, the amount of electricity produced by the motor can be reduced or entirely eliminated.

The treadmill can include a frame, a deck attached to the frame, and a tread belt incorporated into the deck. The frame can include a base portion that supports the deck on a support surface, such as a floor. A front pulley can be connected to a front portion of the deck, and a rear pulley can be connected to a rear portion of the deck. A tread belt surrounds the front pulley and the second pulley. A motor can drive either the front pulley or the rear pulley and cause the tread belt to move along a surface of the deck. The speed of the tread belt can be adjustable based on the motor's output. In some cases, the user can select the tread belt's speed through an input incorporated into the treadmill.

In some examples, the treadmill includes an incline mechanism that is integrated into the base and controls an elevation of the front portion of the deck. The rear portion of the deck is connected to the base at a pivot connection. As the incline mechanism changes the elevation of the front portion of the deck, the rear portion of the deck remains connected to the base, thus, the front portion of the deck inclines with respect to the base.

In some examples, the treadmill includes an upright structure that is connected to the base. In these examples, the upright structure includes a first post and a second post. The first post and the second post can include a console. The console can include an input mechanism that controls an operational parameter of the treadmill. In some cases, the console includes a cooling mechanism (e.g. fan), speakers, microphones, sensors, other features, or combinations thereof. In some cases, the console includes a display.

In some cases, the motor is located inside of a housing. The drive motor can be disposed adjacent to a pulley that moves the tread belt in a rotational direction. The drive motor can be attached to the pulley with a drive shaft. A power supply can provide power to the motor to drive the rotation of the drive shaft. The power supply can be an external source, such as an alternating current system incorporated into a residence or other building, a generator, an alternative power source, another type power source, or combinations thereof. In some instances, the power supply can be internal to the housing and/or treadmill. In some cases, a flywheel is attached to and coaxial with the drive motor. The flywheel can rotate with the drive motor.

A lift motor can be connected to the deck and to the base frame of the treadmill. When activated, the lift motor can cause a rod to extend downward, which pushes against the front portion of the deck and the base frame causing the front portion of the deck to raise. In other situations, when the lift motor can be activated, the rod is retracted, which causes the front portion of the deck to lower. In these cases, the lift motor can be transversely oriented with respect to the fan assembly. While this example has been described with having a lift motor as part of a system for inclining the deck, any appropriate mechanism can be used to incline the deck.

In those examples where the treadmill includes a console display, the console display can depict information about the user, the operational parameters of the treadmill, entertainment, other features, or combinations thereof. In those examples where the exercise machine is without a console, the exercise machine can be less expensive to manufacture, move, set up, transport, or combinations thereof.

The exercise machine can collect data about the user's physiological condition during the performance of an exercise. In some cases, sensors are incorporated into the exercise machine to gather specific types of physiological information about the user. These sensors can be located on the exercise machine where the user comes into contact with the exercise machine. For example, an electrical contact that is part of a heart rate monitoring system can be incorporated into hand rails, handles, or other types of supports incorporated into the exercise machine. The electrical contacts can detect electrical pulses transmitted through the user's body during the exercise, and these measurements can be used to determine the user's heart rate.

The existence of a runaway condition can be determined through any appropriate mechanism. For example, a current measuring device can determine if electricity is being generated by the motor. In those circumstances where the electricity is being generated by the motor, the processing resources can determine that a runaway condition exists. Any appropriate type of device to measure the amount of power produced by the motor can be used. In some examples, an ohmmeter, an ammeter, a multimeter, a capacitor, another type of measurement device, or combinations thereof can be used. In some cases, any electricity that is generated can be directed to a dump resistor where the electricity is converted to heat. A thermometer can be used to measure the dump resistor's temperature. In those cases where the thermometer records that the dump resistor's temperature is above a baseline temperature, the processing resources can determine that a runaway condition exists.

In other examples, a runaway condition can be presumed when the incline of the deck is above a certain threshold. While other factors can affect when a runaway condition exists, like the user's weight, the sensing electronics can be simplified by presuming that a runaway condition exists solely based on the deck's incline angle. In some cases when the runaway condition is presumed, the processing resources can determine that a runaway condition exists. In this type of example, the mechanical resistance on the motor can be increased regardless of whether an actual runaway condition exists or not. In other circumstances, the processing resources can initiate additional tests when a presumption of a runaway condition exists and initiate a runaway mitigation procedure in response to the findings of those tests.

In some cases, the user's weight is known to the processing resources or at least determinable. For example, the user can input his or her weight into an input mechanism incorporated into the console or through a remote device in communication with the treadmill. The weight of the user can determine which incline angle is classified as a runaway condition threshold angle. In other examples, the requested speed of the tread belt also affects which incline angle is classified as a runaway condition threshold angle.

In other examples, a rotary sensor is associated with the drive shaft, a flywheel, a pulley, another rotary device, or combinations thereof that determine how fast these components are operating. The speed that the motor should be running based on the amount of electricity inputted into the motor can be compared with the actual speed of the motor to determine whether a runaway condition exists.

In another example, the motor is determined to be in a runaway condition if the angle the incline deck is above a predetermined threshold angle. In some cases, this predetermined threshold angle is adjustable based on the weight of the user, the inputted speed for the tread belt to move, other factors, or combinations thereof.

In some examples, when the drive motor is in a runaway condition, the motor produces electrical power. In some instances, the electrical power is directed to a runaway load component. In some cases, the runaway load component is a dump resistor, which converts the electrical power to heat. In other examples, the runaway load component is a cooling fan, a message mechanism that alerts the user to the situation, a magnetic mechanism that increases a magnetic flux on a device that increases a resistance to move the treadmill or another object, a light, a speaker, a wireless profile mechanism, another device, or combinations thereof.

In those examples, where the runaway load component is a cooling fan, any appropriate type of cooling fan can be used. In some examples, the cooling fan is a centrifugal fan, a cross-flow fan, an axial flow fan, and other type of fan or combinations thereof. In some examples, a fan be integrated into the flywheel that is attached to the drive motor. In those situation, the cooling fan can further contribute to the cooling of the housing.

The cooling fan can be located at any appropriate location. In some cases, the cooling fan is located in the same housing as the drive motor. In other examples, the cooling fan is disposed in another housing that contains components other than the drive motor. In yet other cases, the drive motor is not disposed within a housing. In one example, the cooling fan is incorporated into the console of the treadmill's upright structure and is positioned to direct an airflow towards a user performing an exercise on the treadmill. The cooling fan can be located and oriented to direct an airflow over other components of the treadmill and/or user. For example, the cooling fan can be positioned and oriented to cool a lift motor, a drive motor, a bearing, a battery, a dump resistor, a pulley, a user, an ambient environment, a user's hand, another user body part, a user's water bottle, another treadmill component, another component, or combinations thereof.

The cooling fan can be located within the same housing in which the drive motor, lift motor, or another motor is located. In some cases, these motors or other devices are heat sensitive, and the cooling fan can cool the components within the housing. In those situations where the electricity generated by the drive motor is directed to a dump resistor when a runaway condition exists, the cooling fan can be directed to cool the dump resistor. In some cases, the cooling fan and the dump resistor both draw power from the drive motor. In some of these situations, the cooling fan can draw the entire amount of electricity provided from the drive motor. As more electricity is generated, the cooling fan can increase its rotational speed, thereby drawing on the larger amount of electricity. As the amount of electricity continues to increase even more, the cooling fan cannot use any more electricity. At that point, the extra amount of electricity can flow to the dump resistor. In alternative examples, the dump resistor and cooling fan can both draw from the drive motor even if just a small amount of electricity is produced.

The runaway mitigation system can include a combination of hardware and programmed instructions for executing the functions of the runaway mitigation system. In this example, the runaway mitigation system includes processing resources that are in communication with memory resources. Processing resources include at least one processor and other resources used to process the programmed instructions. The memory resources represent generally any memory capable of storing data such as programmed instructions or data structures used by the runaway mitigation system. The programmed instructions and data structures shown stored in the memory resources include an incline determiner, a belt speed determiner, a resistor thermometer, and a resistance determiner.

Input/output (I/O) resources are in communication with the processing resources. The I/O resources can include any appropriate type of mechanism for communicating with remote devices. For example, the I/O resources can include a transmitter, a wireless transmitter, a receiver, a transceiver, a port for receiving an external memory, a network interface, another I/O resource, or combinations thereof.

The I/O resources can be in communication with any appropriate device. In the illustrated example, the I/O resources are in communication with an incline sensor, an odometer, a thermometer, a motor, another remote device, a runaway mitigation mechanism, or combinations thereof. These remote devices can be located on the treadmill, can be independent of the treadmill, can be in communication with the I/O resources over a network, can be part of a wearable device, or combinations thereof. Such protocols can include standard wireless protocols, protocols used by Bluetooth® technologies, Wi-Fi protocols, Z-wave protocols, Zigbee protocols, other types of wireless protocols, or combinations thereof.

The processing resources can include more or more processors. The processing resources can include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, the processing resources can be configured to operate a memory array using a memory controller. In other cases, a memory controller can be integrated into the processor. The processing resources can be configured to execute computer-readable instructions stored in a memory to perform various functions (e.g., function or tasks supporting overlaying exercise information on a remote display).

An I/O controller can manage input and output signals for the runaway mitigation system and/or the exercise machine. Input/output control components can also manage peripherals not integrated into these devices. In some cases, the input/output control component can represent a physical connection or port to an external peripheral. In some cases, I/O controller can utilize an operating system such as iOS®, ANDROID®, MS-DOS®, MS-WINDOWS®, OS/2®, UNIX®, LINUX®, or another known operating system.

Memory resources can include random access memory (RAM) and read only memory (ROM). The memory can store computer-readable, computer-executable software including instructions that, when executed, cause the processor to perform various functions described herein. In some cases, the memory resources can contain, among other things, a Basic Input-Output system (BIOS) which can control basic hardware and/or software operation such as the interaction with peripheral components or devices.

The incline determiner represents programmed instructions that, when executed, cause the processor to determine the incline of the treadmill deck. In some cases, the incline determiner requests the angle from a distance sensor, from a level sensor, from a gravity sensor, from an accelerometer, from another type of sensor, or combinations thereof. In response, the sensor can send raw data to the incline determiner where the raw data is interpreted to determine the incline angle. In other examples, the incline determiner receives data that is at least partially processed. In other examples, the incline mechanism of the treadmill is in communication with the incline determiner. The incline mechanism can know the incline angle at which it has set the deck and can continuously send, periodically send, or send on demand information about the angle to the incline determiner.

The belt speed determiner represents programmed instructions that, when executed, cause the processor to determine the speed that the tread belt is moving. In some cases, the speed determiner requests the angle from an odometer, optical sensor, an accelerometer, another type of sensor, or combinations thereof. In response, the sensor can send raw data to the incline determiner where the raw data is interpreted to determine the tread belt speed. In other examples, the belt speed determiner receives data that is at least partially processed.

The resistor thermometer represents programmed instructions that, when executed, cause the processor to determine a temperature of at least one component of the treadmill that is indicative of a runaway condition. In one example, the resistor thermometer can measure the temperature of a dump resistor that is in electrical communication with the motor. In those conditions where the motor is in a runaway condition, the motor can be generating electricity and the generated electricity can be directed to the dump resistor to convert this electricity into heat. Under those circumstances where the dump resistor's temperature is above a predetermined threshold, the processor can determine that a runaway condition exists.

The resistance determiner represents programmed instructions that, when executed, cause the processor to determine a resistance load on the motor. The resistance determiner can take inputs from the incline determiner, the belt speed determiner, the resistance thermometer, a user weight input, an inputted tread belt speed, an actual tread belt speed, other information, or combinations thereof.

In some cases, the resistance determiner measures the speed inputted into the console by the user to operate the tread belt (inputted speed). The inputted speed can be compared to the actual speed determined by the belt speed determiner or through another mechanism. If the actual speed and the inputted speed do not match, the resistance determiner can conclude that the resistance on the motor is too low to prevent a runaway condition or the processor can determine that a runaway condition exists.

In some examples, the resistance determiner can determine that an insufficient load exists on the motor to prevent a runaway condition when the temperature of the resistor is above a predetermined temperature threshold. In other examples, the resistance determiner can determine that an insufficient amount of resistance exists on the motor when the incline deck is orientated at an angle above a predetermined threshold angle.

While the above examples have been described with reference to specific mechanisms for determining that a runaway condition exists, any appropriate mechanism can be used to determine whether a runaway condition exists. In some examples, sensors incorporated into the treadmill are used to determine the existence of a runway condition. In other examples, sensors or information from a remote device can at least contribute to determining whether a runaway condition exists.

The treadmill can include a runaway mitigation mechanism. In some examples, the runaway mitigation mechanism is an active mechanism that operates in response to a determination that a runaway condition exists or is at least approaching a potential runaway condition. The active runaway mitigation mechanism can respond by increasing the load on the motor. In other examples, the runaway mitigation mechanism is a passive mechanism that automatically applies a greater resistance to the motor.

The active runaway mitigation mechanism can prevent a runaway condition from starting or can reduce, or even eliminate, the runaway condition. The active runaway condition mitigation mechanism can include a braking mechanism, a compressive breaking mechanism, a hydraulic mechanism, a pneumatic mechanism, another type of mechanism, or combinations thereof that apply mechanical resistance to a rotation of the motor's drive shaft.

In some cases, a drive shaft extends beyond a motor casing, and a rotary disc is rigidly attached to the drive shaft. In some of these examples, a compression brake can be positioned adjacent to the rotary disc. The compression brake can include a first pad adjacent a first side of the rotary disc, and a second pad adjacent a second side of the rotary disc. When activated, the first pad and the second pad move towards the rotary disc simultaneously and apply a compressive load to the rotary disc which resists rotational movement of the rotary disc. Under certain conditions, the compression brake can apply a compressive load that is sufficient to prevent the rotary disc, and therefore the drive shaft, from rotating at all. Under other conditions, the compression brake can apply a compressive load that merely increases the resistance to the rotational movement of the rotary disc, but is not sufficient to stop the drive shaft from rotating. When a runaway condition is sensed, the compression brake can be activated to increase the mechanical resistance to the motor to at least mitigate the runaway condition.

In another example, the rotary disc can include at least some magnetically conductive material. A magnetic unit can be positioned adjacent to a rim of the rotary disc. The magnetic unit can apply a magnetic force on the rotary disc that resists movement of the rotary disc and therefore movement of the drive shaft.

The magnetic unit can be positionable with a linear actuator. The linear actuator can include an actuator motor and a screw rod. In this example, as the motor operates in a first direction, the screw rod moves the magnetic unit in a direction towards the rotary disc. In the same example, as the motor operates in a second direction, the screw rod moves the magnetic unit in another direction away from the rotary disc. As the magnetic unit approaches the rotary disc, the magnetic load applied to the rotary disc can increase so that more resistance is applied to the rotary disc's movement and mechanical resistance on the motor increases. Similarly, as the magnetic unit moves away from the rotary disc, the magnetic load on the rotary disc can decrease, which lowers mechanical resistance on the motor. In alternative embodiments, the magnetic unit is an electromagnet that produces a magnetic field that is proportional to the power supplied to the magnetic unit. In this example, the magnetic strength applied to the rotary disc is adjustable by varying the power to the magnetic unit.

In those examples where the runaway mitigation mechanism is passive, the resistance can be applied automatically without a command instruction to the motor under those circumstances when a runaway condition is more likely to occur. For example, the increased resistance on the motor can be automatically applied when the treadmill deck is inclined above a predetermined threshold angle.

In one example of a passive runaway mitigation mechanism, the mechanism includes a container and a portion of the drive shaft is partially disposed within the container. The container includes a fluid, such as an oil-based fluid. In some cases, the container moves with the deck. So, when the deck is in a level orientation, the container is held at a corresponding orientation. On the other hand, when the deck is inclined at an angle, the container is held in a tilting orientation.

In the level orientation, the fluid resides under the drive shaft without making contact with the drive shaft. In the tilted orientation, the fluid can pool in the proximity of the drive shaft so that the fluid is in contact with the drive shaft. In the illustrated example, the drive shaft is immersed in the fluid so that an entire circumference of the drive shaft is in contact with the fluid. In some examples, the contact with the drive shaft resists rotation of the drive shaft. In some cases, the viscosity of the fluid resists the rotation of the shaft. In some cases, the shaft has a generally symmetric shape, and the surface friction of the cylindrical shape and the fluid increases the resistance to the rotation of the drive shaft.

In other examples, the drive shaft can include features that increase the amount of resistance applied from at least partially immersion into the fluid. One feature that can increase the resistance includes at least one vane is attached to the drive shaft. The vane can push against the fluid as the drive shaft rotates thereby increasing the resistance to the rotation of the drive shaft. While this example has been depicted with a vane for increasing the resistance to the drive shaft's rotation, any appropriate type of feature that can increase the resistance can be incorporated into the drive shaft.

In another example, a magnet can come into closer proximity with the drive shaft as the deck is inclined. In this example, the closer that the magnet is to the drive shaft, the greater influence the magnet's flux has on the drive shaft resulting in a greater resistance to the rotation of the drive shaft.

It should be noted that the methods described above describe possible implementations, and that the operations and the steps can be rearranged or otherwise modified and that other implementations are possible. Furthermore, aspects from two or more of the methods can be combined.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative blocks and modules described in connection with the disclosure herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices (e.g., a combination of a digital signal processor (DSP) and a microprocessor, multiple microprocessors, one or more microprocessors in conjunction with a DSP core, or any other such configuration).

The functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed so that portions of functions are implemented at different physical locations.

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. In some cases, the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. A portable medium, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein can be applied to other variations without departing from the scope of the disclosure. Thus, the disclosure is not limited to the examples described herein, but is to be accorded the broadest scope consistent with the principles and novel features disclosed herein.

What is claimed is:

1. A treadmill, comprising:
a deck;
a first pulley incorporated into the deck;
a second pulley incorporated into the deck;
a tread belt surrounding the first pulley and the second pulley;
a drive motor in mechanical communication with at least one of the first pulley and the second pulley to move the tread belt in a first direction;
a runaway load component in electrical communication with the drive motor;
wherein the runaway load component draws electrical power generated by the drive motor during a runaway motor condition.

2. The treadmill of claim 1, wherein the runaway motor condition is induced when a user moves the tread belt with a force that is greater than that outputted with the drive motor.

3. The treadmill of claim 2, wherein the runaway motor condition exists when the user moves the tread belt at the force that is greater than that which is outputted with the drive motor when an incline angle of the deck exceeds a threshold angle.

4. The treadmill of claim 1, wherein the runaway load component turns on during a motor runaway condition.

5. The treadmill of claim 1, wherein the runaway load component comprises a dump resistor.

6. The treadmill of claim 1, wherein the runaway load component is located in a housing that contains the drive motor.

7. The treadmill of claim 1, wherein the runaway load component comprises a cooling fan.

8. The treadmill of claim 7, wherein the cooling fan is positioned to direct an airflow towards the drive motor.

9. The treadmill of claim 7, wherein the cooling fan is located adjacent to a lift motor that controls an elevation for a portion of the deck.

10. The treadmill of claim 7, wherein the cooling fan is positioned to cool a housing that contains the drive motor.

11. The treadmill of claim 7, wherein the cooling fan is positioned to direct an airflow over a dump resistor.

12. A treadmill, comprising:
a deck;
a first pulley incorporated into the deck;
a second pulley incorporated into the deck;
a tread belt surrounding the first pulley and the second pulley;
a drive motor in mechanical communication with at least one of the first pulley and the second pulley to move the tread belt in a first direction;
a cooling fan in electrical communication with the drive motor;
wherein the cooling fan draws electrical power generated by the drive motor during a runaway motor condition.

13. The treadmill of claim 12, wherein the runaway motor condition is induced when a user moves the tread belt with a force that is greater than that outputted with the drive motor.

14. The treadmill of claim 13, wherein the runaway motor condition exists when the user moves the tread belt at the force that is greater than that which is outputted with the drive motor when an incline angle of the deck exceeds a threshold angle.

15. The treadmill of claim 12, further including a dump resistor in communication with the drive motor, wherein the cooling fan and the dump resistor draw on electrical power from the drive motor during the runaway motor condition.

16. The treadmill of claim 12, wherein the cooling fan is positioned to direct an airflow towards the drive motor.

17. The treadmill of claim 12, wherein the cooling fan is located adjacent to a lift motor that controls an elevation for a portion of the deck.

18. The treadmill of claim 12, wherein the cooling fan is positioned to cool a housing that contains the drive motor.

19. The treadmill of claim 12, wherein the cooling fan is positioned to direct an airflow over a dump resistor.

20. A treadmill, comprising:
a deck;
a first pulley incorporated into the deck;
a second pulley incorporated into the deck;
a tread belt surrounding the first pulley and the second pulley;
a housing incorporated into the deck;
a drive motor disposed within the housing and in mechanical communication with at least one of the first pulley and the second pulley to move the tread belt in a first direction;
a dump resistor in electrical communication with the drive motor;
a cooling fan disposed within the housing and in electrical communication with the drive motor;
wherein the cooling fan draws electrical power generated by the drive motor during a runaway motor condition;
wherein the dump resistor also draws power from the drive motor during the runaway motor condition;
wherein the runaway motor condition exists when a user moves the tread belt at a force that is greater than that which is outputted with the drive motor when an incline angle of the deck exceeds a threshold angle.

* * * * *